US012506279B2

(12) United States Patent
Lee et al.

(10) Patent No.: US 12,506,279 B2
(45) Date of Patent: Dec. 23, 2025

(54) ELECTRONIC APPARATUS COMPRISING ANTENNA

(71) Applicant: SAMSUNG ELECTRONICS CO., LTD., Suwon-si (KR)

(72) Inventors: Kookjoo Lee, Suwon-si (KR); Sumin Yun, Suwon-si (KR); Minwoo Lee, Suwon-si (KR); Juseok Lee, Suwon-si (KR); Wonhee Choe, Suwon-si (KR); Chaejun Lee, Suwon-si (KR); Jinwoo Jung, Suwon-si (KR); Jaebong Chun, Suwon-si (KR); Hochul Hwang, Suwon-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 96 days.

(21) Appl. No.: 18/118,905

(22) Filed: Mar. 8, 2023

(65) Prior Publication Data

US 2023/0223708 A1 Jul. 13, 2023

Related U.S. Application Data

(63) Continuation of application No. PCT/KR2021/012055, filed on Sep. 6, 2021.

(30) Foreign Application Priority Data

Sep. 8, 2020 (KR) ........................ 10-2020-0114821

(51) Int. Cl.
*H01Q 21/24* (2006.01)
*H01Q 1/24* (2006.01)
(Continued)

(52) U.S. Cl.
CPC ............ *H01Q 21/24* (2013.01); *H01Q 1/243* (2013.01); *H01Q 9/0407* (2013.01);
(Continued)

(58) Field of Classification Search
None
See application file for complete search history.

(56) References Cited

U.S. PATENT DOCUMENTS 10,218,058 B2 2/2019 Lee et al.
10,516,204 B2 12/2019 Cho et al.
(Continued)

FOREIGN PATENT DOCUMENTS

CN 109075428 A * 12/2018 ............... G02F 1/13
EP 3598579 1/2020
(Continued)

OTHER PUBLICATIONS

International Search Report for PCT/KR2021/012055 mailed Jan. 3, 2022, 5 pages.
(Continued)

*Primary Examiner* — Dameon E Levi
*Assistant Examiner* — Anh N Ho
(74) *Attorney, Agent, or Firm* — NIXON & VANDERHYE P.C.

(57) ABSTRACT

An electronic device may comprise: a display; an antenna module including at least one antenna; a conductive connection member comprising a conductive material; and at least one antenna structure. The display may be arranged in the inner space of a housing to be visible from the outside and may include a curved side surface portion. The antenna module may be arranged in the inner space of the housing. The conductive connection member may be electrically connected to the antenna module. The at least one antenna structure may be arranged on a side surface portion of the display. The conductive connection member may electrically connect the antenna structure to the antenna module. The antenna structure may include at least one first-type
(Continued)

antenna and at least one second-type antenna configured to radiate radio waves in different directions.

11 Claims, 30 Drawing Sheets

(51) Int. Cl.
*H01Q 9/04* (2006.01)
*H01Q 9/28* (2006.01)
*H01Q 9/40* (2006.01)
*H01Q 13/10* (2006.01)

(52) U.S. Cl.
CPC ............... *H01Q 9/285* (2013.01); *H01Q 9/40* (2013.01); *H01Q 13/106* (2013.01)

(56) References Cited

U.S. PATENT DOCUMENTS

| | | | | |
|---|---|---|---|---|
| 10,673,127 | B2 | 6/2020 | Ruaro et al. | |
| 10,714,810 | B2 | 7/2020 | Hong et al. | |
| 10,895,634 | B2 | 1/2021 | Nath et al. | |
| 11,031,696 | B2 | 6/2021 | Xia et al. | |
| 11,088,443 | B2 | 8/2021 | Ryu et al. | |
| 11,296,401 | B2 | 4/2022 | Kim et al. | |
| 2002/0122006 | A1 | 9/2002 | Crawford | |
| 2005/0146470 | A1 | 7/2005 | Li et al. | |
| 2013/0257668 | A1 | 10/2013 | Rao et al. | |
| 2015/0311960 | A1* | 10/2015 | Samardzija | H05K 1/0278 455/90.3 |
| 2016/0093939 | A1 | 3/2016 | Kim et al. | |
| 2017/0048991 | A1* | 2/2017 | Kim | G06F 1/163 |
| 2018/0241115 | A1* | 8/2018 | Cho | H01Q 21/061 |
| 2021/0135337 | A1* | 5/2021 | Kim | H01Q 1/44 |
| 2022/0200134 | A1* | 6/2022 | Yoon | H01Q 21/205 |
| 2023/0255054 | A1* | 8/2023 | Kim | H04M 1/0268 361/814 |
| 2023/0275625 | A1* | 8/2023 | Kim | H01Q 21/06 455/73 |

FOREIGN PATENT DOCUMENTS

| | | | | | |
|---|---|---|---|---|---|
| JP | 5232046 | | | 7/2013 | |
| JP | 6230438 | | | 11/2017 | |
| KR | 10-2017-0096866 | | | 8/2017 | |
| KR | 10-2019-0019802 | | | 2/2019 | |
| KR | 10-1962820 | | | 3/2019 | |
| KR | 10-1971490 | | | 4/2019 | |
| KR | 10-2019-0100870 | | | 8/2019 | |
| KR | 10-2019-0110508 | | | 9/2019 | |
| KR | 20200025439 | A | * | 3/2020 | |
| KR | 10-2418533 | | | 7/2022 | |
| WO | 2020/141018 | | | 7/2020 | |
| WO | WO-2020141018 | A1 | * | 7/2020 | H01Q 1/243 |
| WO | 2020/156650 | | | 8/2020 | |
| WO | WO-2020156650 | A1 | * | 8/2020 | H01Q 1/243 |

OTHER PUBLICATIONS

Written Opinion of the ISA for PCT/KR2021/012055 mailed Jan. 3, 2022, 4 pages.
Extended European Search Report dated Dec. 20, 2023 issued in European Patent Application No. 21867071.9.
Korean Notice of Patent Grant dated Dec. 24, 2025 for KR Application No. 10-2020-0114821.
Korean Office Action dated Sep. 2, 2024 for KR Application No. 10-2020-0114821.

* cited by examiner (a)

(b)

< Vertical Radiation Patterns of Monopole Antenna and Parallel Antenna >

< Horizontal Radiation Patterns of Monopole Antenna and Parallel Antenna >

< Vertical Radiation Patterns of Dipole and Tapered Antennas >

< Horizontal Radiation Patterns of Dipole and Tapered Antennas >

ELECTRONIC APPARATUS COMPRISING ANTENNA

CROSS-REFERENCE TO RELATED APPLICATIONS

This application is a continuation of International Application No. PCT/KR2021/012055 designating the United States, filed on Sep. 6, 2021, in the Korean Intellectual Property Receiving Office and claiming priority to Korean Patent Application No. 10-2020-0114821, filed on Sep. 8, 2020, in the Korean Intellectual Property Office, the disclosures of which are incorporated by reference herein in their entireties.

BACKGROUND

Field

The disclosure relates to an electronic device including an antenna.

Description of Related Art

To meet the demand for wireless data traffic having increased since deployment of 4th generation (4G) communication systems, efforts have been made to develop an improved 5th generation (5G) or pre-5G communication system. For example, a 5th generation (5G) mobile telecommunication system or pre-5G communication system is also called a "beyond 4G network" communication system or a "post LTE" system.

The 5G communication system may be implemented in high frequency bands so as to accomplish higher data rates. To decrease propagation loss of the radio waves and increase the transmission distance in the high frequency bands, beamforming, massive multiple-input multiple-output (massive MIMO), full dimensional MIMO (FD-MIMO), array antenna, analog beam forming, large scale antenna techniques are discussed in 5G communication systems.

In a next-generation system, broadband wireless transmission using a millimeter wave (mmWave) band of 6 [GHz] or higher or a beamforming technique using a massive antenna is being considered. In addition, various transmission and reception duplexing techniques and various types of multiple subcarrier-based wireless transmission methods are being considered.

In millimeter Wave (mmWave) communication, high free-space path loss occurs, and thus an array antenna structure having a high antenna gain may be used to overcome the loss. Due to the high linearity of the mmWave frequency, radio wave radiation from an antenna may be hindered by a display or a housing including a conductive material. In order to address the hinderance of radio wave radiation from the antenna, a conductive layer including a mesh shape on the front surface (e.g., the surface on which a screen is displayed) of a display may be used as an antenna. When a patch-type antenna is located on the front surface of a display, a coverage area of the patch-type antenna may be limited in the front direction. For example, the patch-type antenna may radiate a millimeter wave signal toward the front surface of the display. In addition, the patch-type antenna using a conductive mesh structure may have low radiation efficiency due to a large sheet resistance value of a conductive pattern formed in the mesh structure. Since the patch-type antenna requires a microstrip-type feeder having at least a halfwave length to operate normally, the radiation efficiency of the antenna may be reduced.

SUMMARY

Embodiments of the disclosure may provide an electronic device including an antenna that may have an antenna coverage area in front and lateral (side) directions of the electronic device.

An electronic device according to various example embodiments of the disclosure may include: a display, an antenna module including at least one antenna, a conductive connection member comprising a conductive material, and at least one antenna structure. The display may be arranged in an inner space of a housing to be visible from the outside and may include a curved lateral portion. The antenna module may be disposed in the inner space of the housing. The conductive connection member may be electrically connected to the antenna module. The at least one antenna structure may be disposed on the lateral portion of the display. The conductive connection members may electrically connect the antenna structure to the antenna module. The antenna structure may include at least one first-type antenna and at least one second-type antenna configured to radiate radio waves in different directions.

An electronic device according to various example embodiments of the disclosure may include: a display, a rear cover, an antenna module including at least one antenna, a plurality of flexible printed circuit boards (FPCBs), and a first antenna and a second antenna. The display may be disposed in an inner space of a housing to be visible from the outside and may include a curved lateral portion. The rear cover may be disposed under the display. The antenna module may be disposed in the inner space of the housing. The plurality of FPCBs may be electrically connected to the antenna module. The first antenna may be disposed on one lateral portion of the display. The second antenna may be disposed on the other lateral portion of the display. A first FPCB among the plurality of FPCBs may electrically connect the first antenna to the antenna module. A second first FPCB among the plurality of FPCBs may electrically connect the second antenna to the antenna module. The first antenna and the second antenna may include a first-type antenna and a second-type antenna configured to radiate radio waves in different directions.

Various example embodiments of the disclosure may provide an electronic device including an antenna capable of improving radiation efficiency of a millimeter wave signal in front and lateral (side) directions of the electronic device.

An electronic device according to various example embodiments may include an antenna having vertical/horizontal dual polarization characteristics and disposed on a lateral portion of the electronic device, so that a millimeter wave signal is radiated in front and lateral directions of the electronic device.

An electronic device according to various example embodiments may include an antenna having vertical/horizontal dual polarization characteristics and disposed on a lateral portion of the electronic device, so that antenna coverage may be widened with respect to four surfaces of the electronic device.

In addition, various effects that are identified directly or indirectly through this disclosure may be provided.

BRIEF DESCRIPTION OF THE DRAWINGS

The above and other aspects, features and advantages of certain embodiments of the present disclosure will be more apparent from the following detailed description, taken in conjunction with the accompanying drawings, in which.

In connection with the description of the drawings, the same or similar reference numerals may be used for the same or similar elements.

DETAILED DESCRIPTION

Hereinafter, various example embodiments will be described in greater detail with reference to the accompanying drawings.

Figure 1:
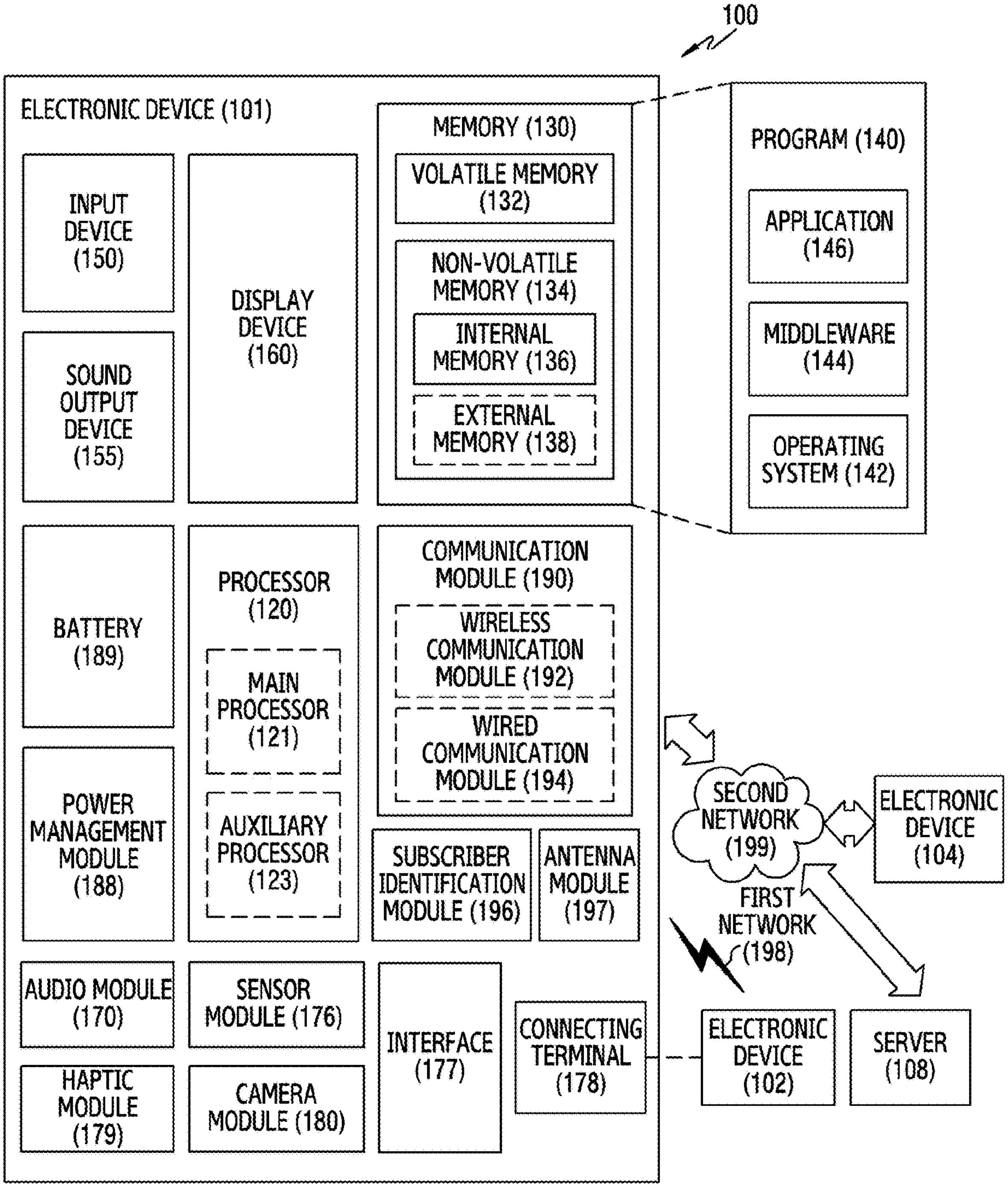
FIG. 1 is a block diagram illustrating an example electronic device in a network environment according to various embodiments.

FIG. 1 is a block diagram illustrating an example electronic device 101 in a network environment 100 according to various embodiments. Referring to FIG. 1, the electronic device 101 in the network environment 100 may communicate with an electronic device 102 via a first network 198 (e.g., a short-range wireless communication network), or an electronic device 104 or a server 108 via a second network 199 (e.g., a long-range wireless communication network). According to an embodiment, the electronic device 101 may communicate with the electronic device 104 via the server 108. According to an embodiment, the electronic device 101 may include a processor 120, memory 130, an input device 150, a sound output device 155, a display device 160, an audio module 170, a sensor module 176, an interface 177, a haptic module 179, a camera module 180, a power management module 188, a battery 189, a communication module 190, a subscriber identification module (SIM) 196, or an antenna module 197. In various embodiments, at least one (e.g., the display device 160 or the camera module 180) of the components may be omitted from the electronic device 101, or one or more other components may be added in the electronic device 101. In various embodiments, some of the components may be implemented as single integrated circuitry. For example, the sensor module 176 (e.g., a fingerprint sensor, an iris sensor, or an illuminance sensor) may be implemented as embedded in the display device 160 (e.g., a display).

The processor 120 may execute, for example, software (e.g., a program 140) to control at least one other component (e.g., a hardware or software component) of the electronic device 101 coupled with the processor 120, and may perform various data processing or computation. According to an embodiment, as at least part of the data processing or computation, the processor 120 may load a command or data received from another component (e.g., the sensor module 176 or the communication module 190) in volatile memory 132, process the command or the data stored in the volatile memory 132, and store resulting data in non-volatile memory 134. According to an embodiment, the processor

120 may include a main processor 121 (e.g., a central processing unit (CPU) or an application processor (AP)), and an auxiliary processor 123 (e.g., a graphics processing unit (GPU), an image signal processor (ISP), a sensor hub processor, or a communication processor (CP)) that is operable independently from, or in conjunction with, the main processor 121. Additionally or alternatively, the auxiliary processor 123 may be adapted to consume less power than the main processor 121, or to be specific to a specified function. The auxiliary processor 123 may be implemented as separate from, or as part of the main processor 121.

The auxiliary processor 123 may control at least some of functions or states related to at least one component (e.g., the display device 160, the sensor module 176, or the communication module 190) among the components of the electronic device 101, instead of the main processor 121 while the main processor 121 is in an inactive (e.g., sleep) state, or together with the main processor 121 while the main processor 121 is in an active state (e.g., executing an application). According to an embodiment, the auxiliary processor 123 (e.g., an image signal processor or a communication processor) may be implemented as part of another component (e.g., the camera module 180 or the communication module 190) functionally related to the auxiliary processor 123.

The memory 130 may store various data used by at least one component (e.g., the processor 120 or the sensor module 176) of the electronic device 101. The various data may include, for example, software (e.g., the program 140) and input data or output data for a command related thereto. The memory 130 may include the volatile memory 132 or the non-volatile memory 134.

The program 140 may be stored in the memory 130 as software, and may include, for example, an operating system (OS) 142, middleware 144, or an application 146.

The input device 150 may receive a command or data to be used by other component (e.g., the processor 120) of the electronic device 101, from the outside (e.g., a user) of the electronic device 101. The input device 150 may include, for example, a microphone, a mouse, a keyboard, or a digital pen (e.g., a stylus pen).

The sound output device 155 may output sound signals to the outside of the electronic device 101. The sound output device 155 may include, for example, a speaker or a receiver. The speaker may be used for general purposes, such as playing multimedia or playing record, and the receiver may be used for an incoming calls. According to an embodiment, the receiver may be implemented as separate from, or as part of the speaker.

The display device 160 may visually provide information to the outside (e.g., a user) of the electronic device 101. The display device 160 may include, for example, a display, a hologram device, or a projector and control circuitry to control a corresponding one of the display, hologram device, and projector. According to an embodiment, the display device 160 may include touch circuitry adapted to detect a touch, or sensor circuitry (e.g., a pressure sensor) adapted to measure the intensity of force incurred by the touch.

The audio module 170 may convert a sound into an electrical signal and vice versa. According to an embodiment, the audio module 170 may obtain the sound via the input device 150, or output the sound via the sound output device 155 or a headphone of an external electronic device (e.g., an electronic device 102) directly (e.g., wiredly) or wirelessly coupled with the electronic device 101.

The sensor module 176 may detect an operational state (e.g., power or temperature) of the electronic device 101 or an environmental state (e.g., a state of a user) external to the electronic device 101, and then generate an electrical signal or data value corresponding to the detected state. According to an embodiment, the sensor module 176 may include, for example, a gesture sensor, a gyro sensor, an atmospheric pressure sensor, a magnetic sensor, an acceleration sensor, a grip sensor, a proximity sensor, a color sensor, an infrared (IR) sensor, a biometric sensor, a temperature sensor, a humidity sensor, or an illuminance sensor.

The interface 177 may support one or more specified protocols to be used for the electronic device 101 to be coupled with the external electronic device (e.g., the electronic device 102) directly (e.g., wiredly) or wirelessly. According to an embodiment, the interface 177 may include, for example, a high definition multimedia interface (HDMI), a universal serial bus (USB) interface, a secure digital (SD) card interface, or an audio interface.

A connecting terminal 178 may include a connector via which the electronic device 101 may be physically connected with the external electronic device (e.g., the electronic device 102). According to an embodiment, the connecting terminal 178 may include, for example, a HDMI connector, a USB connector, a SD card connector, or an audio connector (e.g., a headphone connector).

The haptic module 179 may convert an electrical signal into a mechanical stimulus (e.g., a vibration or a movement) or electrical stimulus which may be recognized by a user via his tactile sensation or kinesthetic sensation. According to an embodiment, the haptic module 179 may include, for example, a motor, a piezoelectric element, or an electric stimulator.

The camera module 180 may capture a still image or moving images. According to an embodiment, the camera module 180 may include one or more lenses, image sensors, image signal processors, or flashes.

The power management module 188 may manage power supplied to the electronic device 101. According to an embodiment, the power management module 188 may be implemented as at least part of, for example, a power management integrated circuit (PMIC).

The battery 189 may supply power to at least one component of the electronic device 101. According to an embodiment, the battery 189 may include, for example, a primary cell which is not rechargeable, a secondary cell which is rechargeable, or a fuel cell.

The communication module 190 may support establishing a direct (e.g., wired) communication channel or a wireless communication channel between the electronic device 101 and the external electronic device (e.g., the electronic device 102, the electronic device 104, or the server 108) and performing communication via the established communication channel. The communication module 190 may include one or more communication processors that are operable independently from the processor 120 (e.g., the application processor (AP)) and supports a direct (e.g., wired) communication or a wireless communication. According to an embodiment, the communication module 190 may include a wireless communication module 192 (e.g., a cellular communication module, a short-range wireless communication module, or a global navigation satellite system (GNSS) communication module) or a wired communication module 194 (e.g., a local area network (LAN) communication module or a power line communication (PLC) module). A corresponding one of these communication modules may communicate with the external electronic device via the first network 198 (e.g., a short-range communication network, such as Bluetooth™ wireless-fidelity (Wi-Fi) direct, or infrared data association (IrDA)) or the second network 199 (e.g., a long-range communication network, such as a cellular network, the Internet, or a computer network (e.g., LAN or wide area network (WAN)). These various types of communication modules may be implemented as a single component (e.g., a single chip), or may be implemented as multi components (e.g., multi chips) separate from each other. The wireless communication module 192 may identify and authenticate the electronic device 101 in a communication network, such as the first network 198 or the second network 199, using subscriber information (e.g., international mobile subscriber identity (IMSI)) stored in the subscriber identification module 196.

The antenna module 197 may transmit or receive a signal or power to or from the outside (e.g., the external electronic device) of the electronic device 101. According to an embodiment, the antenna module 197 may include an antenna including a radiating element including a conductive material or a conductive pattern formed in or on a substrate (e.g., PCB). According to an embodiment, the antenna module 197 may include a plurality of antennas. In such a case, at least one antenna appropriate for a communication scheme used in the communication network, such as the first network 198 or the second network 199, may be selected, for example, by the communication module 190 (e.g., the wireless communication module 192) from the plurality of antennas. The signal or the power may then be transmitted or received between the communication module 190 and the external electronic device via the selected at least one antenna. According to an embodiment, another component (e.g., a radio frequency integrated circuit (RFIC)) other than the radiating element may be additionally formed as part of the antenna module 197.

At least some of the above-described components may be coupled mutually and communicate signals (e.g., commands or data) therebetween via an inter-peripheral communication scheme (e.g., a bus, general purpose input and output (GPIO), serial peripheral interface (SPI), or mobile industry processor interface (MIPI)).

According to an embodiment, commands or data may be transmitted or received between the electronic device 101 and the external electronic device 104 via the server 108 coupled with the second network 199. Each of the electronic devices 102 and 104 may be a device of a same type as, or a different type, from the electronic device 101. According to an embodiment, all or some of operations to be executed at the electronic device 101 may be executed at one or more of the external electronic devices 102, 104, or 108. For example, if the electronic device 101 should perform a function or a service automatically, or in response to a request from a user or another device, the electronic device 101, instead of, or in addition to, executing the function or the service, may request the one or more external electronic devices to perform at least part of the function or the service. The one or more external electronic devices receiving the request may perform the at least part of the function or the service requested, or an additional function or an additional service related to the request, and transfer an outcome of the performing to the electronic device 101. The electronic device 101 may provide the outcome, with or without further processing of the outcome, as at least part of a reply to the request. To that end, a cloud computing, distributed computing, or client-server computing technology may be used, for example.

Figure 2:
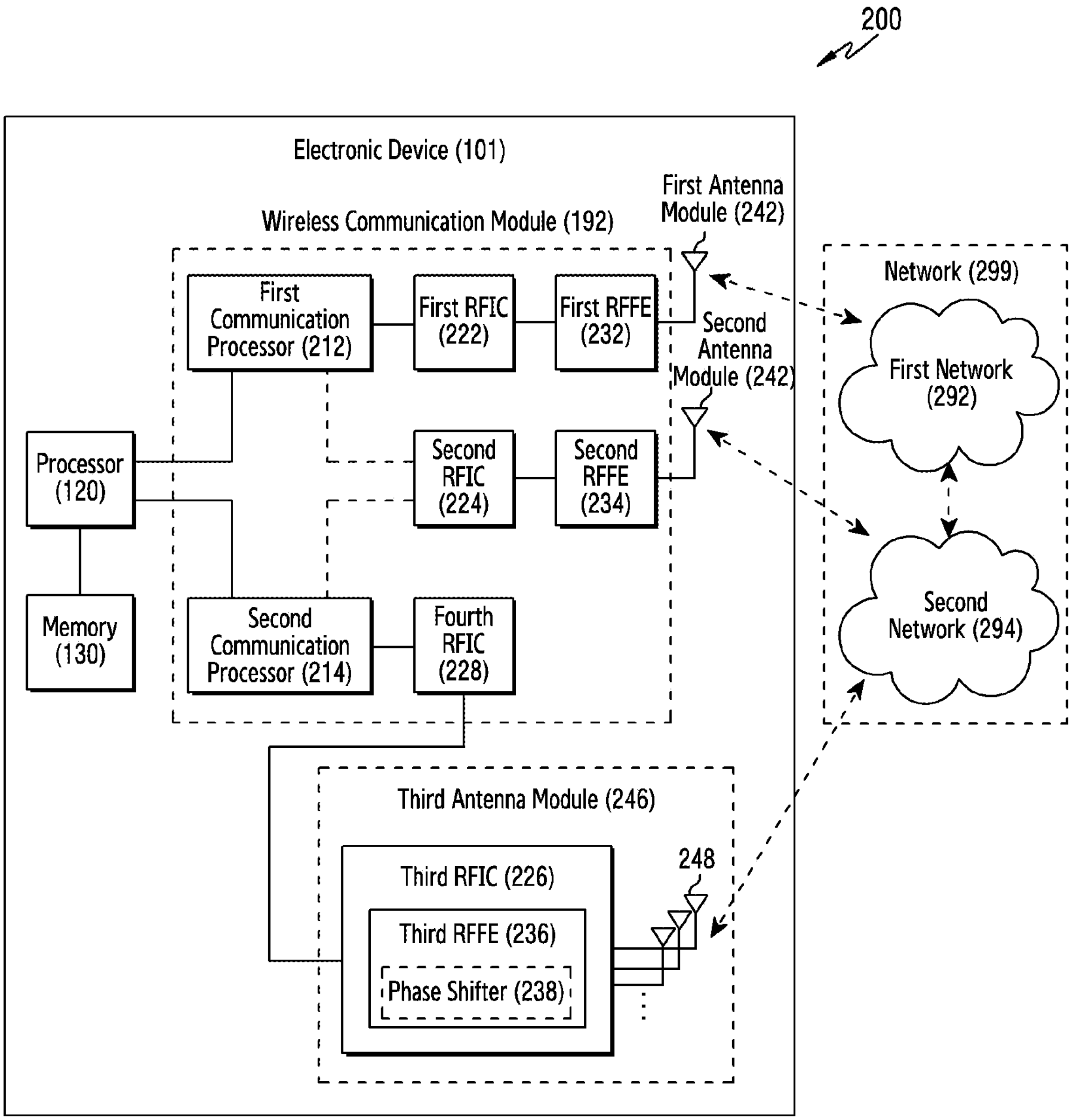
FIG. 2 is a block diagram illustrating an example configuration of a communication module supporting communication with multiple wireless networks in an electronic device according to various embodiments.

FIG. 2 is a block diagram illustrating an example configuration of a communication module 200 supporting communication with multiple wireless networks in the electronic device 101 according to various embodiments.

Referring to FIG. 2, the electronic device 101 may include a first communication processor (CP) (e.g., including processing circuitry) 212, a second CP (e.g., including processing circuitry) 214, a first RFIC 222, a second RFIC 224, a third RFIC 226, a fourth RFIC 228, a first radio frequency front end (RFFE) 232, a second RFFE 234, a first antenna module 242, a second antenna module 244, and an antenna 248. The electronic device 101 may further include a processor (e.g., including processing circuitry) 120 and a memory 130. The second network 199 may include a first cellular network 292 and a second cellular network 294. According to an embodiment, the electronic device 101 may further include at least one of the components illustrated in FIG. 1, and the second network 199 may further include at least one other network. According to an embodiment, the first CP 212, the second CP 214, the first RFIC 222, the second RFIC 224, the fourth RFIC 228, the first RFFE 232, and the 2 RFFE 234 may form at least part of wireless communication module 192. According to an embodiment, the fourth RFIC 228 may be omitted or included as part of the third RFIC 226.

The first CP 212 may include various processing circuitry and support establishment of a communication channel of a band to be used for wireless communication with the first cellular network 292, and legacy network communication through the established communication channel. According to various embodiments, the first cellular network 292 may be a legacy network including a second generation (2G), a third generation (3G), a fourth generation (4G), or long-term evolution (LTE) network. The second CP 214 may include various processing circuitry and support establishment of a communication channel corresponding to a designated band (e.g., about 6 GHz to about 60 GHz) among bands to be used for wireless communication with the second cellular network 294, and 5G network communication through the established communication channel. According to various embodiments, the second cellular network 294 may be a 5G network defined by 3GPP. Additionally, according to an embodiment, the first CP 212 or the second CP 214 may support establishment of a communication channel corresponding to another designated band (e.g., about 6 GHz or less) among bands to be used for wireless communication with the second cellular network 294, and 5G network communication through the established communication channel. According to an embodiment, the first CP 212 and the second CP 214 may be implemented in a single chip or a single package. According to various embodiments, the first CP 212 or the second CP 214 may be formed in a single chip or a single package with the processor 120, the auxiliary processor 123, or the communication module 190. According to an embodiment, the first CP 212 and the second CP 214 may be directly or indirectly connected to each other by an interface (not shown) to provide or receive data or a control signal in one or both directions.

During transmission, the first RFIC 222 may convert a baseband (BB) signal generated by the first CP 212 into an RF signal at about 700 MHz to about 3 GHz used in the first cellular network 292 (e.g., a legacy network). During reception, an RF signal may be obtained from the first cellular network 292 (e.g., a legacy network) via an antenna (e.g., the first antenna module 242) and be preprocessed through an RFFE (e.g., the first RFFE 232). The first RFIC 222 may convert the preprocessed RF signal into a BB signal to be processed by the first CP 212.

During transmission, the second RFIC 224 may convert a BB signal generated by the first CP 212 or the second CP 214 into an RF signal (hereinafter, a 5G Sub6 RF signal) of a Sub6 band (e.g., about 6 GHz or less) used in the second cellular network 294 (e.g., a 5G network). During reception, a 5G Sub6 RF signal may be obtained from the second cellular network 294 (e.g., a 5G network) through an antenna (e.g., the second antenna module 244) and be preprocessed by an RFFE (e.g., the second RFFE 234). The second RFIC 224 may convert the preprocessed 5G Sub6 RF signal into a BB signal to be processed by a corresponding CP among the first CP 212 or the second CP 214.

During transmission, the third RFIC 226 may convert a BB signal generated by the second CP 214 into an RF signal (hereinafter, a 5G Above6 RF signal) of a 5G Above6 band (e.g., about 6 GHz to about 60 GHz) to be used in the second cellular network 294 (e.g., a 5G network). During reception, the third RFIC 226 may preprocess the 5G Above6 RF signal obtained from the second cellular network 294 (e.g., a 5G network) through an antenna (e.g., the antenna 248), and the preprocessed 5G Above6 RF signal may be converted into a BB signal to be processed by the second CP 214. According to an embodiment, the third RFFE 236 may be formed as part of the third RFIC 226.

The electronic device 101, according to an embodiment, may include a fourth RFIC 228 separately from or at least as part of the third RFIC 226. In this case, the fourth RFIC 228 may convert a BB signal generated by the second CP 214 into an RF signal (hereinafter, an IF signal) of an intermediate frequency (IF) band (e.g., about 9 GHz to about 11 GHz), and then may transmit the IF signal to the third RFIC 226. The third RFIC 226 may convert an IF signal into a 5G Above6 RF signal. During reception, a 5G Above6 RF signal may be received from the second cellular network 294 (e.g., a 5G network) via an antenna (e.g., the antenna 248) and converted into an IF signal by the third RFIC 226. The fourth RFIC 228 may convert an IF signal into a BB signal so that the IF signal may be processed by the second CP 214.

According to an embodiment, the first RFIC 222 and the second RFIC 224 may be implemented as a single chip or at least part of a single package. According to an embodiment, the first RFFE 232 and the second RFFE 234 may be implemented as a single chip or at least part of a single package. According to an embodiment, at least one antenna module of the first antenna module 242 or the second antenna module 244 may be omitted or combined with another antenna module to process RF signals of multiple corresponding frequency bands.

According to an embodiment, the third RFIC 226 and the antenna 248 may be disposed on the same substrate to form the third antenna module 246. For example, the wireless communication module 192 or the processor 120 may be disposed on a first substrate (e.g., a main PCB, a first printed circuit board). In this case, the third antenna module 246 may be formed by disposing the third RFIC 226 on a partial area (e.g., the lower surface) of a second substrate (e.g., a sub-PCB, a second printed circuit board) separate from the first substrate, and the antenna 248 on the other partial area (e.g., the upper surface) of the second substrate. When the third RFIC 226 and the antenna 248 are disposed on the same substrate, the length of a transmission line therebetween may be reduced. This, for example, may reduce loss (e.g., attenuation), by a transmission line, of a signal of a high frequency band (e.g., about 6 GHz to about 60 GHz) used in 5G network communication. Accordingly, the electronic device 101 may improve the quality or speed of communication with the second cellular network 294 (e.g., a 5G network). According to an embodiment, the included third RFFE 236 may be separated from the third RFIC 226 and formed as a separate chip. For example, the third antenna module 246 may include the third RFFE 236 and the antenna 248 on the second substrate. For example, the third RFIC 226 from which the third RFFE 236 is separated may or may not be disposed on the second substrate of the third antenna module 246.

According to an embodiment, the antenna 248 may be formed of an antenna array including multiple antenna elements that may be used for beamforming. In this case, the third RFIC 226 may include, for example, multiple phase shifters 238 corresponding to the multiple antenna elements as part of the third RFFE 236. During transmission, the multiple phase converters 238 may convert the phase of a 5G Above6 RF signal to be transmitted to the outside (e.g., a base station of a 5G network) of the electronic device 101 through the corresponding antenna element. During reception, the multiple phase shifters 238 may convert the phase of the 5G Above6 RF signal received from the outside through the corresponding antenna element into the same or substantially the same phase. This enables transmission or reception through beamforming between the electronic device 101 and the outside.

According to an embodiment, the third antenna module 246 may up-convert a baseband transmission signal provided by the second communication processor 214. The third antenna module 246 may transmit an RF transmission signal generated by up-conversion through at least two transmission/reception antenna elements among the multiple antenna elements 248. The third antenna module 246 may receive an RF reception signal through at least two transmission/reception antenna elements and at least two reception antenna elements among the multiple antenna elements 248. The third antenna module 246 may generate a baseband reception signal by down-converting the RF received signal. The third antenna module 246 may output the baseband reception signal generated by down-conversion to the second communication processor 214. The third antenna module 246 may include at least two transmission/reception circuits in one-to-one correspondence with at least two transmission/reception antenna elements, and at least two reception circuits in one-to-one correspondence with at least two reception antenna elements.

The second cellular network 294 (e.g., a 5G network) may operate independently of the first cellular network 292 (e.g., a legacy network) (e.g., Standalone (SA)) or operate by being connected thereto (e.g., Non-standalone (NSA)). For example, a 5G network may include only an access network (e.g., a 5G radio access network (RAN) or next generation RAN (NG RAN)) and may include no core network (e.g., a next generation core (NGC)). In this case, the electronic device 101 may access an access network of the 5G network, and then access an external network (e.g., the Internet) under the control of a core network (e.g., evolved packed core (EPC)) of the legacy network. Protocol information (e.g., LTE protocol information) for communication with the legacy network or protocol information (e.g., new radio (NR) protocol information) for communication with the 5G network may be stored in the memory 230 and accessed by other components (e.g., the processor 120, the first CP 212, or the second CP 214).

According to various embodiments, the processor 120 of the electronic device 101 may execute one or more instructions stored in the memory 130. The processor 120 may include at least one of circuits for processing data, for example, an integrated circuit (IC), an arithmetic logic unit (ALU), a field programmable gate array (FPGA), and a large-scale integration (LSI). The memory 130 may store data related to the electronic device 101. The memory 130 may include a volatile memory, such as random access memory (RAM) including a static random access memory (SRAM), a dynamic RAM (DRAM), or the like, or may include not only read only memory (ROM), magneto-resistive RAM (MRAM), spin-transfer torque MRAM (STT-MRAM), phase-change RAM (PRAM), resistive RAM (RRAM), and ferroelectric RAM (FeRAM) but also a non-volatile memory such as flash memory, embedded multimedia card (eMMC), or solid state drive (SSD).

According to various embodiments, the memory 130 may store instructions related to applications and instructions related to an operating system (OS). The operating system is system software executed by the processor 120. The processor 120 may manage hardware components included in the electronic device 101 by executing an operating system. The operating system may provide an application programming interface (API) to an application, which is software other than system software.

According to various embodiments, one or more applications that are a set of multiple instructions may be installed in the memory 130. That the application is installed in the memory 130 may indicate that the application is stored in a format that may be executed by the processor 120 connected to the memory 130.

Figure 3:
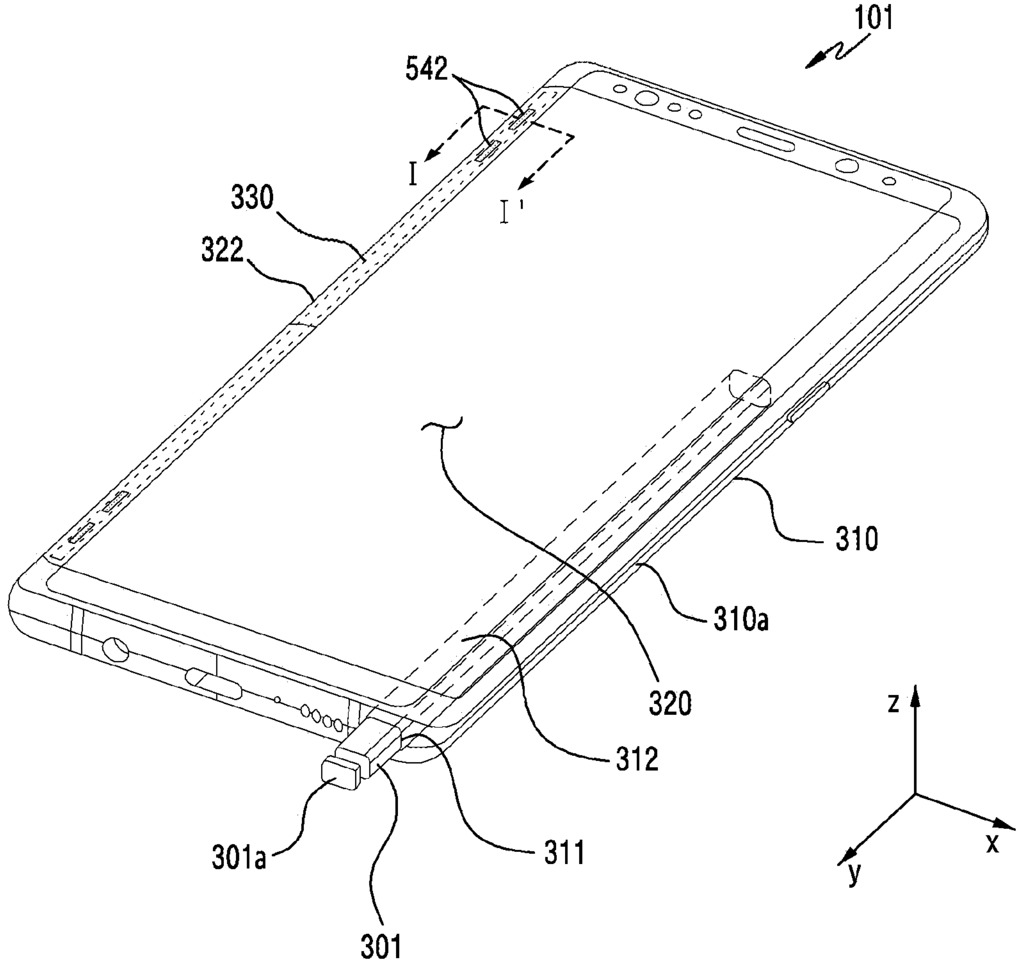
FIG. 3 is a perspective view of an electronic device including an antenna structure according to various embodiments.
Figure 4:
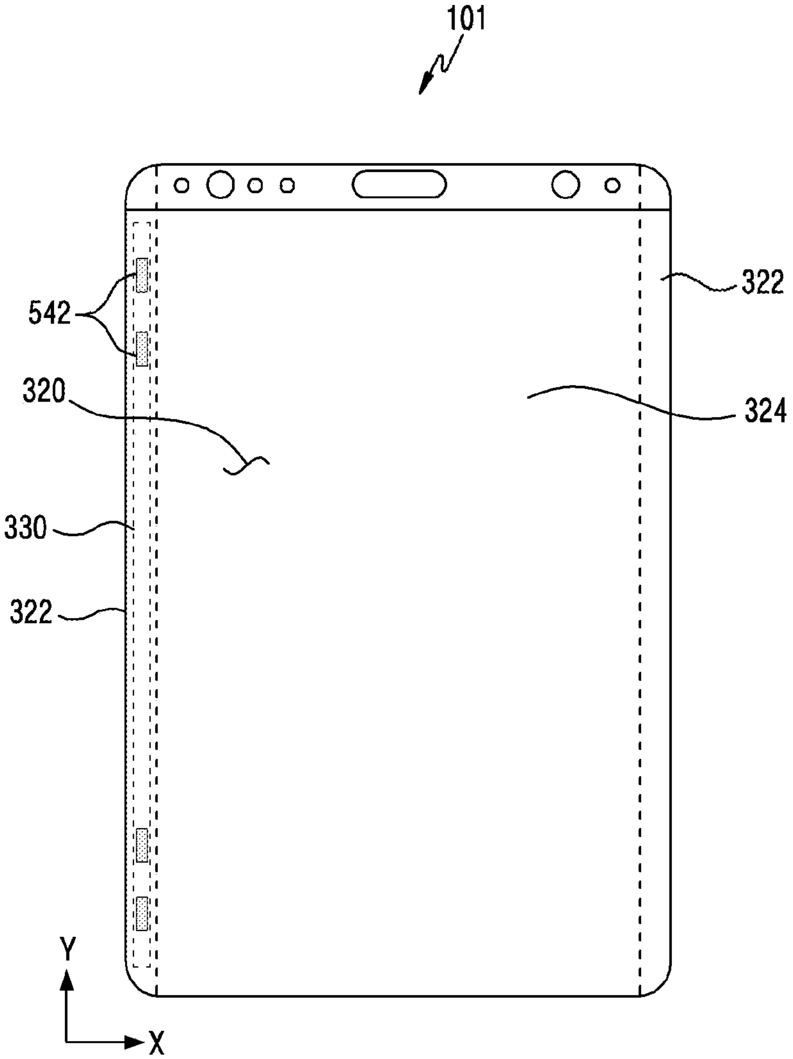
FIG. 4 is a diagram the electronic device shown in FIG. 3 according to various embodiments.

FIG. 3 is a perspective view of the electronic device 101 including an antenna structure 542 according to various embodiments. FIG. 4 is a diagram illustrating the electronic device 101 shown in FIG. 3 according to various embodiments.

Referring to FIGS. 3 and 4, the electronic device 101 according to an embodiment may correspond to the electronic device 101 shown in FIG. 1 or the electronic device 101 shown in FIG. 2. In an embodiment, the electronic device 101 may include a structure into which a stylus pen 301 may be inserted. The stylus pen 301 may be included in the input device 150 of FIG. 1. The electronic device 101 may include a housing 310 (e.g., the side member 730 in FIG. 7A). The electronic device 101 may include a hole 311 in a portion of the housing 310, for example, a portion of the side surface 310*a*. of the housing 310. The housing 310 may include the side surface 310*a*. In an embodiment, the side surface 310*a* may include a conductive member. The electronic device 101 may include a first inner space 312 which is a storage space connected to the hole 311, and the stylus pen 301 may be inserted into the first inner space 312. According to the illustrated embodiment, the stylus pen 301 may include a first button 301*a* which may be pressed at one end thereof such that the stylus pen 301 may be easily taken out of the first inner space 312 of the electronic device 101. When the first button 301*a* is pressed, a repelling mechanism configured in conjunction with the first button 301*a* (e.g., a repulsive mechanism by at least one elastic member (e.g., a spring)) may operate to cause the stylus pen 301 to be separated from the first inner space 312.

The electronic device 101 may include a display 320 (e.g., the display device 160 in FIG. 1). In an embodiment, the display 320 may include a dielectric layer (e.g., the dielectric layer 540 in FIG. 5A). In an embodiment, a touch pattern (or touch sensor), an antenna pattern, or a proximity sensor may be implemented on the dielectric layer. As another example, an antenna pattern may be implemented on the dielectric layer, and a touch sensor and/or a proximity sensor may be implemented on a layer different from the dielectric layer. The dielectric layer may include, for example, a conductive mesh pattern or a dielectric. An antenna pattern and/or a touch pattern may be implemented using a conductive mesh pattern. The display 320 of the electronic device 101 may be formed to have the lateral portion 322 having a curvature. For example, an image may or may not be displayed on the lateral portion 322. A touch sensor (e.g., a touch pattern) may be disposed on a front surface 324 (e.g., a surface on which a screen is displayed, or a portion of the display 320 located on one surface of the housing 310) and/or the lateral portion 322 of the display 320 to sense a user's touch. As another example, the antenna area 330 may be located on the lateral portion 322 of the display 320. For example, multiple antenna structures (e.g., the antenna structure 542 in FIG. 5A) including multiple antennas (e.g., the antenna 542*a* in FIG. 5A) may be disposed in the antenna area 330.

In an embodiment, the electronic device 101 may include a non-foldable phone, a slide phone, or a foldable phone. When the electronic device 101 is a slide phone or a foldable phone, the display 320 may include a flexible display.

In an embodiment, the antenna structure 542 (e.g., the antenna structure 542 in FIG. 5A) may include at least one dipole antenna and/or a tapered slot antenna.

Figure 5A:
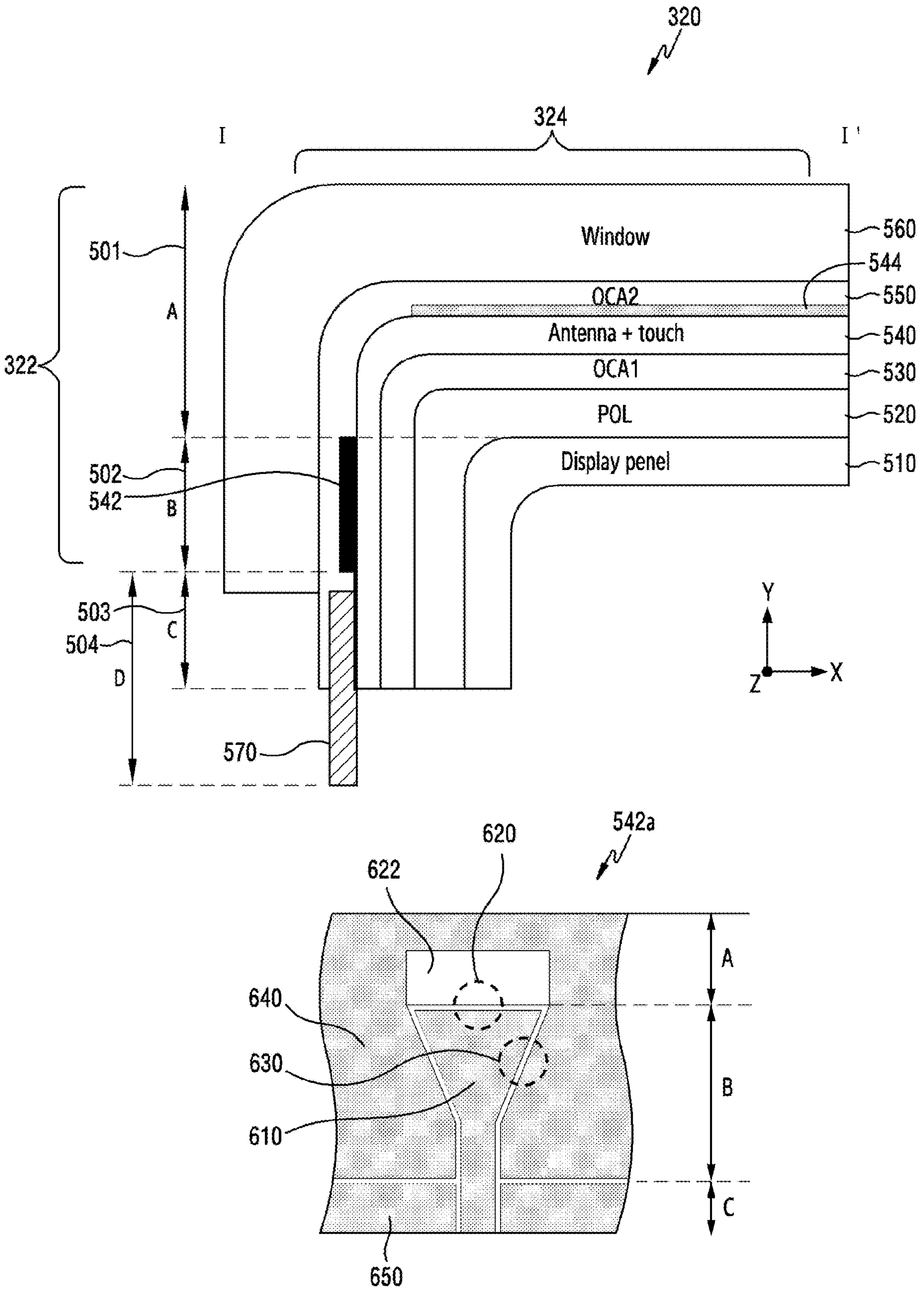
FIG. 5A is a cross-sectional view taken along line I-I" of the electronic device shown in FIG. 3 according to various embodiments.

FIG. 5A is a cross-sectional view taken along line I-I' of the electronic device (e.g., the electronic device 101 in FIG. 3) shown in FIG. 3 according to various embodiments. FIG. 5A illustrates a cross-section of the display 320 among the components of the electronic device 101.

Referring to FIG. 5A, the display 320 may include a display panel 510, a polarization layer (POL) 520, a first adhesive member (OCA1, optical clear adhesive (OCA)) 530, a dielectric layer 540, a second adhesive member 550 (OCA2), or a window 560 (e.g., ultra-thin glass (UTG)) or a polymer (e.g., polyethylene terephthalate (PET) window). In an embodiment, a flexible printed circuit board (FPCB) 570 may be electrically connected to the display 320.

The display panel 510 may include an organic light emitting diode (OLED) panel, a liquid crystal display (LCD), or a quantum dot light-emitting diodes (QLED) panel. As an example, the display panel 510 may include multiple pixels for displaying an image, and one pixel may include multiple subpixels. In an embodiment, one pixel may include three colors of red subpixels, green subpixels, and blue subpixels. In an embodiment, one pixel may include four colors of a red subpixel, a green subpixel, a blue subpixel, and a white subpixel. In an embodiment, one pixel may be formed in an RGBG pentile method including one red subpixel, two green subpixels, and one blue subpixel.

According to various embodiments, the display 320 may include a control circuit (not shown). According to an embodiment, the control circuit may include a printed circuit board and a display driver IC (DDI). According to an embodiment, the display 320 may include a touch display driver IC (TDDI) for driving multiple touch patterns.

In an embodiment, the display 320 may include at least one sensor (e.g., the sensor module 176 in FIG. 1) disposed around a control circuit. As an example, the sensor may be disposed at a lower end portion of the display 320 (e.g., the lower end portion 326 in FIGS. 3 and 4). For example, the sensor may include a fingerprint sensor. The sensor is not limited thereto and may include an iris sensor or an illuminance sensor.

In an embodiment, a polarization layer 520 may include a pressure sensitive adhesive (PSA) and have a thickness of about 90 μm to about 110 μm. The first adhesive member 530 may have a thickness of about 135 μm to about 165 μm. The dielectric layer 540 may have a thickness of about 35 μm to about 45 μm. The second adhesive member 550 may have a thickness of about 135 μm to about 165 μm. The window 560 may have a thickness of about 450 μm to about 550 μm.

In an embodiment, the pressure sensitive adhesive (PSA) may be disposed between the display panel 510 and the polarization layer 520 to attach the display panel 510 to the polarization layer 520. The first adhesive member 530 (OCA1) may be disposed between the polarization layer 520 and the dielectric layer 540 to attach the polarization layer 520 to the dielectric layer 540. The second adhesive member 550 (OCA2) may be disposed between the dielectric layer 540 and the window 560 to attach the dielectric layer 540 to the window 560. For example, the first adhesive member 530 and the second adhesive member 550 may include adhesive (OCA), pressure sensitive adhesive (PSA), heat-reactive adhesive, general adhesive, or double-sided tape.

The display 320 may be formed to have a lateral portion (e.g., the lateral portion 322 in FIGS. 3 and 4) having a curvature. A touch sensor 544 (e.g., a touch pattern) may be disposed on the display 320 to sense a user's touch. In an embodiment, at least one antenna structure 542 may be disposed on the lateral portion (e.g., the lateral portion 322 in FIGS. 3 and 4) of the display 320. In an embodiment, the touch sensor 544 and the antenna structure 542 may be formed on the dielectric layer 540.

Figure 5B:
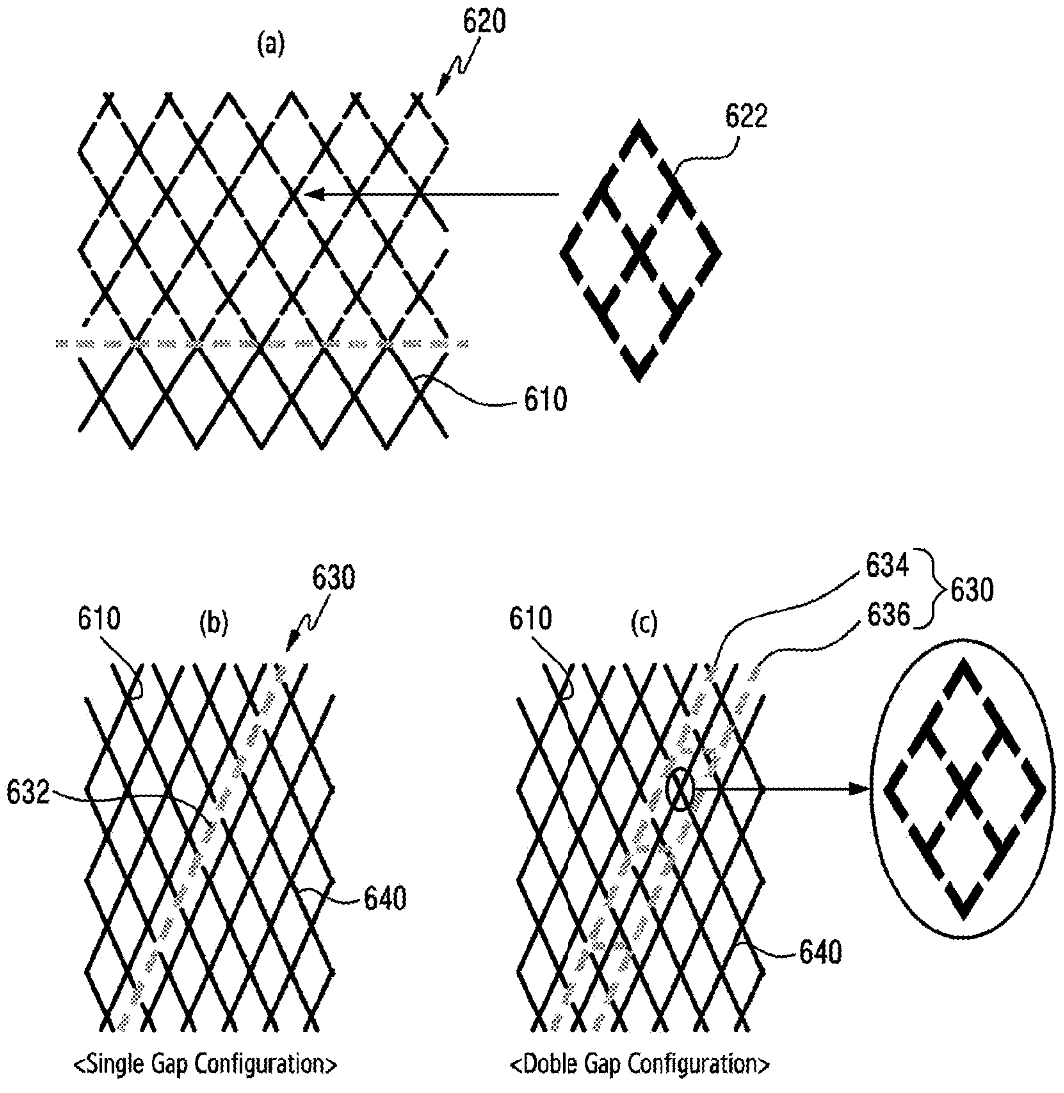
FIG. 5B is a diagram illustrating an example of forming the antenna shown in FIG. 5A according to various embodiments.
Figure 5C:
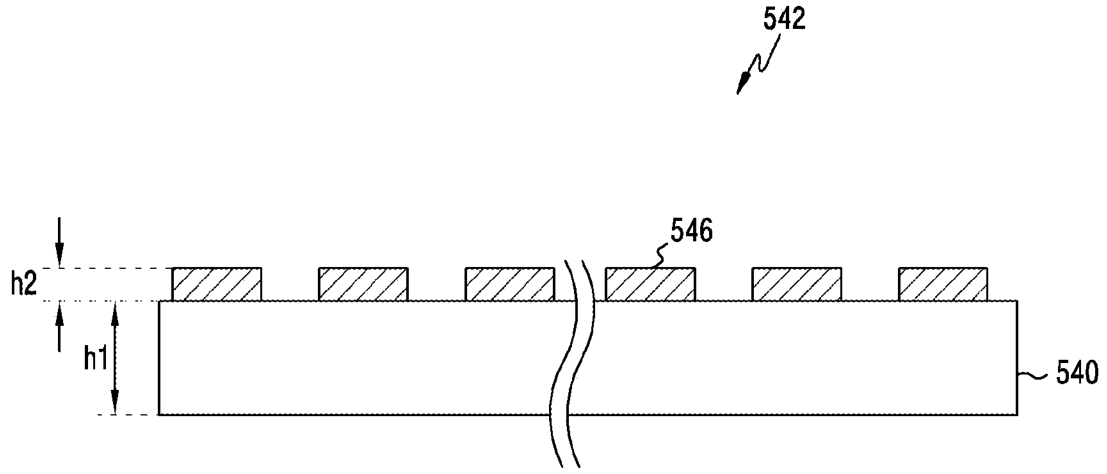
FIG. 5C is a diagram illustrating example conductive mesh lines formed on a dielectric layer according to various embodiments.

In an embodiment, the dielectric layer 540 may include a conductive mesh line 546 (refer, e.g., to FIG. 5C). A mesh pattern may be formed on the dielectric layer 540. For example, the mesh pattern may be formed by the multiple conductive mesh lines 546. In an embodiment, the antenna pattern 610 and/or the touch pattern 640 may be formed using the conductive mesh line 546.

In an embodiment, the antenna structure 542 (e.g., the antenna structure 542 in FIG. 5A) may include at least one monopole antenna (e.g., the first antenna 810 in FIG. 8A), at least one dipole antenna (e.g., the second antenna 820 in FIG. 8A), at least one parallel plate waveguide antenna (hereinafter referred to as a parallel antenna) (e.g., the third antenna 830 in FIG. 8A), and/or at least one tapered slot antenna (e.g., the fourth antenna 840 in FIG. 8A).

According to an embodiment, the antenna structure 542 may include multiple antennas each having horizontal polarization or vertical polarization characteristics. For example, a first antenna (e.g., the first antenna 810 in FIG. 8A) (e.g., a monopole antenna) or a third antenna (e.g., the third antenna 830 in FIG. 8A) (e.g., a parallel antenna) may have vertical polarization characteristics. As another example, a second antenna (e.g., the second antenna 820 in FIG. 8A) (e.g., a dipole antenna) or a fourth antenna (e.g., the fourth antenna 840 in FIG. 8A) (e.g., a tapered slot antenna) may have horizontal polarization characteristics. However, the polarization characteristics of the multiple antennas included in the antenna structure 542 are not limited to the above example.

In an embodiment, when power supply of an antenna (e.g., the antenna 542 a in FIG. 5A and the first to fourth antennas 810, 820, 830, and 840 in FIG. 8A) formed on the dielectric layer 540 is located on a lateral portion (e.g., the lateral portion 322 in FIGS. 3 and 4) of the display 320, the FPCB 570 may be located adjacent to the lateral portion 322 of the display 320. The FPCB 570 may be electrically connected to the antenna. For example, when multiple antennas are provided, the FPCB 570 may include multiple lines (e.g., the first lines L1 and the second lines L2 in FIG. 8A) for connecting the antennas.

In an embodiment, the display 320 may include a first area (e.g., the front surface 324), a second area (A) 501, a third area (B) 502, and a fourth area (D) 504. The first area may correspond to the front surface 324 of the display 320. The second area (A) 501 and the third area (B) 502 may correspond to the lateral portion 322 of the display 320. The fourth area (D) 504 may include a feed area (C) 503. The second area (A) 501, the third area (B) 502, and the fourth area (D) 504 may be disposed on the side surface of the display 320. An FPCB 570 as a transmission area may be disposed in the fourth area (D) 504. The first area (e.g., the front surface 324), the second area (A) 501, and the third area (B) 502 may display a screen (e.g., a display area), and the fourth area (D) 504 may not display a screen (e.g., a non-display area).

As an example, the antenna structure 542 may be located on a side surface (e.g., the lateral portion 322 in FIGS. 3 and 4) of the display 320.

Referring to FIG. 5A, when the antenna structure 542 includes a parallel antenna (e.g., the third antenna 830 in FIG. 8A), the antenna structure 542 may radiate radio waves having horizontal polarization characteristics toward the front surface 324 of the electronic device, for example, in the direction in which the display 320 faces (e.g., the +Y axis direction).

As an example, when the antenna structure 542 includes a dipole antenna (e.g., the second antenna 820 in FIG. 8A), the display ground or shielding layer included in the display 320 may be a rear reflector. The dipole antenna may radiate radio waves in the lateral direction (e.g., the −X axis and X axis directions in FIGS. 3 and 4) of an electronic device (e.g., the electronic device 101 in FIGS. 3 and 4). The dipole antenna may radiate radio waves having horizontal polarization characteristics in the lateral direction.

Figure 5D:
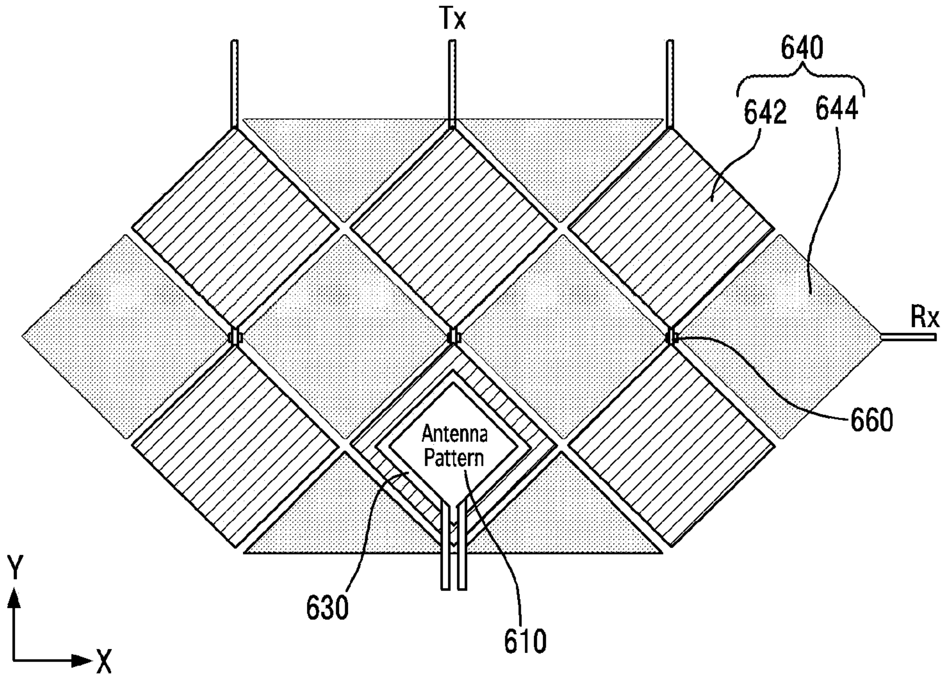
FIG. 5D is a diagram illustrating a touch pattern and an antenna pattern formed on a dielectric layer according to various embodiments.

FIG. 5B is a diagram illustrating an example of forming an antenna 542*a* shown in FIG. 5A according to various embodiments. FIG. 5C is a diagram illustrating a conductive mesh line 546 formed on the dielectric layer 540 according to various embodiments. FIG. 5D is a diagram illustrating a touch pattern 640 and an antenna pattern 610 formed on the dielectric layer 540 according to various embodiments.

Referring to FIGS. 5B, 5C and 5D (which may be referred to as FIGS. 5B to 5D), the conductive mesh line 546 may be disposed on the dielectric layer 540 (or a dielectric). As another example, the conductive mesh line 546 may be disposed inside the dielectric layer 540. The dielectric layer 540 may have, for example, a thickness (h1) of about 40 μm. The conductive mesh line 546 may be made of a metal material (e.g., silver (Ag), silver-alloy (Ag-alloy), aluminum (Al), aluminum-alloy (Al-alloy), copper (Cu), or copper-alloy (Cu-alloy)) having high conductivity. The conductive mesh line 546 may have a thickness (h2) of about 0.2 to about 0.3 μm. A touch pattern 640 and an antenna pattern 610 may be formed by the conductive mesh line.

Referring to FIGS. 3 and 4, the multiple touch patterns 640 may be disposed on the front surface 324 and the lateral portion 322 of the display 320. The multiple antenna patterns 610 may be disposed on the lateral portion 322 of the display 320.

In an embodiment, the conductive mesh line 546 for forming the touch pattern 640 and the antenna pattern 610 may be formed in a long rhombus shape in the vertical direction (e.g., the Y axis direction). The conductive mesh line 546 for forming the touch pattern 640 and the antenna pattern 610 is not limited to the description above, and may be formed in a rectangle shape, a rhombus shape, a rhombus shape long in the vertical direction (e.g., the Y axis direction), a rhombus shape long in the horizontal direction (e.g., the X axis direction), a hexagon shape, and a rhombus shape long in the horizontal direction (e.g., the X axis direction).

In an embodiment, the multiple touch patterns 640 may include multiple transmission patterns 642 (Tx) and multiple reception patterns 644 (Rx). For example, the multiple transmission patterns 642 (Tx) may be arranged in a first direction (e.g., the Y axis direction), and the multiple reception patterns 644 (Rx) may be arranged in a second direction (e.g., the X axis direction). However, it is not limited thereto, and the multiple reception patterns 644 (Rx) may be arranged in the first direction (e.g., the Y axis direction), and the multiple transmission patterns 642 (Tx) may be arranged in the second direction (e.g., the X axis direction).

In an embodiment, the plurality of transmission patterns 642 (Tx) may be directly connected to each other or be electrically connected to each other through a conductive line. As an example, the multiple reception patterns 644 (Rx) may be electrically connected to each other through a bridge structure (e.g., the bridge structure 660 in FIG. 5E).

In an embodiment, as shown in FIG. 5C during the manufacturing process, the conductive mesh line 546 may be formed on the dielectric layer 540 and the conductive mesh line 546 may be patterned to form a touch pattern (e.g., the touch pattern 640 and/or the antenna pattern 610 in FIG. 5D). The touch pattern 640 may be formed on the front surface 324 and the lateral portion 322 of a display panel 510, and the antenna pattern 610 may be formed on the side surface of the display panel 510.

As illustrated in FIG. 5B, the touch pattern 640 and/or the antenna pattern 610 may be formed by patterning some of the conductive mesh lines 546. A segmentation portion 630 may be formed between the touch pattern 640 and the antenna pattern 610 so that the touch pattern 640 and the antenna pattern 610 may be segmented from each other.

As an example, a floating area 622 formed by segmenting the conductive mesh lines 546 may be formed on the upper portion 620 of the antenna pattern 610. The upper portion 620 of the antenna pattern 610 may be insulated from the surrounding touch patterns 640 by the floating area 622. As an example, the segmentation portion 630 may have one gap 632 formed in a single gap manner so that the touch pattern 640 and the antenna pattern 610 are segmented from each other. As an example, the segmentation unit 630 may have a first gap 634 and a second gap 636 formed in a double gap manner so that the touch pattern 640 and the antenna pattern 610 are segmented from each other.

Referring to FIG. 5D, as an example, the antenna pattern 610 may be located on the touch pattern 640. For example, the antenna pattern 610 may be formed by segmenting the conductive mesh line 546 included in one of the multiple transmission patterns 642 (Tx). The antenna pattern 610 may be segmented from one of the multiple transmission patterns 642 (Tx) through the segmentation portion 630. As another example, the antenna pattern 610 may be formed by segmenting the conductive mesh line 546 included in one of the multiple reception patterns 644 (Rx).

Figure 5E:
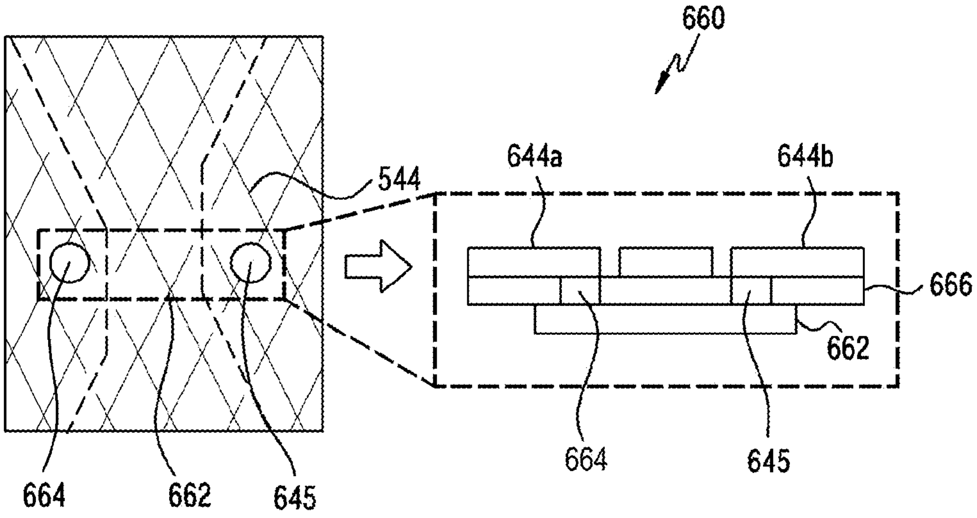
FIG. 5E is a diagram illustrating an example of a bridge structure of a touch pattern according to various embodiments.

FIG. 5E is a diagram illustrating an example of the bridge structure 660 of a touch pattern according to various embodiments.

Referring to FIG. 5E, the first reception pattern 644*a* and the second reception patterns 644*b* adjacent to each other may be electrically connected through the bridge structure 660. The bridge structure 660 may include a bridge line 662, a first contact 664, a second contact 645, and/or an insulation layer 666. As an example, the insulation layer 666 may be included in the dielectric layer 540. The first reception pattern 644*a* and the second reception pattern 644*b* may be separated from the bridge line 662 with the insulation layer 666 interposed therebetween. The first reception pattern 644*a* may be electrically connected to the bridge line 662 through the first contact 664, and the second reception pattern 644*b* may be electrically connected to the bridge line 662 through the second contact 645. Through this, the first reception pattern 644*a* and the second reception pattern 644*b* adjacent to each other may be electrically connected.

Figure 6A:
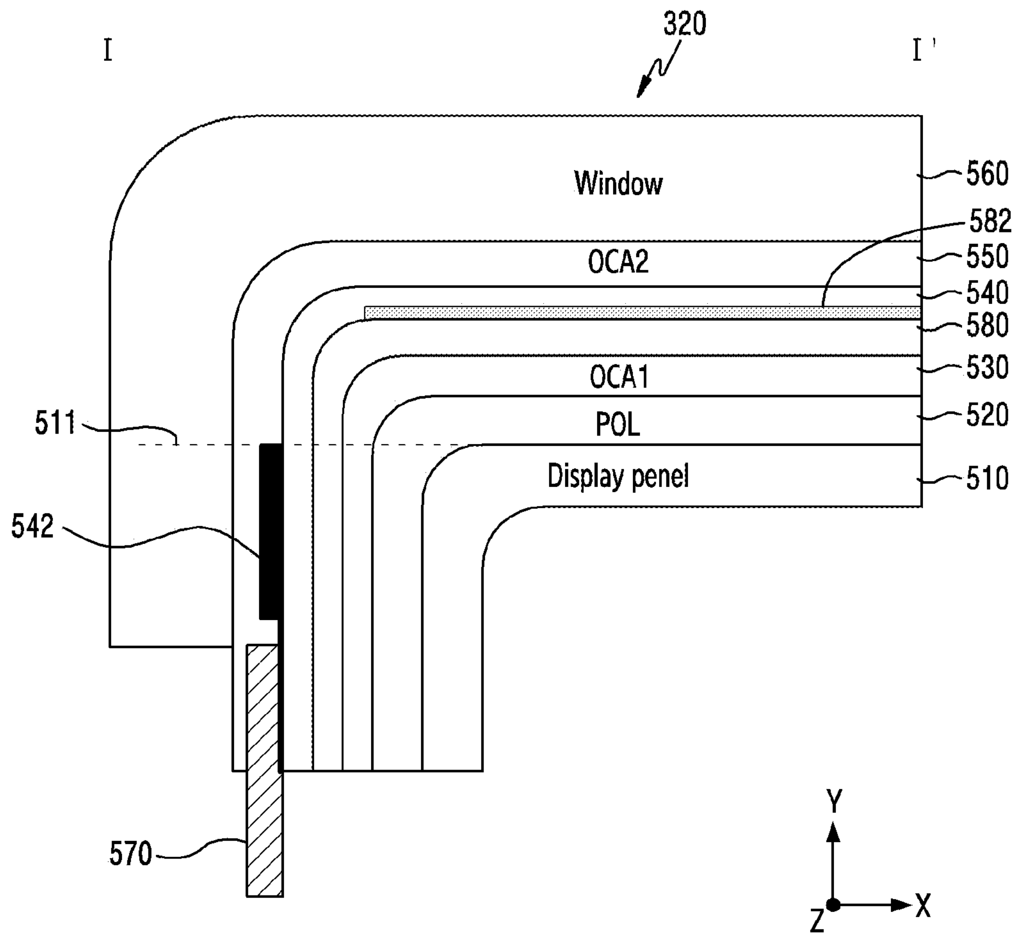
FIG. 6A is a cross-sectional view of an electronic device according to various embodiments.

FIG. 6A is a cross-sectional view of an electronic device according to various embodiments. In describing the display 320 in FIG. 6A, a description of substantially the same configuration as that of the display 320 in FIG. 5A may not be repeated.

Referring to FIG. 6A, the display 320 may include a display panel 510, a polarization layer 520, a first adhesive member 530 (optical clear adhesive (OAC)), a dielectric layer 540, and a second adhesive member 550, a window 560 (e.g., ultra-thin glass (UTG) or a polymer (e.g., a polyethylene terephthalate (PET) window)), and/or a touch layer 580. In an embodiment, a flexible printed circuit board (FPCB) 570 may be electrically connected to the display 320.

In an embodiment, the display 320 may be formed to have a lateral portion (e.g., the lateral portion 322 in FIGS. 3 and 4) having a curvature. A touch sensor 582 may be disposed on a front surface (e.g., a surface on which a screen is displayed, or a surface facing the +Y axis direction, the front surface 324 in FIG. 4) and/or the lateral portion (e.g., the lateral portion 322 in FIGS. 3 and 4) of the display 320 to sense a user's touch. As another example, an antenna structure 542 may be located on the lateral portion (e.g., the lateral portion 322 in FIGS. 3 and 4) of the display 320. The antenna structure 542 may be formed in the dielectric layer 540. In an embodiment, the antenna structure 542 may be disposed at substantially the same height as the extension line 511 from the upper surface of the display panel 510 or be disposed lower than the extension line 511 from the upper surface of the display panel 510.

In an embodiment, the dielectric layer 540 may include a conductive mesh line (e.g., the conductive mesh line 546 in FIG. 5C). A mesh pattern may be formed on the dielectric layer 540. For example, the mesh pattern may be formed by multiple conductive mesh lines (e.g., the conductive mesh lines 546 in FIG. 5C). In an embodiment, an antenna pattern (e.g., the antenna pattern 610 in FIG. 5B) may be formed using the multiple conductive mesh lines (e.g., the conductive mesh lines 546 in FIG. 5C).

In an embodiment, the touch layer 580 may be disposed between the dielectric layer 540 and the first adhesive member 530. A touch sensor 582 may be disposed on the touch layer 580. The touch sensor 582 may be formed of multiple touch patterns (e.g., the touch pattern 640 in FIG. 5D). In FIG. 6A, the touch layer 580 is shown as being located under the dielectric layer 540, but the positions of the touch layer 580 and the dielectric layer 540 may be interchanged. The dielectric layer 540 may be positioned under the touch layer 580. According to an embodiment, when the touch pattern (e.g., the touch pattern 640 in FIG. 5D) is implemented using multiple conductive mesh lines formed on the dielectric layer 540, the touch layer 580 may be omitted.

Figure 6B:
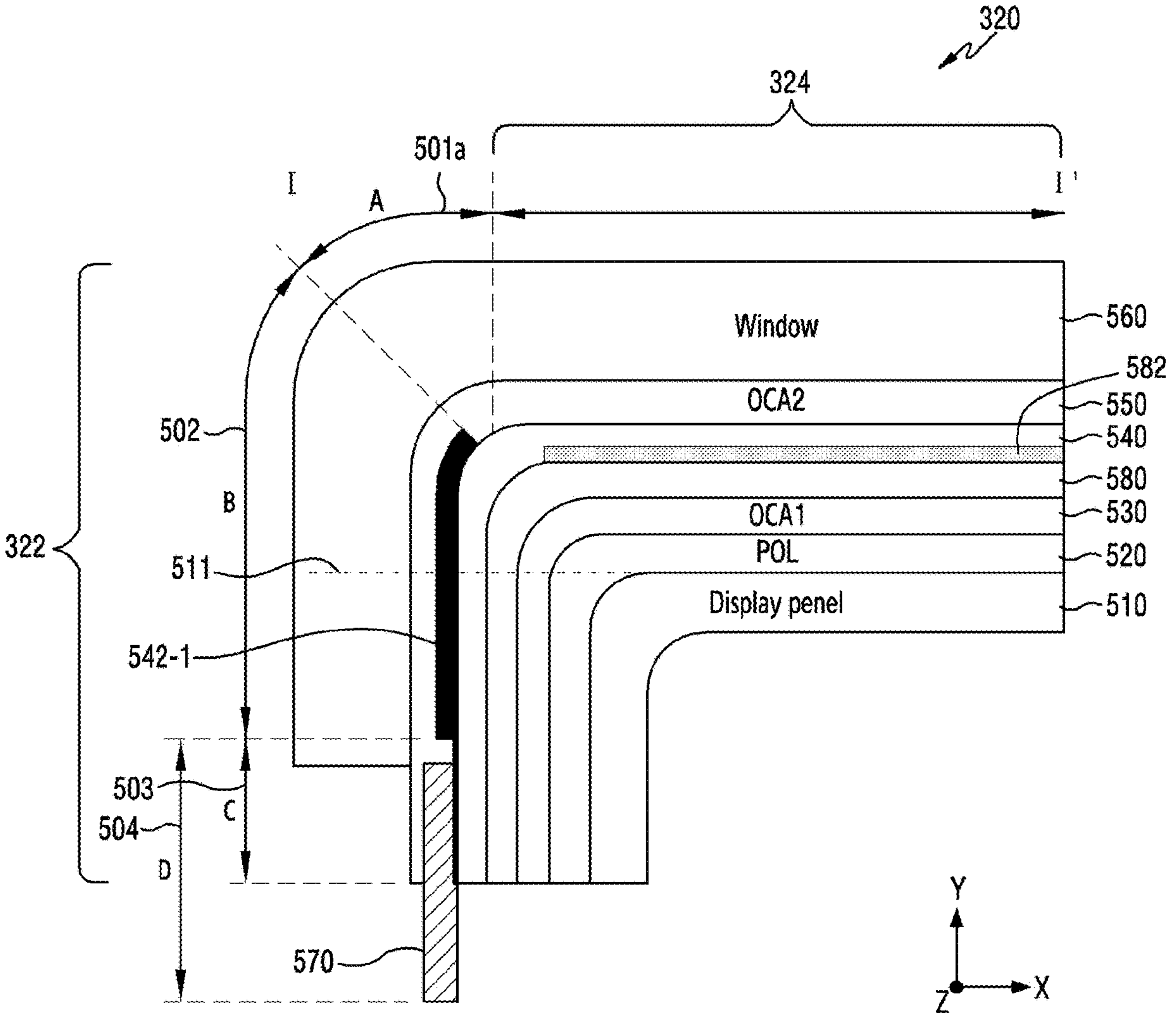
FIG. 6B is a cross-sectional view of an electronic device according to various embodiments.

FIG. 6B is a cross-sectional view of an electronic device according to various embodiments. In describing the display 320 in FIG. 6B, a description of substantially the same configuration as that of the display 320 in FIG. 5A may not be repeated.

Referring to FIG. 6B, the display 320 may be formed to have a lateral portion (e.g., the lateral portion 322 in FIGS. 3 and 4) having a curvature. A touch sensor 582 may be disposed on a front surface (e.g., a surface on which a screen is displayed, or a surface facing the +Y axis direction, the front surface 324 in FIG. 4) and/or the lateral portion (e.g., the lateral portion 322 in FIGS. 3 and 4) of the display 320 to sense a user's touch. As another example, an antenna structure 542-1 may be located on the lateral portion (e.g., the lateral portion 322 in FIGS. 3 and 4) of the display 320. The antenna structure 542-1 may be formed on the dielectric layer 540. The touch sensor 582 may be formed on the touch layer 580. According to an embodiment, when a touch pattern (e.g., the touch pattern 640 in FIG. 5D) is implemented using multiple conductive mesh lines formed on the dielectric layer 540, the touch layer 580 may be omitted.

Figure 7A:
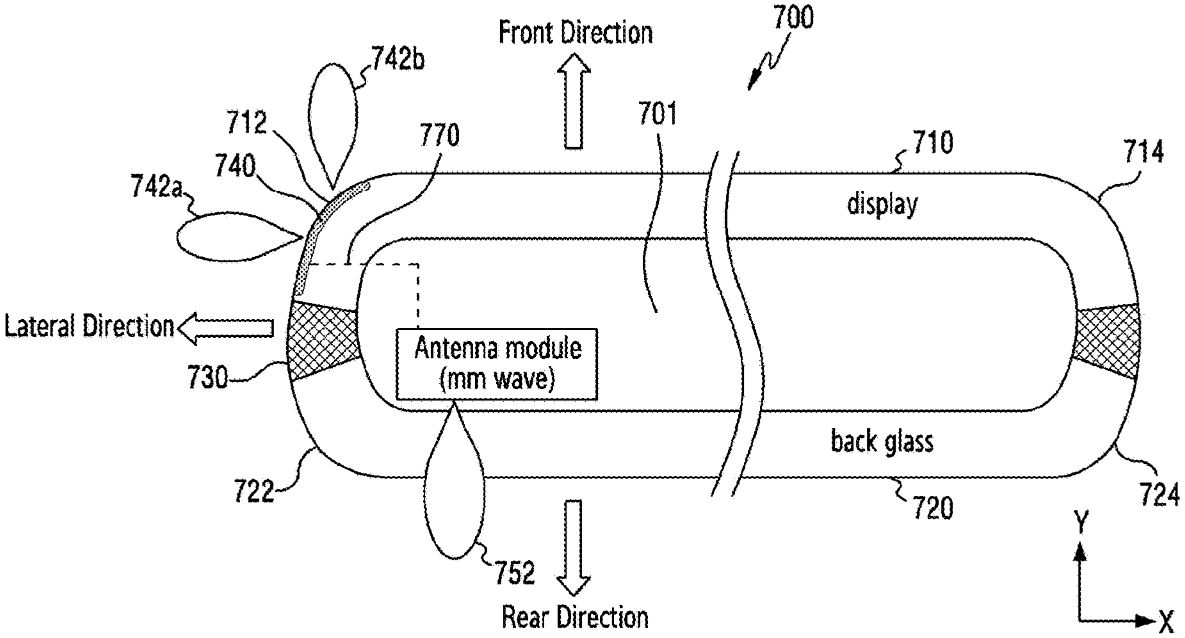
FIG. 7A is a cross-sectional view of an electronic device including an antenna according to various embodiments.
Figure 8A:
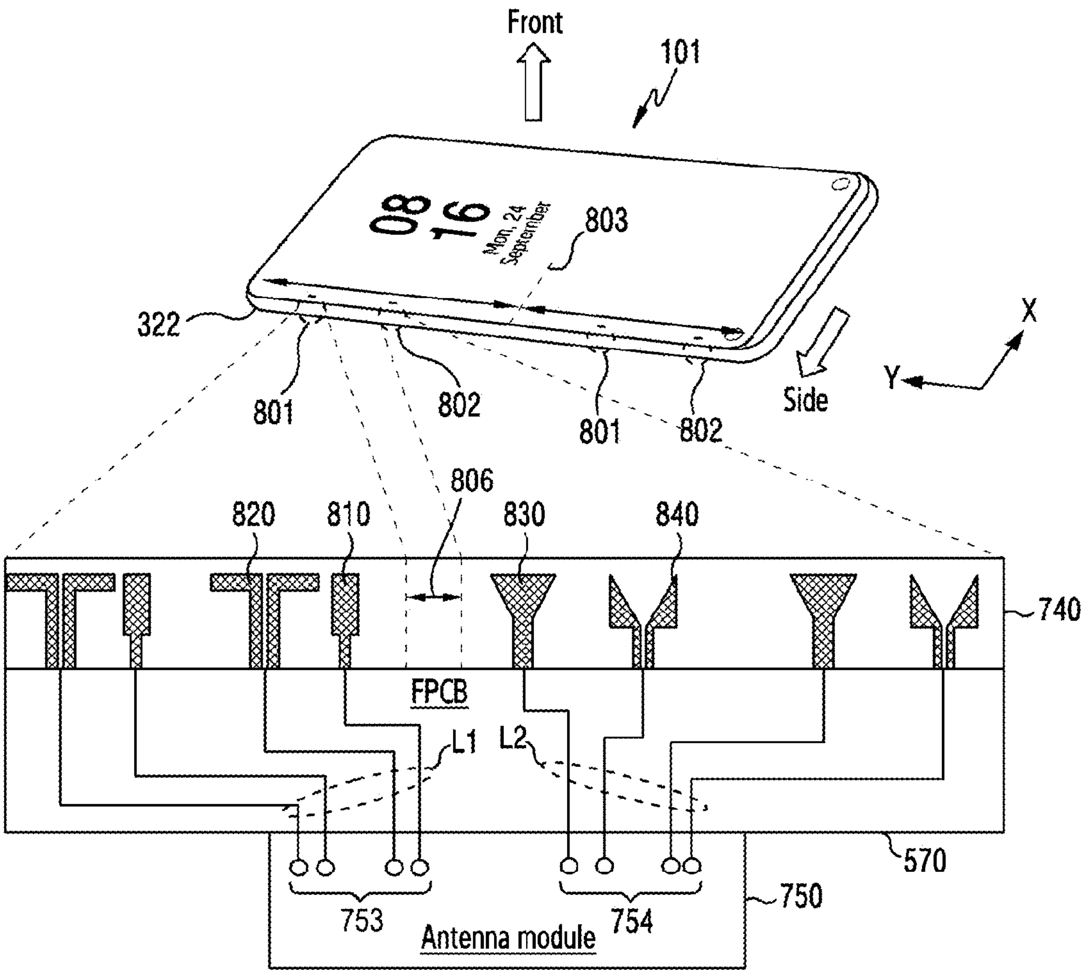
FIG. 8A is a diagram illustrating an example in which an antenna is disposed on a lateral portion of an electronic device according to various embodiments.

In an embodiment, the antenna structure 542-1 (e.g., the first antenna structure 740 in FIG. 7A) may include at least one monopole antenna (e.g., the monopole antenna 810 in FIG. 8A), at least one dipole antenna (e.g., the dipole antenna 820 in FIG. 8A), at least one parallel antenna (e.g., the parallel antenna 830 in FIG. 8A), and/or at least one tapered slot antenna (e.g., the tapered slot antenna in FIG. 8A). For example, the monopole antenna or the parallel antenna may have vertical polarization characteristics. As another example, the dipole antenna or the tapered slot antenna may have horizontal polarization characteristics.

In an embodiment, the display 320 may include a first area (e.g., the front surface 324), a second area (A) 501*a*, a third area (B) 502, and a fourth area (D) 504. The first area may correspond to the front surface 324 of the display 320. The second area (A) 501 is a curved area and may be located between the front surface 324 and the lateral portion 322 of the display 320. The third area (B) 502 may correspond to the lateral portion 322 of the display 320. The fourth area (D) 504 may include a feed area (C) 503. The second area (A) 501, the third area (B) 502, and the fourth area (D) 504 may be disposed on the side surface of the display 320. An FPCB 570 a transmission area may be disposed in the fourth area 504. The first area (e.g., the front surface 324), the second area (A) 501, and the third area (B) 502 may display a screen (e.g., a display area), and the fourth area (D) 504 may not display a screen (e.g., a non-display area).

As an example, the second area (A) 501*a* (e.g., a curved area) may include a floating area (e.g., the floating area 622 in FIG. 5B) formed by segmenting conductive mesh lines (e.g., the conductive mesh lines 546 in FIG. 5B).

As an example, the antenna structure 542-1 may be located on a side surface (e.g., the lateral portion 322 in FIGS. 3 and 4) of the display 320. The antenna structure 542-1 may be disposed higher than the extension line 511 from the upper surface of the display panel 510. In the Y axis direction, the antenna structure 542-1 may be arranged to correspond to the entire lateral area (B) 502.

As an example, when the antenna structure 542-1 includes a parallel antenna (e.g., the third antenna 830 and the fourth antenna 840 in FIG. 8A), radio waves may be radiated in the front direction of the display 320. When the antenna structure 542-1 includes the third antenna 830 and the fourth antenna 840, radio waves may be radiated in the front direction (e.g., the +Y axis direction) of the display 320 from the end of the antenna structure 542-1 to the second area (A) 501*a* (e.g., a curved area) using the floating area (e.g., the floating area 622 in FIG. 5B).

FIG. 7A is a cross-sectional view of an electronic device 700 including a first antenna structure 740 according to various embodiments. The electronic device 700 in FIG. 7A may correspond to the electronic device 101 in FIGS. 1 and 3.

Referring to FIGS. 3 and 7A, an electronic device 700 (e.g., the electronic device 101 in FIG. 1 or the electronic device 101 in FIG. 3) may include a display 710 (e.g., the display device in FIG. 1 or the display 320 in FIG. 3), a rear cover 720, a lateral member 730 (e.g., the side surface 310*a* in FIG. 3), a first antenna structure 740, an antenna module 750, and/or a conductive connection member 770. For example, the conductive connection member 770 may include an FPCB or a coaxial cable. As an example, the housing (e.g., the housing 310 in FIG. 3) of the electronic device 700 may include the rear cover 720 or the side member 730. For example, the rear cover 720 or the side member 730 may include metal, polymer, or glass. The rear cover 720 may be disposed under the display 710, and the side member 730 may be disposed between the display 710 and the rear cover 720. An inner space 701 may be formed by the rear cover 720 and the side member 730, and the antenna module 750 may be disposed in the inner space 701.

In an embodiment, the display 710 may include a front surface (e.g., a surface facing the +Y axis) and a lateral portion (e.g., the lateral portion 322 in FIGS. 3 and 4), and the lateral portion 322 may have a predetermined (e.g., specified) curvature. A screen may be displayed not only on the front side of the display 710 but also on the lateral portion 322 of the display 710. As an example, the lateral portion may include at least a portion of the display 710, at least a portion of the lateral member 730, or at least a portion of the rear cover 720. For example, the lateral portion may include a first side surface 712 of the display 710, a second side surface 714 of the display 710, a first side surface 722 of the rear cover 720, or a second side surface of the rear cover 720.

In an embodiment, the first antenna structure 740 may be disposed on the lateral portion 322 of the electronic device (e.g., the electronic device 101 in FIG. 3). The first antenna structure 740 may be disposed on the first side surface 712 of the display 710 among the two side surfaces 712 and 714 of the display 710 (e.g., the electronic device 101 in FIG. 3). The rear cover 720 may have two side surfaces 722 and 724, and the antenna structure may not be disposed on the rear cover 720.

In an embodiment, the first antenna structure 740 may include at least one antenna (e.g., the antennas 810, 820, 830, and 840 in FIG. 8A). As another example, the first antenna structure 740 may include at least one antenna array including multiple antennas.

In an embodiment, the first antenna structure 740 may include multiple antennas having different types (e.g., a first-type antenna and a second-type antenna, or the antenna structure 542 in FIG. 5A) and radiate a millimeter wave signal in the front direction and/or the lateral direction. For example, the millimeter wave signal may include a signal having a frequency of about 20 GHz or higher. The multiple antennas (e.g., the first-type antenna and the second-type antenna) may have different radiation characteristics (e.g., radiation direction and beam pattern direction) of the millimeter wave signal. As another example, the antenna module 750 (e.g., the third antenna module 246 in FIG. 2) may include multiple antennas. The antenna module 750 may radiate a millimeter wave signal to the rear surface (e.g., in the −Y axis direction) of the electronic device 700 through a plurality of antennas.

In an embodiment, the first antenna structure 740 and the antenna module 750 may be electrically connected to each other through the conductive connection member 770. As another example, the first antenna structure 740 may be included in the antenna module 750. As another example, the first antenna structure 740 may be electrically connected to another antenna module (e.g., the third antenna module 246 in FIG. 2) other than the antenna module 750 included in the electronic device 700 or to a wireless communication circuit (e.g., a second communication processor 214 in FIG. 2). The first antenna structure 740 may include an antenna array formed of multiple antenna patterns (e.g., the antenna pattern 610 in FIG. 5D). As an example, the antenna array may include multiple antenna patterns supporting the same polarization (e.g., horizontal polarization or vertical polarization). As an example, the antenna array may include multiple antenna patterns supporting different polarizations (e.g., horizontal polarization and vertical polarization). As another example, the antenna array may include antenna patterns having horizontal polarization and vertical polarization. As an embodiment, the first-type antenna may radiate horizontally polarized waves and the second-type antenna may radiate vertically polarized waves. For example, the first-type antenna and the second-type antenna may be alternately disposed, and the types of the alternately disposed first type-antenna and second-type antenna may be different. As another example, the first-type antenna may be disposed in a first area of the first antenna structure 740 and the second-type antenna may be disposed in a second area of the first antenna structure 740 different from the first area.

As an example, the first antenna structure 740 may include at least one first-type antenna (e.g., a side radiation antenna) that emits signals toward the side surface of the electronic device 700. For example, the first-type antenna may include at least one monopole antenna (e.g., the monopole antenna 810 in FIG. 8A) and/or at least one dipole antenna (e.g., the dipole antenna 820 in FIG. 8A). For example, the multiple monopole antennas 810 and/or multiple dipole antennas 820 may be alternately arranged to form at least one antenna array. For example, the multiple monopole antennas 810 alternately arranged with the multiple dipole antennas 820 may form one antenna array, and the multiple dipole antennas 820 may form another antenna array.

As an example, the first antenna structure 740 may include at least one second-type antenna (e.g., a front radiation antenna) that emits signals in a front direction of the electronic device 700. For example, the second-type antenna may include at least one parallel antenna (e.g., the parallel antenna 830 in FIG. 8A) and/or at least one tapered slot antenna (e.g., the tapered slot antenna 840 in FIG. 8A). For example, multiple parallel antennas 830 and/or multiple tapered slot antennas 840 may be alternately disposed to form at least one antenna array. For example, the multiple tapered slot antennas 840 alternately arranged with the multiple parallel antennas 830 may form one antenna array, and the multiple parallel antennas 830 may form another antenna array.

The electronic device 700 may radiate a first millimeter wave signal 742*a* from the first antenna structure 740 in the lateral direction using the first-type antenna, and radiates a second millimeter wave signal 742*a* in a front direction using a type 2 antenna. Signal 742*b* may be radiated. As another example, the electronic device 700 may radiate a third millimeter wave signal 752 in the rear direction using the antenna module 750. For example, the electronic device 700 may secure antenna coverage on at least three surfaces of the electronic device 700 using the first antenna structure 740 and the antenna module 750.

Figure 7B:
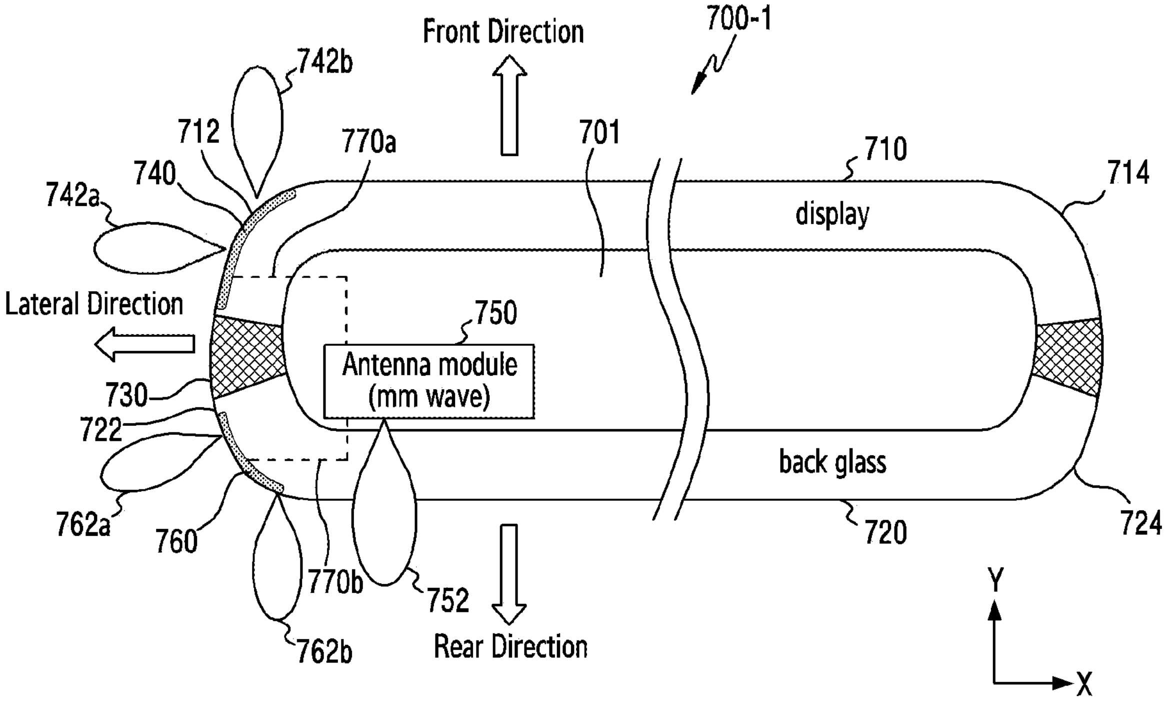
FIG. 7B is a cross-sectional view of an electronic device including multiple antennas according to various embodiments.

FIG. 7B is a cross-sectional view of an electronic device 700-1 including multiple antenna structures 740 and 760 according to various embodiments. In describing the electronic device 700-1 in FIG. 7B, a description of substantially the same configuration as that of the electronic device 700 of FIG. 7A may not be repeated.

Referring to FIG. 7B, the electronic device 700-1 (e.g., the electronic device 101 in FIG. 1 or the electronic device 101 in FIG. 3) may include a display 710 (e.g., the display device in FIG. 1 or the display 320 in FIG. 3), a rear cover 720, a lateral member 730 (e.g., the side surface 310*a* in FIG. 3), multiple antenna structures 740 and 760, an antenna module 750, a first conductive connection member 770*a*, and/or a second conductive connection member 770*b*. In an embodiment, the rear cover 720 may be disposed under the display 710, and the lateral member 730 may be disposed between the display 710 and the rear cover 720. An inner space 701 may be provided by the rear cover 720 and the lateral member 730, and the antenna module 750 may be disposed in the inner space 701.

In an embodiment, the first antenna structure 740 may be disposed on the lateral portion 322 of the display 710 (e.g., the electronic device 101 in FIG. 3). The second antenna structure 760 may be disposed on the lateral portion 722 of the rear cover 720. The first antenna structure 740 and/or the second antenna structure 760 may be disposed on any one of the two lateral portions of the display 710 (e.g., the electronic device 101 in FIG. 3) or any one of the two lateral portions of the rear cover 720.

In an embodiment, the first antenna structure 740 may be formed on any one lateral portion (e.g., the first lateral portion 712 of the display) of the two lateral portions 712 and 714 of the display 710 (e.g., the electronic device 101 in FIG. 3). The second antenna structure 760 may be disposed on one lateral portion (e.g., the second lateral portion 722 of the rear cover) of the two lateral portions 722 and 724 of the rear cover 720.

In an embodiment, the first antenna structure 740 may include multiple antennas having different shapes (e.g., a first-type antenna and a second-type antenna) and radiate millimeter wave signals in the front direction and the lateral direction. As another example, the second antenna structure 760 may include multiple antennas having different shapes (e.g., a first-type antenna and a second-type antenna) and radiate millimeter wave signals in the rear direction and the lateral direction.

In an embodiment, the first antenna structure 740 and the antenna module 750 may be electrically connected through the first conductive connection member 770*a*. The second antenna structure 760 and the antenna module 750 may be electrically connected through the second conductive connection member 770*b*. As another example, the first antenna structure 740 or the second antenna structure 760 may be electrically connected to another antenna module (e.g., the third antenna module 246 in FIG. 2) other than the antenna module 750 included in the electronic device 700-1 or to a wireless communication circuit (e.g., the second communication processor 214 in FIG. 2).

In an embodiment, the first antenna structure 740 and the second antenna structure 760 may include an antenna array formed of multiple antenna patterns (e.g., the antenna pattern 610 in FIG. 5D). As an example, the first antenna structure 740 and the second antenna structure 760 may include at least one first-type antenna (e.g., a lateral radiation antenna). The first-type antenna may include at least one monopole antenna (e.g., the monopole antenna 810 in FIG. 8A) and/or at least one dipole antenna (e.g., the dipole antenna 820 in FIG. 8A). For example, the multiple monopole antennas 810 and/or multiple dipole antennas 820 may be alternately arranged to form at least one antenna array.

As an example, the first antenna structure 740 and the second antenna structure 760 may include at least one second-type antenna (e.g., a front radiation antenna). The second-type antenna may include at least one parallel antenna (e.g., the parallel antenna 830 in FIG. 8A) and/or at least one tapered slot antenna (e.g., the tapered slot antenna 840 in FIG. 8A). For example, the multiple parallel antennas 830 and/or the multiple tapered slot antennas 840 may be alternately arranged to form an antenna array.

As an example, the electronic device 700-1 may radiate a first millimeter wave signal 742*a* in the lateral direction (e.g., the −X axis direction) of the electronic device 700-1 using the first-type antenna of the first antenna structure 740. The electronic device 700-1 may radiate a second millimeter wave signal 742*b* in the front direction (e.g., the Y axis direction) of the electronic device 700-1 using the second-type antenna of the first antenna structure 740. The electronic device 700-1 may radiate a fourth millimeter wave signal 762*a* toward the side surface of the electronic device 700-1 using the first-type antenna of the second antenna structure 760. The electronic device 700-1 may radiate the fifth millimeter wave signal 762*b* in the rear direction of the electronic device 700-1 using the second-type antenna of the second antenna structure 760. As another example, the electronic device 700-1 may radiate a millimeter wave signal 752 in the rear direction from the antenna module 750. For example, the electronic device 700-1 may secure antenna coverage with respect to at least three directions of the electronic device 700-1 using the first antenna structure 740, the second antenna structure 760, or the antenna module 750.

Figure 7C:
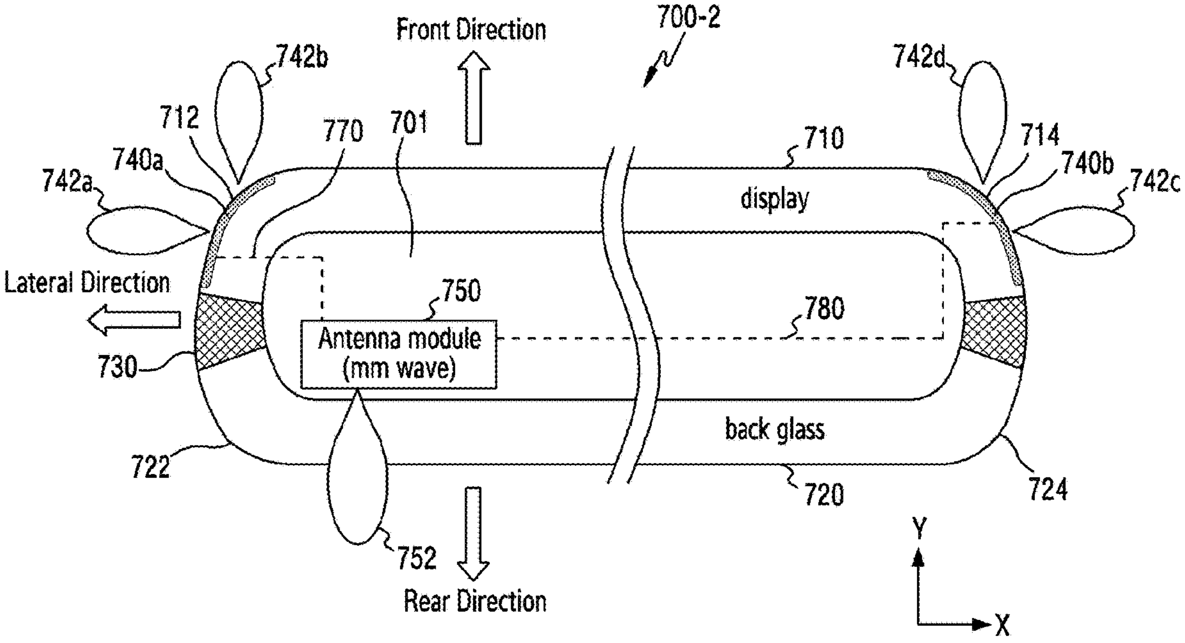
FIG. 7C is a cross-sectional view of an electronic device including multiple antennas according to various embodiments.

FIG. 7C is a cross-sectional view of an electronic device 700-2 including multiple antenna structures 740*a* and 740*b* according to various embodiments. In describing the electronic device 700-2 in FIG. 7C, a description of substantially the same configuration as that of the electronic device 700 in FIG. 7A may not be repeated.

Referring to FIG. 7C, the electronic device 700-2 (e.g., the electronic device 101 in FIG. 1 or the electronic device 101 in FIG. 3) may include a display 710 (e.g., the display device in FIG. 1 or the display 320 in FIG. 3), a rear cover 720, a lateral member 730 (e.g., the housing 310 in FIG. 3), multiple antenna structures 740*a* and 740*b*, an antenna module 750, a first conductive connection member 770, and/or a second conductive connection member 780. In an embodiment, the rear cover 720 may be disposed under the display 710, and the lateral member 730 may be disposed between the display 710 and the rear cover 720. An inner space 701 may be provided by the rear cover 720 and the lateral member 730, and the antenna module 750 may be disposed in the inner space 701.

As an example, the antenna structures 740*a* and 740*b* may be disposed on two lateral portions (e.g., the lateral portion 322 in FIGS. 3 and 4) of the display 710. As an example, the first antenna structure 740*a* may be disposed on one side (e.g., the left lateral portion in FIG. 7C) of the lateral portions 322 of the display 710. The second antenna structure 740*b* may be disposed on the other side (e.g., the right lateral portion in FIG. 7C) of the lateral portions 322. As an example, when the front surface of the electronic device 700-2 is disposed facing upward (e.g., in the +Y axis direction), the first antenna structure 740*a* may be disposed on the left lateral portion (e.g., the lateral portion facing the −X axis direction) of the electronic device 700-2. When the front surface of the electronic device 700-2 is disposed facing upward, the second antenna structure 740*b* may be disposed on the right lateral portion (e.g., the lateral portion facing the +X axis direction) of the electronic device 700-2.

In an embodiment, the second antenna structure 740*a* may be formed on a first lateral portion 712 of the display among the two lateral portions 712 and 714 of the display 710 (e.g., the electronic device 101 in FIG. 3). The second antenna structure 740*b* may be disposed on a second lateral portion 714 of the display among the two lateral portions 712 and 714 of display 710 (e.g., the electronic device 101 in FIG. 3). The antenna structure may not be disposed on the two lateral portions 722 and 724 of the rear cover 720.

In an embodiment, the first antenna structure 740*a* may include multiple antennas having different shapes (e.g., a first-type antenna and a second-type antenna) and radiate millimeter wave signals 742*a* and 724*b* in the front direction (e.g., the +Y axis direction) and/or the lateral direction (e.g., the left lateral direction of the electronic device 700-2, the −X axis direction). The second antenna structure 760 may include multiple antennas having different shapes (e.g., a first-type antenna and a second-type antenna) and radiate millimeter wave signals 742*c* and 742*d* in the front direction and the lateral direction (e.g., the right lateral direction of the electronic device 700-2, the +X axis direction).

In an embodiment, the first antenna structure 740*a* and the antenna module 750 may be electrically connected through the first conductive connection member 770. The second antenna structure 740*b* and the antenna module 750 may be electrically connected through the second conductive connection member 780. As another example, the first antenna structure 740*a* or the second antenna structure 740*b* may be electrically connected to another antenna module (e.g., the third antenna module 246 in FIG. 2) other than the antenna module 750 included in the electronic device 700-2 or to a wireless communication circuit (e.g., the second communication processor 214 in FIG. 2).

In an embodiment, the first antenna structure 740*a* and the second antenna structure 740*b* may include an antenna array formed of multiple antenna patterns (e.g., the antenna pattern 610 in FIG. 5D). As an example, the first antenna structure 740*a* and the second antenna structure 740*b* may include at least one first-type antenna (e.g., a lateral radiation antenna). In an embodiment, the first-type antenna may include at least one monopole antenna (e.g., the monopole antenna 810 in FIG. 8A) and/or at least one dipole antenna (e.g., the dipole antenna 820 in FIG. 8A). For example, the multiple monopole antennas 810 and/or multiple dipole antennas 820 may be alternately arranged to form at least one antenna array.

As an example, the first antenna structure 740*a* and the second antenna structure 740*b* may include at least one second-type antenna (e.g., a front radiation antenna). In an embodiment, the second-type antenna may include at least one parallel antenna (e.g., the parallel antenna 830 in FIG. 8A) and/or at least one tapered slot antenna (e.g., the tapered slot antenna 840 in FIG. 8A). For example, the multiple parallel antennas 830 and/or the multiple tapered slot antennas 840 may be alternately arranged to form at least one antenna array.

In an embodiment, the electronic device 700-2 may radiate the first millimeter wave signal 742*a* in a lateral direction (e.g., the −X-axis direction) using the first-type antenna included in the first antenna structure 740*a*. The electronic device 700-2 may radiate the second millimeter wave signal 742*b* in the front direction (e.g., the Y axis direction) using the second-type antenna included in the first antenna structure 740*a*.

As another example, the electronic device 700-2 may radiate the millimeter wave signal 742*c* in the lateral direction (e.g., in the X axis direction) using the first-type antenna included in the second antenna structure 740*b*. The electronic device 700-2 may radiate the millimeter wave signal 742*d* in the front direction (e.g., the Y axis direction) using the second-type antenna included in the second antenna structure 740*b*.

As another example, the electronic device 700-2 may radiate the millimeter wave signal 752 in the rear direction from the antenna module 750. The electronic device 700-2 may secure antenna coverage with respect to the four directions of the electronic device 700-2 using the first antenna structure 740*a*, the second antenna structure 740*b*, or the antenna module 750.

Figure 7D:
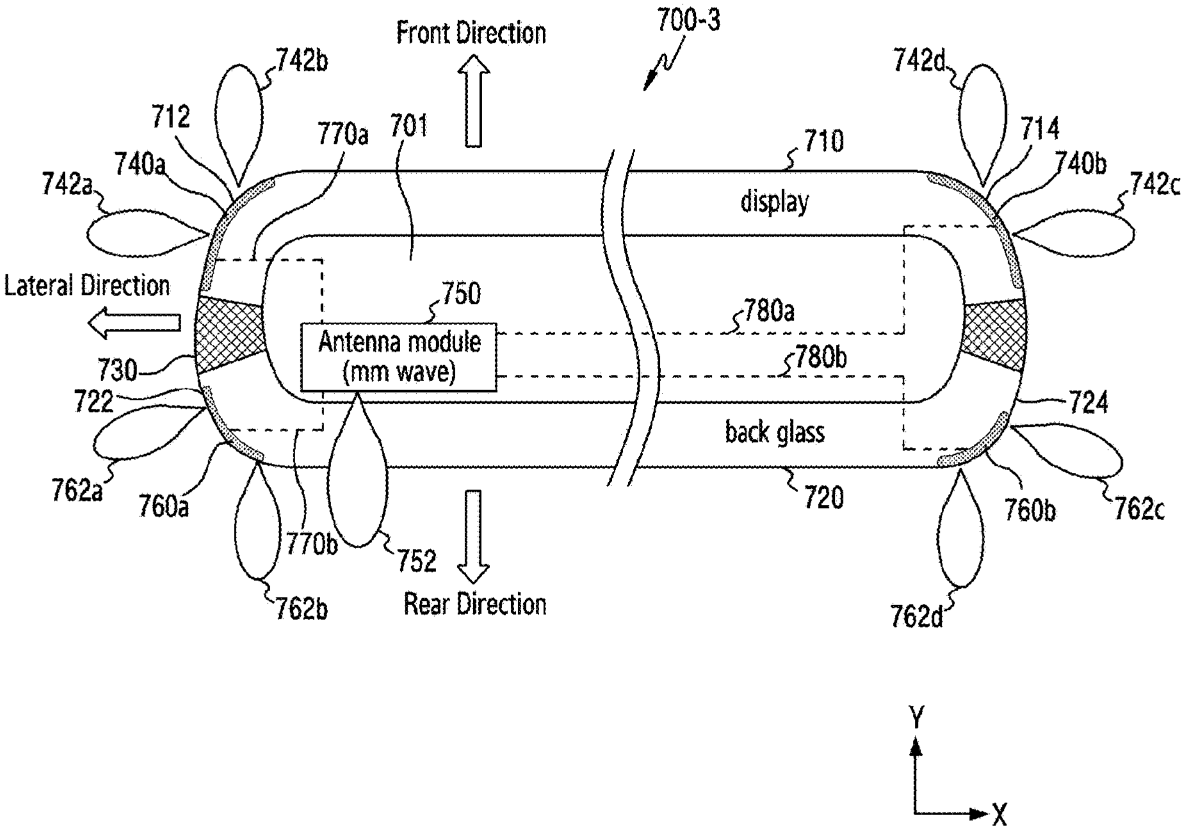
FIG. 7D is a cross-sectional view of an electronic device including multiple antennas according to various embodiments.

FIG. 7D is a cross-sectional view of an electronic device 700-3 including multiple antenna structures according to various embodiments. In describing the electronic device 700-3 in FIG. 7D, a description of substantially the same configuration as that of the electronic device 700 of FIG. 7A may not be repeated.

Referring to FIG. 7D, the electronic device 700-3 (e.g., the electronic device 101 in FIG. 1 or the electronic device 101 in FIG. 3) may include a display 710 (e.g., the display device in FIG. 1 or the display 320 in FIG. 3), a rear cover 720, a lateral member 730 (e.g., the side surface 310*a* in FIG. 3), multiple antenna structures 740*a*, 740*b*, 760*a*, and 760*b*, and antenna module 750, a first conductive connection member 770*a*, a second conductive connection member 780*a*, a third conductive connection member 770*b*, and/or a fourth conductive connection member 780*b*. The rear cover 720 may be positioned under the display 710 (e.g., in the −Y axis direction), and the lateral member 730 may be disposed between the display 710 and the rear cover 720. For example, an inner space 701 may be formed by the rear cover 720 and the lateral member 730, and the antenna module 750 may be disposed in the inner space 701.

In an embodiment, the antenna structures 740*a* and 740*b* may be disposed on two lateral portions (e.g., the lateral portion 322 in FIGS. 3 and 4) of the display 710. As an example, the first antenna structure 740*a* may be disposed on the first side surface 712 of the lateral portions 322 of the display 710. The second antenna structure 740*b* may be disposed on the second side surface 714 of the display. As an example, when the front surface of the electronic device 700-2 is disposed facing upward (e.g., in the +Y axis direction), the first antenna structure 740*a* may be disposed on the left lateral portion (e.g., the first side surface 712 of the display) of the electronic device 700-3. When the front surface of the electronic device 700-3 is disposed facing upward (e.g., in the Y axis direction), the second antenna structure 740*b* may be disposed on the right lateral portion (e.g., the second side surface 714 of the display) of the electronic device 700-3.

As an example, the antenna structures 760*a* and 760*b* may be disposed on two side surfaces 722 and 724 of the rear cover 720. The third antenna structure 760*a* may be disposed on the first side surface 722 of the rear cover. The fourth antenna structure 760*b* may be disposed on the second side surface 724 of the rear cover. As an example, when the front surface of the electronic device 700-3 is disposed facing upward (e.g., in the +Y axis direction), the third antenna structure 760*a* may be disposed on the left lateral portion (e.g., the first side surface 722 of the rear cover) of the rear cover 720. When the front surface of the electronic device 700-3 is disposed facing upward, the fourth antenna structure 760*b* may be disposed on the right lateral portion (e.g., the second side surface 724 of the rear cover) of the rear cover 720.

As an example, the first antenna structure 740*a* and/or the second antenna structure 740*b* may include multiple antennas having different shapes (e.g., a first-type antenna and a second-type antenna), and radiate millimeter wave signals 742*a*, 742*b*, 742*c*, and 742*d* in the front direction and the lateral direction (e.g., left and right lateral directions of the electronic device 700-3).

As an example, the third antenna structure 760*a* and/or the fourth antenna structure 760*b* may include multiple antennas having different shapes (e.g., a first-type antenna and a second-type antenna) and radiate millimeter wave signals 762*a*, 762*b*, 762*c*, and 762*d* in the rear direction and/or the lateral direction (e.g., left and right lateral directions of the electronic device 700-3).

In an embodiment, the first antenna structure 740*a* and the antenna module 750 may be electrically connected through the first conductive connection member 770*a*. The second antenna structure 740*b* and the antenna module 750 may be electrically connected through the second conductive connection member 780*a*. The third antenna structure 760*a* and the antenna module 750 may be electrically connected through the third conductive connection member 770*b*. The fourth antenna structure 760*b* and the antenna module 750 may be electrically connected through the fourth conductive connection member 780*b*. As another example, the first antenna structure 740*a*, the second antenna structure 740*b*, the third antenna structure 760*a*, or the fourth antenna structure 760*b* may be electrically connected to another antenna module (e.g., the third antenna module 246 of FIG. 2) other than the antenna module 750 included in the electric device 700-3 or to a wireless communication circuit (e.g., the second communication processor 214 of FIG. 2).

In an embodiment, the first antenna structure 740*a* to the fourth antenna structure 760*b* may include at least one first-type antenna (e.g., a side radiation antenna). The first-type antenna may include, for example, at least one monopole antenna (e.g., the monopole antenna 810 in FIG. 8A) and/or at least one dipole antenna (e.g., the dipole antenna 820 in FIG. 8A). For example, the multiple monopole antennas 810 and/or the multiple dipole antennas 820 may be alternately arranged to form at least one antenna array.

As an example, the first antenna structure 740*a* to the fourth antenna structure 760*b* may include at least one second-type antenna (e.g., a front radiation antenna). The second-type antenna may include at least one parallel antenna (e.g., the parallel antenna 830 in FIG. 8A) and/or at least one tapered slot antenna (e.g., the tapered slot antenna 840 in FIG. 8A). For example, the multiple parallel antennas 830 and/or the multiple tapered slot antennas 840 may be alternately arranged to form at least one antenna array.

As an example, the electronic device 700-3 may radiate millimeter wave signals 742*a* and 742*c* in the lateral direction using the first-type antenna included in the first antenna structure 740*a* and/or the second antenna structure 740*b*. The electronic device 700-3 may radiate millimeter wave signals 742*b* and 742*d* in the front direction using the second-type antenna included in the first antenna structure 740*a* and/or the second antenna structure 740*b*.

As an example, the electronic device 700-3 may radiate millimeter wave signals 762*a* and 762*c* in the lateral direction using the first-type antenna included in the third antenna structure 760*a* and/or the fourth antenna structure 760*b*. The electronic device 700-3 may radiate millimeter wave signals 762*b* and 762*d* in the rear direction (e.g., −Y axis direction) using the second-type antenna included in the third antenna structure 760*a* and/or the fourth antenna structure 760*b*. As another example, the electronic device 700-3 may radiate the millimeter wave signal 752 in the rear direction (e.g., −Y axis direction) from the antenna module 750. The electronic device 700-3 may secure antenna coverage with respect to four directions of the electronic device 700-3 using the first antenna structure 740*a* to the fourth antenna structure 760*b* and the antenna module 750.

Figure 7E:
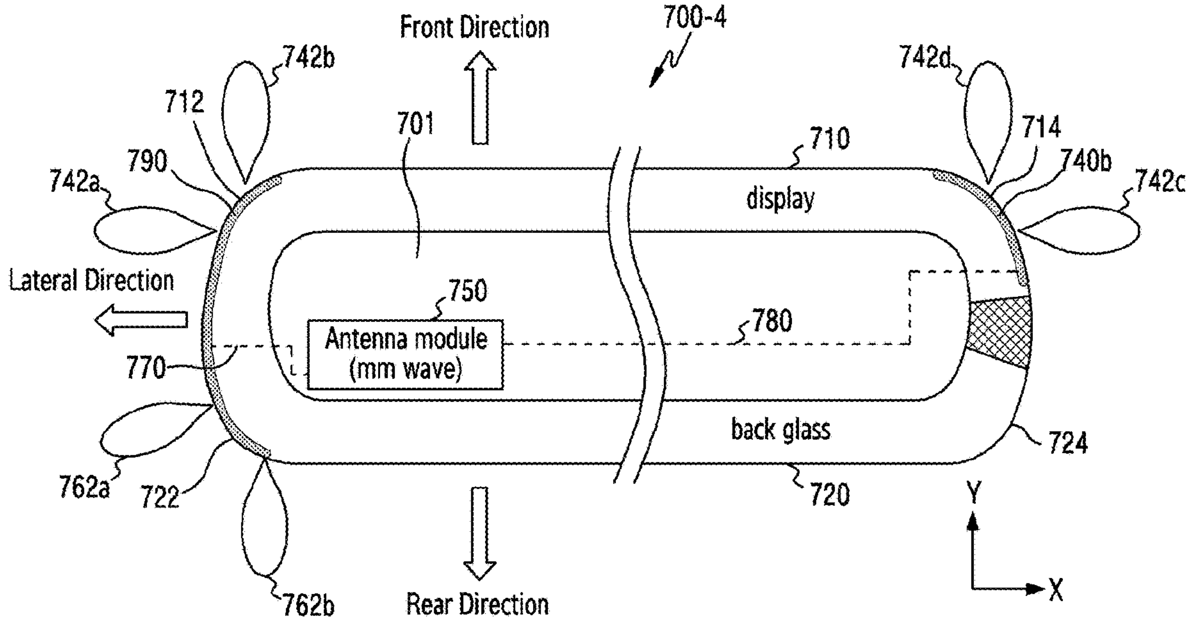
FIG. 7E is a cross-sectional view of an electronic device including an antenna according to various embodiments.
Figure 7E:
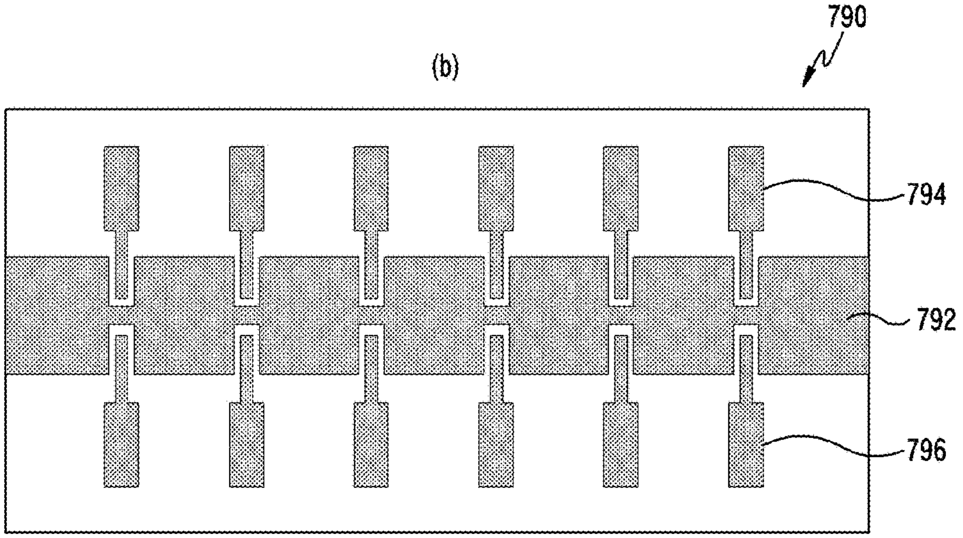

FIG. 7E is a cross-sectional view of an electronic device including an antenna according to various embodiments. In describing an electronic device 700-4 in FIG. 7E, a description of substantially the same configuration as that of the electronic device 700 in FIG. 7A may not be repeated.

Referring to FIG. 7E, an electronic device 700-4 (e.g., the electronic device 101 in FIG. 1 or the electronic device 101 in FIG. 3) may include a display 710 (e.g., the display device in FIG. 1 or the display 320 in FIG. 3), a rear cover 720, a lateral member 730 (e.g., the side surface 310*a* in FIG. 3), multiple antenna structures 790 and 740*b*, an antenna module 750, a first conductive connection member 770, and/or a second conductive connecting member 780. An inner space 701 may be formed under the display 710, and the antenna module 750 may be disposed in the inner space 701.

In an embodiment, the lateral member 730 may be partially formed on one side of the electronic device 700-4. Without being limited thereto, the electronic device 700-4 may be formed without the lateral member 730. For example, when the lateral member 730 is not disposed on one side of the electronic device 700-4, at least a portion of the display 710 may be disposed on the one side. FIG. 7E shows, as an example, that when the front surface of the electronic device 700-4 is disposed upward, the lateral member 730 is not disposed on one side (e.g., the left side surface in FIG. 7E) and the lateral member 730 is disposed on the other side (e.g., the right side surface in FIG. 7E). At least a portion of the display 710 may be disposed on one side where the lateral member 730 is not disposed.

As shown in (a) of FIG. 7E, the antenna structures 790 and 740*b* may be disposed on two lateral portions (e.g., the lateral portion 322 in FIGS. 3 and 4) of the display 710. As an example, the first antenna structure 790 may be disposed on the first side surface 712 of the display and the first side surface 722 of the rear cover. As an example, the first antenna structure 790 may be disposed on at least a portion of the lateral portion of the display 710 and at least a portion of the lateral portion of the rear cover 720. For example, the first antenna structure 790 may be disposed from the upper portion to the lower portion of one side surface of the electronic device 700-4.

The second antenna structure 740*b* may be disposed on the other side (e.g., the right lateral portion in FIG. 7E) of the lateral portion 322 of the display 710. The second antenna structure 740*b* may be disposed on the second side surface 714 of the display. The antenna structure may not be disposed on the second side surface 724 of the rear cover.

As an example, when the front surface of the electronic device 700-4 is disposed facing upward, the first antenna structure 790 may be disposed on the left side of the electronic device 700-4. When the front surface of the electronic device 700-4 is disposed facing upward, the second antenna 740*b* may be disposed on the right side of the electronic device 700-4.

In an embodiment, the first antenna structure 790 may be disposed on one side (e.g., the left lateral portion in FIG. 7E) of the electronic device 700-4 where the lateral member 730 is not disposed. As an example, the first antenna structure 790 may be disposed on at least a portion of the lateral portion of the display 710 and at least a portion of the lateral portion of the rear cover 720. For example, the first antenna structure 790 may be disposed from the upper portion to the lower portion of one side surface of the electronic device 700-4.

In an embodiment, the first antenna structure 790 may include multiple antennas having different shapes (e.g., a first-type antenna and/or a second-type antenna) and radiate millimeter wave signals 742*a*, 742*b*, 762*a*, and 762*b* in the front direction, the lateral direction (e.g., the left lateral direction of the electronic device 700-4), and the rear direction. As another example, the second antenna structure 740*b* may include multiple antennas having different shapes (e.g., a first-type antenna and a second-type antenna) and radiate millimeter wave signals 742*c* and 742*d* in the front direction and/or the lateral direction (e.g., the right lateral direction of the electronic device 700-4).

As shown in (b) of FIG. 7E, in an example, the first antenna structure 790 may include multiple antenna patterns 794 and 796 which are separated in the Y axis direction with the ground 792 interposed therebetween. For example, the multiple first antenna patterns 794 among the multiple antenna patterns 794 and 796 may be disposed above the ground 792. The multiple first antenna patterns 794 may radiate a first millimeter wave signal 742*a* in the lateral direction of the electronic device 700-4. As another example, the multiple first antenna patterns 794 may radiate a second millimeter wave signal 742*b* in the front direction of the electronic device 700-4. The multiple second antenna patterns 796 among the multiple antenna patterns 794 and 796 may be disposed below the ground 792. The multiple second antenna patterns 796 may radiate a fourth millimeter wave signal 762*a* in the lateral direction of the electronic device 700-4. The multiple second antenna patterns 796 may radiate a fifth millimeter wave signal 762*b* in the rear direction of the electronic device 700-4. For example, the multiple antenna patterns 794 and 796 may operate as a monopole antenna (e.g., the monopole antenna 810 in FIG. 8A).

In an embodiment, the first antenna structure 790 and the antenna module 750 may be electrically connected through the first conductive connection member 770. The second antenna structure 740*b* and the antenna module 750 may be electrically connected through the second conductive connection member 780. As another example, the first antenna structure 790 or the second antenna structure 740*b* may be electrically connected to another antenna module (e.g., the third antenna module 246 in FIG. 2) other than the antenna module 750 included in the electric device 700-4 or to a wireless communication circuit (e.g., the second communication processor 214 in FIG. 2).

As an example, the first antenna structure 790 and/or the second antenna structure 740*b* may include at least one first-type antenna (e.g., a lateral radiation antenna). The first-type antenna may include at least one monopole antenna (e.g., the monopole antenna 810 in FIG. 8A) and/or at least one dipole antenna (e.g., the dipole antenna 820 in FIG. 8A). For example, the multiple monopole antennas 810 and/or the multiple dipole antennas 820 may be alternately arranged to form at least one antenna array.

As an example, the first antenna structure 790 and/or the second antenna structure 740*b* may include at least one second-type antenna (e.g., a front radiation antenna). The second-type antenna may include at least one parallel antenna (e.g., the parallel antenna 830 in FIG. 8A) and/or at least one tapered slot antenna (e.g., the tapered slot antenna 840 in FIG. 8A). For example, the multiple parallel antennas 830 and/or the multiple tapered slot antennas 840 may be alternately arranged to form at least one antenna array.

As an example, the electronic device 700-4 may radiate the millimeter wave signals 742*a* and 762*a* in the lateral direction using the first-type antenna included in the first antenna structure 790. The electronic device 700-4 may radiate the millimeter wave signal 742*b* in the front direction using the second-type antenna included in the first antenna structure 790. The electronic device 700-4 may radiate the millimeter wave signal 762*b* in the rear direction using the second-type antenna included in the first antenna structure 790. The electronic device 700-4 may radiate the millimeter wave signal 742*c* in the lateral direction using the first-type antenna included in the second antenna structure 740*b*. The electronic device 700-4 may radiate the millimeter wave signal 742*d* in the front direction using the second-type antenna included in the second antenna structure 740*b*. As another example, the electronic device 700-4 may radiate the millimeter wave signal 762*b* toward the rear cover of the electronic device 700-4 using the antenna module 750. The electronic device 700-4 may secure antenna coverage with respect to four directions using the first antenna structure 790, the second antenna structure 740*b*, or the antenna module 750.

Referring to FIGS. 7A, 7B, 7C, 7D and 7E, although the antenna structures are shown as being electrically connected to the antenna module 750, the first antenna structure 740*a* to the fourth antenna structure 760*b* may be electrically connected to separate RFICs (e.g., the third RFIC 226 in FIG. 3) included in the electronic device.

FIG. 8A is a diagram illustrating an example in which the first antenna structure 740 is disposed on the lateral portion 322 of the electronic device 101 according to various embodiments.

Referring to FIGS. 3, 7A, and 8A, the first antenna structure 740 (e.g., the antenna structure 542 in FIGS. 3 and 5A, the first antenna structure 740 in FIG. 7A) may be disposed on the lateral portion 322 of the electronic device 101. The first antenna structure 740 may include at least one first-type antenna (e.g., a side radiation antenna) and/or at least one second-type antenna (e.g., a front radiation antenna). The first antenna structure 740 may include at least one first-type antenna and at least one second-type antenna, and may have vertical polarization and horizontal polarization characteristics.

In an embodiment, the first antenna structure 740 may include a first area 801 and a second area 802. For example, the first area 801 and the second area 802 of the first antenna structure 740 may be alternately disposed on the lateral portion 322. Without being limited thereto, the first area 801 and the second area 802 of the first antenna structure 740 may be spaced apart from each other with respect to the center of the first antenna structure 740. For example, the first area 801 of the first antenna structure 740 may be disposed above the central portion 803 of the lateral portion 322 in the Y axis direction. As another example, the first area 801 of the first antenna structure 740 may also be disposed below the central portion 803 of the lateral portion 322 in the Y axis direction. As another example, the second area 802 of the first antenna structure 740 may be disposed above the central portion 803 of the lateral portion 322 in the Y axis direction. As another example, the second area 802 of the first antenna structure 740 may also be disposed in the −Y axis direction with respect to the central portion 803 of the lateral portion 322. The first area 801 and the second area 802 of the first antenna structure 740 may be spaced apart from each other with a predetermined interval 806 therebetween.

In order to increase the gain of a mmWave antenna, the first antenna structure 740 may include an array antenna including multiple antennas. The first area 801 of the first antenna structure 740 may include multiple first antennas 810 (e.g., the monopole antennas) capable of emitting signals toward the side surface of the electronic device 101. The first area 801 of the first antenna structure 740 may include multiple second antennas 820 (e.g., the dipole antennas) capable of emitting signals toward the side surface of the electronic device 101. For example, the multiple first antennas 810 (e.g., the monopole antennas) and the multiple second antennas 820 (e.g., the dipole antennas) may be alternately disposed to form at least one antenna array.

In an embodiment, the second area 802 of the first antenna structure 740 may include multiple third antennas 830 (e.g., the parallel antennas). The second area 802 of the first antenna structure 740 may include multiple fourth antennas 840 (e.g., the tapered slot antennas). For example, the multiple third antennas 830 (e.g., the parallel antennas) and the multiple fourth antennas 840 (e.g., the tapered slot antennas) may be alternately disposed to form at least one antenna array.

In an embodiment, the multiple first antennas 810 (e.g., the monopole antennas) and the multiple second antennas 820 (e.g., the dipole antennas) may be electrically connected to the antenna module 750 or a wireless communication circuit (e.g., the second communication processor 214 of FIG. 2) through the FPCB 570. The multiple third antennas 830 (e.g., the parallel antennas) and the multiple fourth antennas 840 (e.g., the tapered slot antennas) may be connected to the antenna module 750 or the wireless communication circuit (e.g., the second communication processor 214 in FIG. 2) through the FPCB 570. The FPCB 570 may be electrically connected to the antenna module 750.

In an embodiment, the first antenna structure 740 and the antenna module 750 may be electrically connected through the FPCB 570. The FPCB 570 may include multiple first lines (L1) for connecting the multiple first antennas 810 (e.g., the monopole antennas) and the multiple second antennas 820 (e.g., the dipole antennas) to the antenna module 750. The FPCB 570 may include multiple second lines (L2) for connecting the multiple third antennas 830 (e.g., the parallel antennas) and the multiple fourth antennas 840 (e.g., the tapered slot antennas) to the antenna module 750. For example, the multiple first lines (L1) may be connected to the multiple first antenna terminals 753 of the antenna module 750, and the multiple second lines (L2) may be connected to the multiple second antenna terminals 754 of the antenna module 750.

In an embodiment, the antenna module 750 may be electrically connected to the first-type antenna (e.g., a side radiation antenna) and at least one second-type antenna (e.g., a front radiation antenna) to supply signals. For example, the antenna module 750 may implement a beam-forming function using the first-type antenna (e.g., a side radiation antenna) and the at least one second-type antenna (e.g., a front radiation antenna).

Figure 8B:
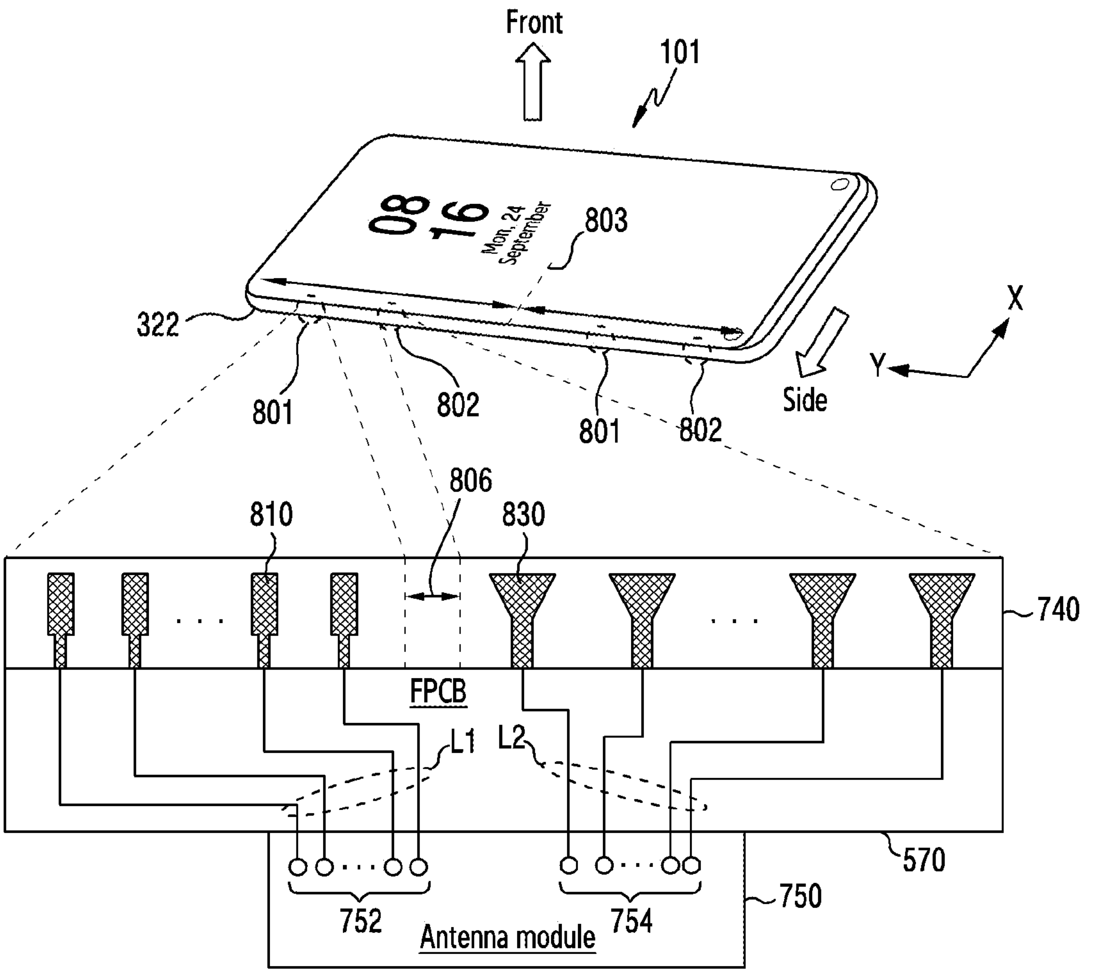
FIG. 8B is a diagram illustrating an example in which an antenna is disposed on a lateral portion of an electronic device according to various embodiments.

FIG. 8B is a diagram illustrating an example in which the first antenna structure 740 is disposed on a lateral portion of the electronic device 101 according to various embodiments.

Referring to FIGS. 3, 7A, and 8B, the first antenna structure 740 (e.g., the antenna structure 542 in FIGS. 3 and 5A, the first antenna structure 740 in FIG. 7A) may be disposed on the lateral portion 322 of the electronic device 101. The antenna structure 740 may include at least one first-type antenna (e.g., a side radiation antenna) and at least one second-type antenna (e.g., a front radiation antenna). The first antenna structure 740 may include at least one first-type antenna and at least one second-type antenna and have vertical polarization and horizontal polarization characteristics.

In an embodiment, the first antenna structure 740 may include a first area 801 and a second area 802. The first area 801 and the second area 802 of the first antenna structure 740 may be alternately disposed on the lateral portion 322. In order to increase the gain of a mmWave antenna, the first antenna structure 740 may be formed as an array antenna structure including multiple antennas.

In an embodiment, at least one first-type antenna (e.g., a side radiation antenna) may be disposed in the first area 801 of the first antenna structure 740. For example, the first-type antenna (e.g., a side radiation antenna) may include multiple first antennas 810 (e.g., the monopole antenna). The multiple first antennas 810 (e.g., the monopole antennas) may be disposed to form an antenna array.

In an embodiment, at least one second-type antenna (e.g., a front radiation antenna) may be disposed in the second area 802 of the first antenna structure 740. For example, the second-type antenna (e.g., a front radiation antenna) may include multiple third antennas 830 (e.g., the parallel antennas). The multiple third antennas 830 (e.g., the parallel antennas) may be disposed to form an antenna array.

In an embodiment, the first-type antenna (e.g., a side radiation antenna) and the second-type antenna (e.g., a front radiation antenna) may be electrically connected to the antenna module 750 or the wireless communication circuit (e.g., the second communication processor 214 in FIG. 2) through the FPCB 570. As an example, the first antenna structure 740 including multiple first antennas 810 (e.g., the monopole antennas) and multiple third antennas 830 (e.g., the parallel antennas) may be electrically connected to the FPCB 570. The FPCB 570 may be electrically connected to the antenna module 750. The first antenna structure 740 and the antenna module 750 may be electrically connected through the FPCB 570.

In an embodiment, the FPCB 570 may include multiple first lines (L1) for connecting the multiple first antennas 810 (e.g., the monopole antennas) to the antenna module 750. The FPCB 570 may include multiple second lines (L2) for connecting the multiple third antennas 830 (e.g., the parallel antennas) to the antenna module 750. In an embodiment, the multiple first lines (L1) may be connected to the multiple first antenna terminals 753 of the antenna module 750, and the multiple second lines (L2) may be connected to the multiple second antenna terminals 754 of the antenna module 750.

In an embodiment, the antenna module 750 may be electrically connected to the first-type antenna (e.g., a side radiation antenna) and at least one second-type antenna (e.g., a front radiation antenna) to supply signals. For example, the antenna module 750 may implement a beam-forming function using the first-type antenna (e.g., a side radiation antenna) and the at least one second-type antenna (e.g., a front radiation antenna).

Figure 8C:
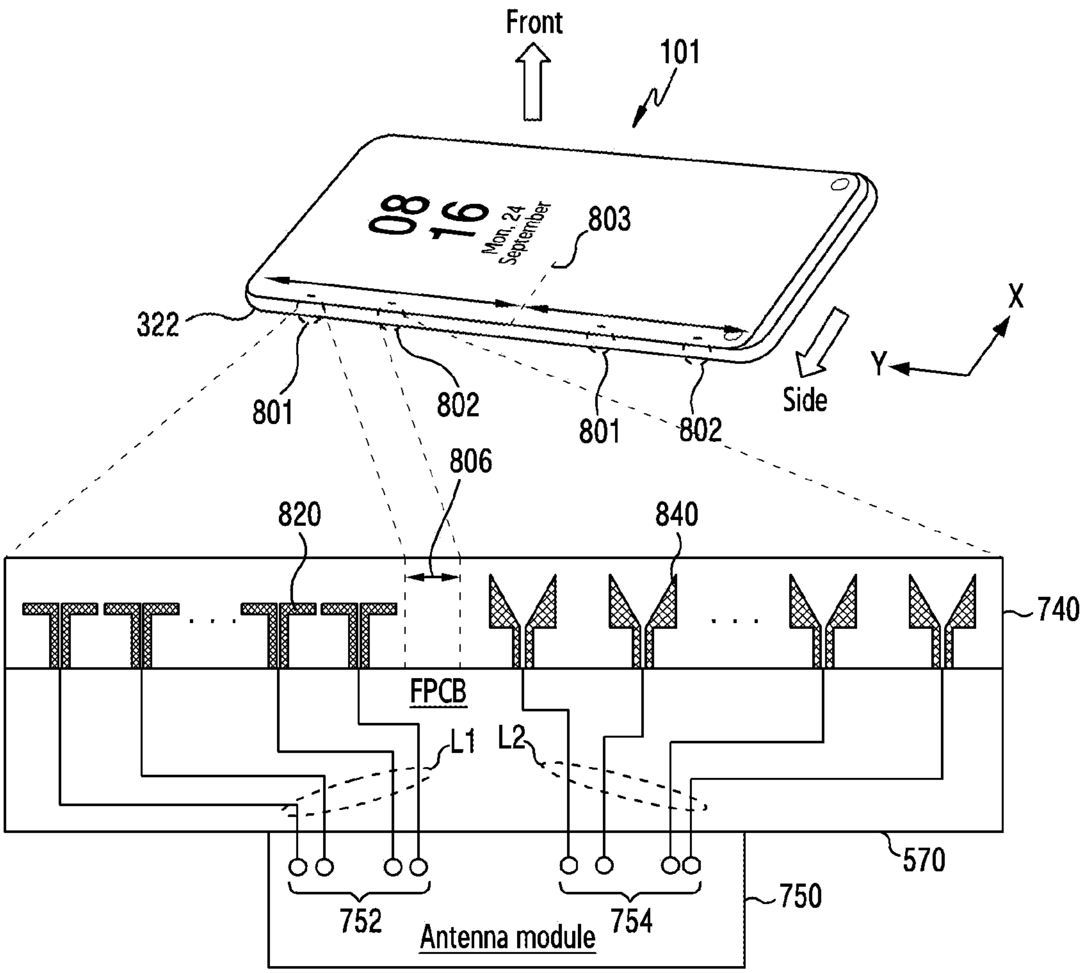
FIG. 8C is a diagram illustrating an example in which an antenna is disposed on a lateral portion of an electronic device according to various embodiments.

FIG. 8C is a diagram illustrating an example in which the first antenna structure 740 is disposed on the lateral portion 322 of the electronic device 101 according to various embodiments.

Referring to FIGS. 3, 7A, and 8C, at least one first-type antenna (e.g., a side radiation antenna) may be disposed in the first area 801 of the first antenna structure 740. For example, the first-type antenna (e.g., a side radiation antenna) may include multiple second antennas 820 (e.g., the dipole antenna). The multiple second antennas 820 (e.g., the dipole antennas) may be disposed to form an antenna array.

In an embodiment, at least one second-type antenna (e.g., a front radiation antenna) may be disposed in the second area 802 of the first antenna structure 740. For example, the second-type antenna (e.g., a front radiation antenna) may include multiple fourth antennas 840 (e.g., the tapered slot antenna) to form an antenna array.

In an embodiment, the first-type antenna (e.g., a side radiation antenna) and the second-type antenna (e.g., a front radiation antenna) may be electrically connected to the antenna module 750 through the FPCB 570. As an example, the first antenna structure 740 including multiple second antennas 810 (e.g., the dipole antenna) and multiple fourth antennas 840 (e.g., a tapered slot antenna) may be electrically connected to the FPCB 570. The FPCB 570 may be electrically connected to the antenna module 750. The first antenna structure 740 and the antenna module 750 may be electrically connected through the FPCB 570.

In an embodiment, the FPCB 570 may include multiple first lines (L1) for connecting the multiple second antennas 810 (e.g., the dipole antennas) to the antenna module 750. The FPCB 570 may include multiple second lines (L2) for connecting the multiple fourth antennas 840 (e.g., the tapered slot antennas) to the antenna module 750. In an embodiment, the multiple first lines (L1) may be connected to the multiple first antenna terminals 753 of the antenna module 750, and the multiple second lines (L2) may be connected to the multiple second antenna terminals 754 of the antenna module 750.

The antenna module 750 may implement a beam-forming function using the first-type antenna (e.g., a side radiation antenna) and at least one second-type antenna (e.g., a front radiation antenna).

Figure 9:
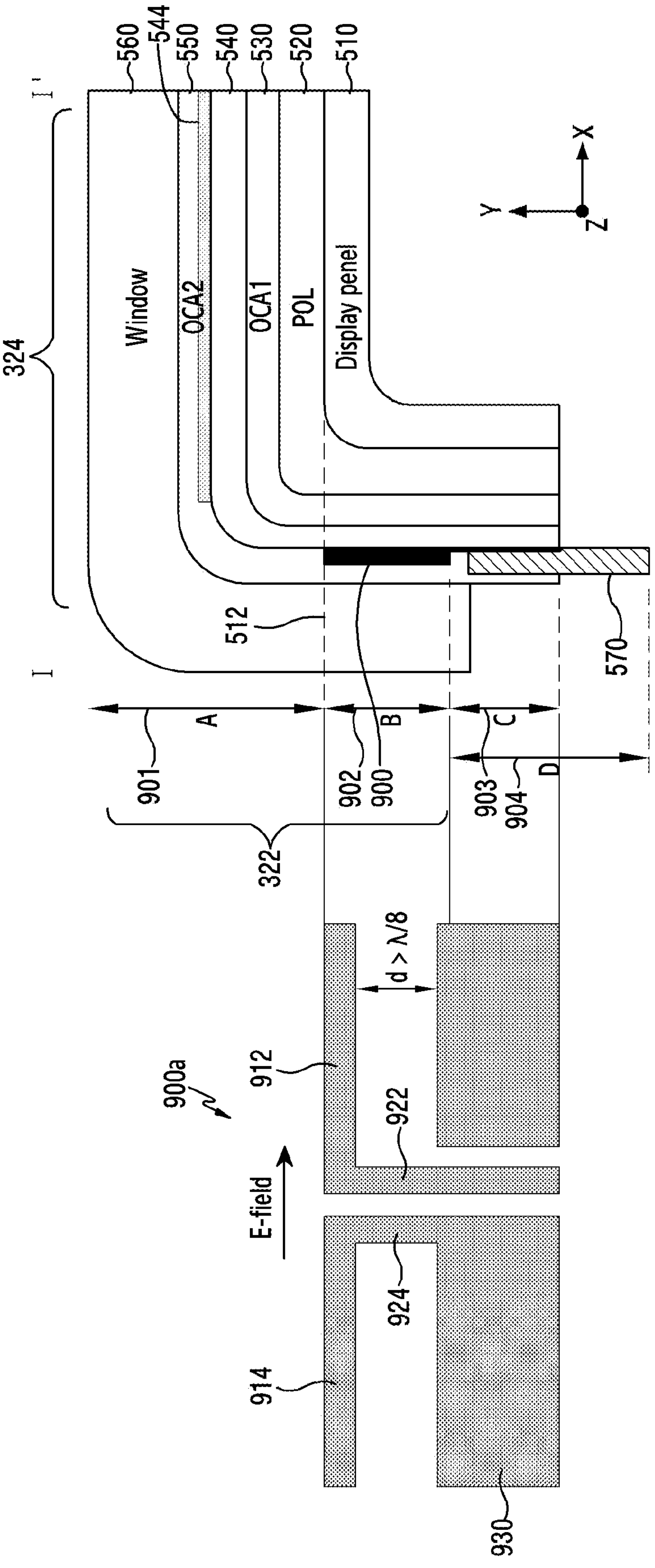
FIG. 9 is a diagram illustrating a dipole antenna disposed on a lateral portion of an electronic device according to various embodiments.

FIG. 9 is a diagram illustrating a dipole antenna 900*a* disposed on the lateral portion 322 of the display 320 according to various embodiments.

Referring to FIGS. 3, 8A, and 9, an antenna structure 900 and/or the touch sensor 544 may be disposed on the dielectric layer 540 of the display 320. The antenna structure 900 may be disposed on a lateral portion (e.g., the lateral portion 322 in FIGS. 3 and 4) of the display 320. The touch sensor 544 may be disposed on the front surface (e.g., the front surface 324 of FIG. 4) or the lateral portion of the display 320.

In an embodiment, the antenna structure 900 (e.g., the first antenna structure 740 in FIG. 7A) may include at least one dipole antenna 900*a* (e.g., the second antenna 820 in FIG. 8A). The dipole antenna 900*a* may be formed of a mesh pattern using a conductive mesh line (e.g., the conductive mesh line 546 in FIG. 5C).

In an embodiment, the display 320 may include a first area (e.g., the front surface 324), a second area (A) 901, a third area (B) 902, and a fourth area (D) 904 (D). The first area may correspond to the front surface 324 of the display 320. The second area (A) 901 and the third area (B) 902 may correspond to the lateral portion 322 of the display 320. The fourth area (D) 904 may include a feed area (C) 903. The second area (A) 901, the third area (B) 902, and the fourth area (D) 904 may be disposed on the side surface of the display 320. The FPCB 570 as a transmission area may be disposed on the fourth area (D) 904. The first area (e.g., the front surface 324), the second area (A) 901, and the third area (B) 902 may display a screen (e.g., a display area), and the fourth area (D) 904 may not display a screen (e.g., a non-display area).

As an example, the dipole antenna 900*a* may be disposed on the lateral portion 322 of the display 320 and included in the antenna structure 900. The dipole antenna 900*a* of the antenna structure 900 may be located at substantially the same height as an extension line 512 from the front surface of the display panel 510 or may be located below (e.g., the −Y-axis direction) the extension line 512 from the front surface of the display panel 510.

As an example, when the antenna structure 900 includes the dipole antenna 900*a*, the display panel 510 may operate as a reflector. The dipole antenna 900*a* may radiate radio waves in the lateral direction of the electronic device (e.g., the electronic device 101 in FIGS. 3 and 4). The dipole antenna 900*a* may radiate a horizontally polarized signal.

As an example, a first radiator 912 and a second radiator 914 of the dipole antenna 900*a* may have a length of about λ/4. The first radiator 912 may be electrically connected to the positive (+) terminal of antenna power supply through a first connection line 922. The second connection line 924 may be directly connected to the ground 930 (GND), or the second radiator 914 may be electrically connected to the ground 930 (GND) through the second connection line 924.

As an example, the distance (d) between the first radiator 912 and the second radiator 914 and the ground 930 (GND) may be about λ/4. The distance (d) between the first radiator 912 and the second radiator 914 and the ground 930 (GND) may be greater than about λ/8. For example, the distance (d) between the first radiator 912 and the second radiator 914 and the ground 930 (GND) may be greater than about λ/8 or less than about λ/4.

Figure 10:
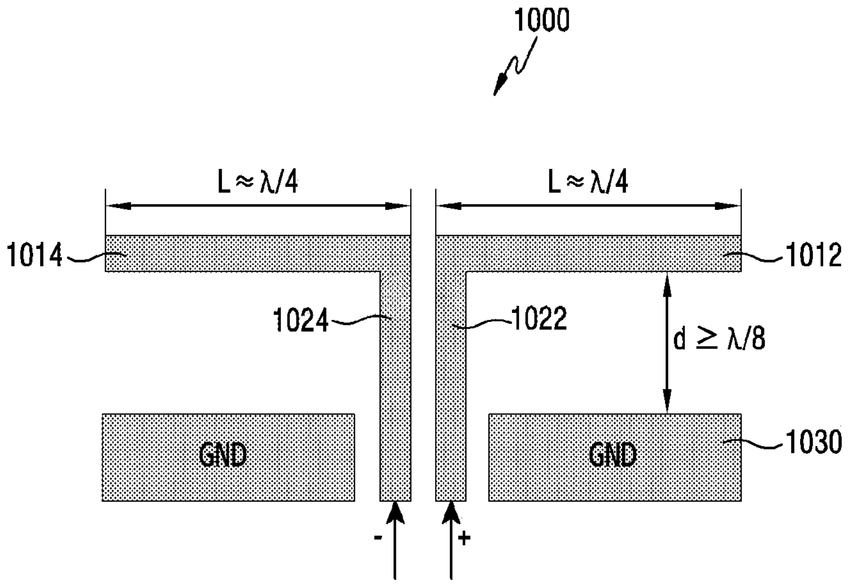
FIG. 10 is a diagram illustrating an example of a dipole antenna according to various embodiments.

FIG. 10 is a diagram illustrating an example of a dipole antenna 1000 according to various embodiments.

Referring to FIGS. 3, 8A, and 10, the dipole antenna 1000 (e.g., the second antenna 820 in FIG. 8A) may radiate radio waves in the lateral direction of the electronic device 101. The dipole antenna 1000 may radiate a signal having horizontal polarization characteristics.

In an embodiment, a first radiator 1012 and a second radiator 1014 of the dipole antenna 1000 may have a length of about λ/4. The first radiator 1012 may be electrically connected to the positive (+) terminal of antenna power supply through the first connection line 1022. The second radiator 1014 may be electrically connected to the negative (−) terminal of the antenna power supply through the second connection line 1024. The first connection line 1022 and the second connection line 1024 may be disposed between the grounds 1030 (GND) and electrically connected to the antenna power supply.

The distance (d) between the first radiator 1012 and the second radiator 1014 and the ground 1030 (GND) may be about λ/4. Without being limited thereto, the distance (d) between the first radiator 1012 and the second radiator 1014 and the ground 1030 (GND) may be greater than about λ/8. For example, the distance (d) between the first radiator 1012 and the second radiator 1014 and the ground 1030 (GND) may be greater than about λ/8 or less than about λ/4.

Figure 11:
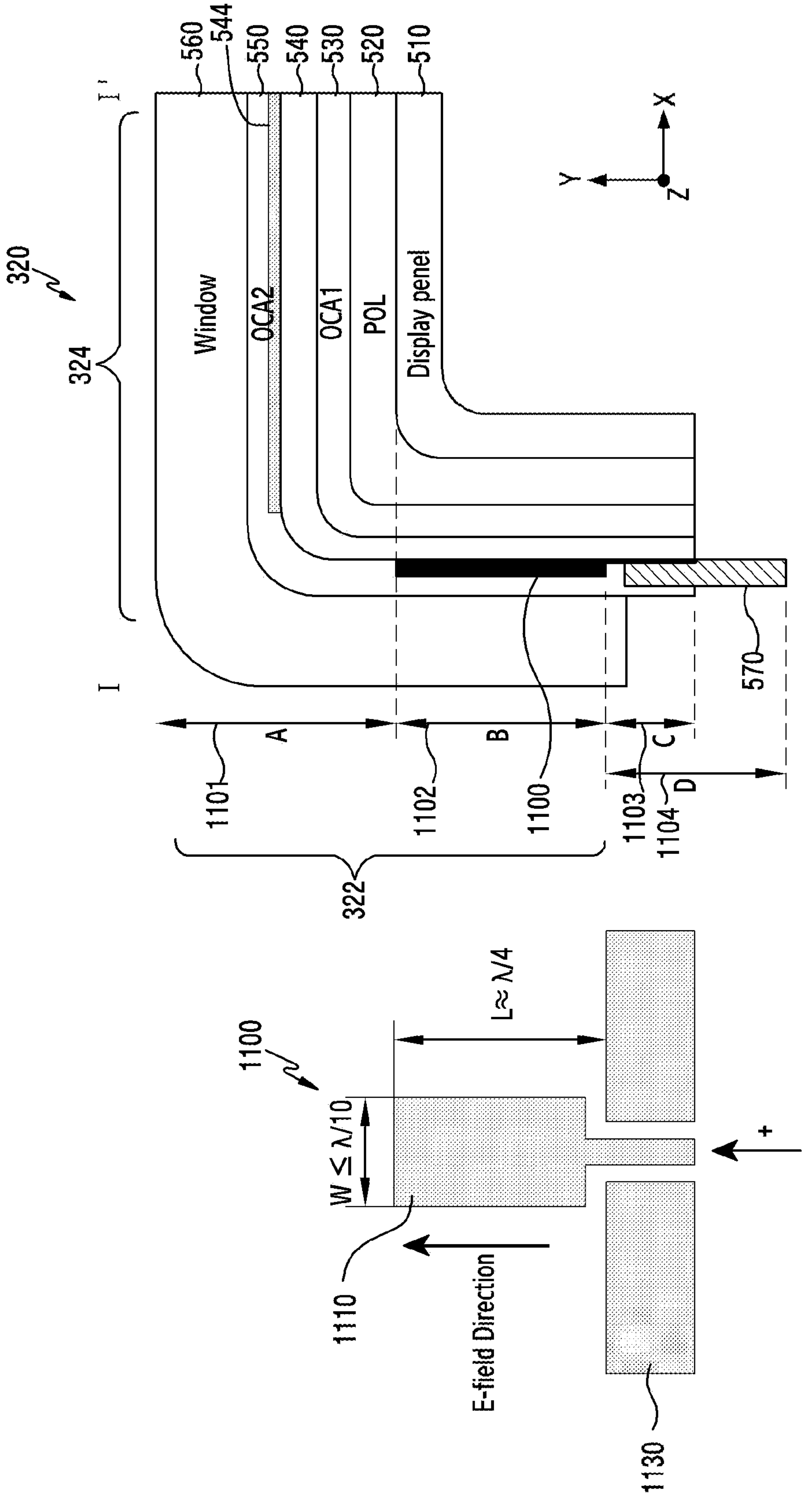
FIG. 11 is a diagram illustrating a monopole antenna disposed on a lateral portion of an electronic device according to various embodiments.

FIG. 11 is a diagram illustrating a monopole antenna 1110 disposed on the lateral portion 322 of the display 320 according to various embodiments.

Referring to FIGS. 3, 8A, and 11, the display 320 may include a first area (e.g., a front surface 324), a second area (A) 1101, a third area (B) 1102, and a fourth area (D) 1104. The first area may correspond to the front surface 324 of the display 320. The second area (A) 1101 and the third area (B) 1102 may correspond to the lateral portion 322 of the display 320. The fourth area (D) 1104 may include a feed area (C) 1103. The second area 1101 (A), the third area (B) 1102, and the fourth area (D) 1104 may be disposed on the side surface of the display 320. The FPCB 570 as a transmission area may be disposed in the fourth area (D) 1104. The first area (e.g., the front surface 324), the second area (A) 1101, and the third area (B) 1102 may display a screen (e.g., a display area), and the fourth area (D) 1104 may not display a screen (e.g., a non-display area).

An antenna structure 1100 and/or the touch sensor 544 may be disposed in the dielectric layer 540 of the display 320. The antenna structure 1100 may be disposed on the lateral portion (e.g., the lateral portion 322 in FIGS. 3 and 4) of the display 320. The touch sensor 544 may be disposed on the front surface (e.g., the front surface 324 in FIG. 4) of the display 320.

In an embodiment, the antenna structure 1100 (e.g., the first antenna structure 740 in FIG. 7A) may include at least one monopole antenna 1110 (e.g., the monopole antenna 810 in FIG. 8A) having excellent vertical polarization versus horizontal polarization characteristics. The monopole antenna 1110 may be formed of a mesh pattern using a conductive mesh line (e.g., the conductive mesh line 546 in FIG. 5C).

As an example, the monopole antenna 1110 may be disposed on the lateral portion 322 of the display 320 and be included in the antenna structure 1100. The monopole antenna 1110 of the antenna structure 1100 may be positioned lower (e.g., in the −Y axis direction) than an extension line 512 from the front surface of the display panel 510.

As an example, the monopole antenna 1110 may include a radiator structure having a length (L) of about λ/4 (≈L≈λ/4) and a width (W) of about λ/10 or less (W≤about λ/10). The lower end of the radiator structure of the monopole antenna 1110 may be disposed between the grounds 1130 (GND), and the radiator structure may be connected to a positive (+) signal terminal of a feed line such as a coplanar waveguide (CPW) or a microstrip line.

As an example, when the antenna structure 1100 includes the monopole antenna 1110, the display panel 510 may operate as a rear reflector. The monopole antenna 1110 may radiate radio waves in the lateral direction (e.g., the electronic device 1010 in FIGS. 3 and 4) of an electronic device. A radiation direction and an electric field direction of the monopole antenna 1110 may be the same as the length direction of the monopole. The monopole antenna 1110 may radiate a signal having vertical polarization characteristics.

Figure 12:
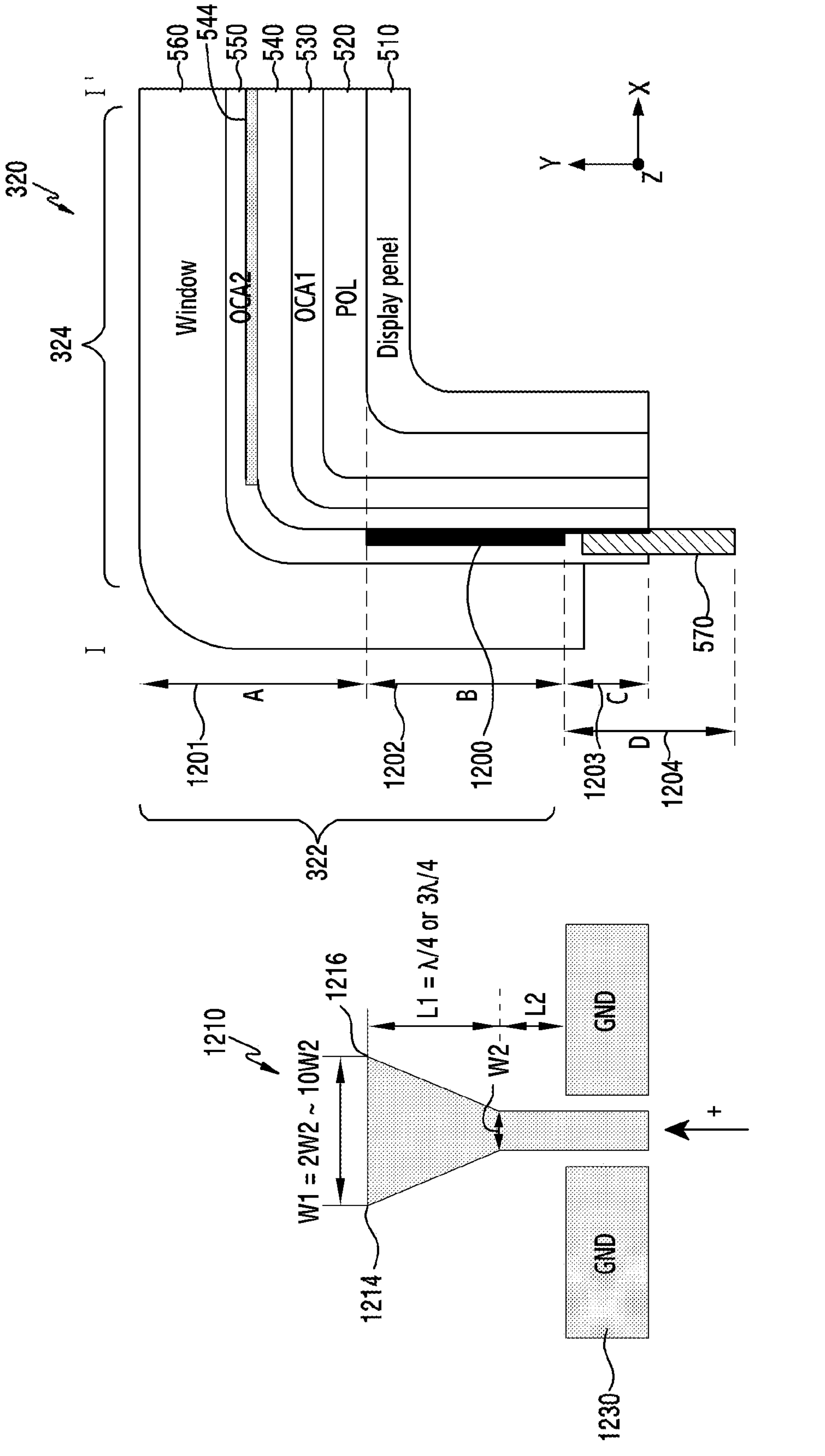
FIG. 12 is a diagram illustrating a parallel plate waveguide antenna disposed on a lateral portion of an electronic device according to various embodiments.
Figure 13:
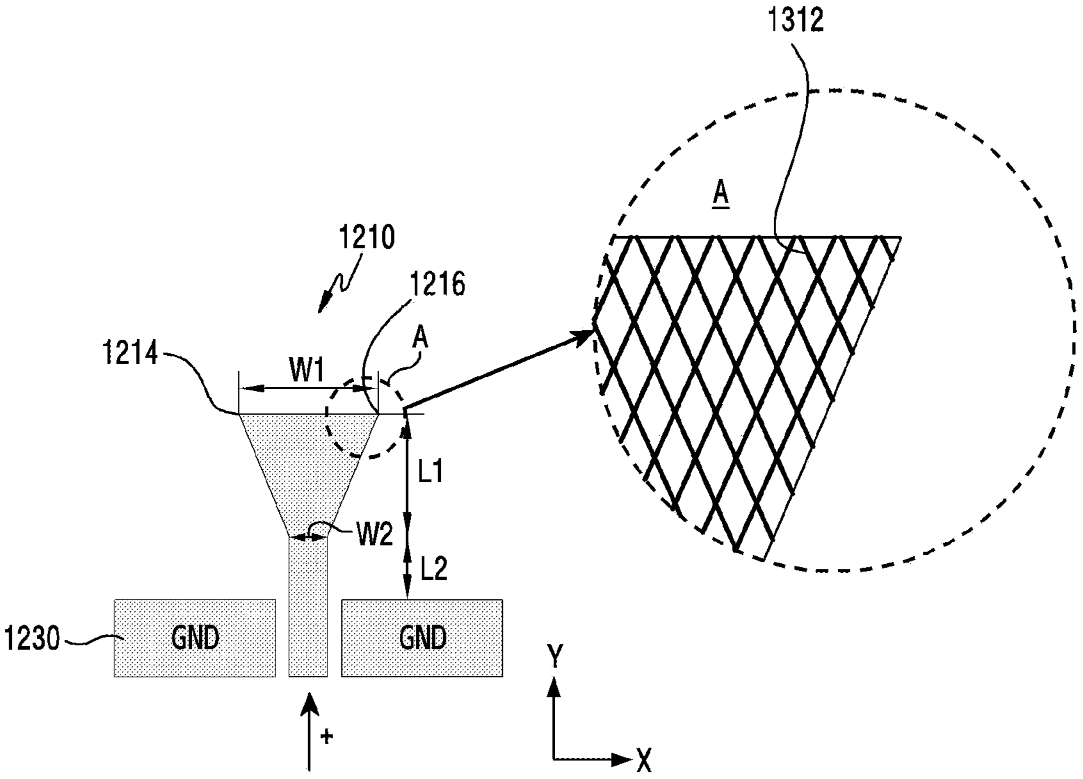
FIG. 13 is a diagram illustrating an example of a parallel plate waveguide antenna according to various embodiments.

FIG. 12 is a diagram illustrating a parallel plate waveguide antenna 1210 disposed on the lateral portion 322 of the display 320. FIG. 13 is a diagram illustrating an example of a parallel plate waveguide antenna 1210 according to various embodiments. Hereinafter, a "parallel plate waveguide antenna" may be referred to as a "parallel antenna".

Referring to FIGS. 3, 8A, 12, and 13, the display 320 may include a first area (e.g., the front surface 324), a second area (A) 1201, a third area (B) 1202, a fourth area (D) 1104. The first area may correspond to the front surface 324 of the display 320. The second area (A) 1201 and the third area (B) 1202 may correspond to the lateral portion 322 of the display 320. The fourth area (D) 1204 may include a feed area (C) 1203. The second area (A) 1201, the third area (B) 1202, and the fourth area (D) 1204 may be disposed on the side surface of the display 320. The FPCB 570 as a transmission area may be disposed in the fourth area (D) 1204. The first area (e.g., the front surface 324), the second area (A) 1201, and the third area (B) 1202 may display a screen (e.g., a display area), and the fourth area (D) 1204 may not display a screen (e.g., a non-display area).

An antenna structure 1200 may be disposed on the dielectric layer 540 of the display 320. The antenna structure 1200 may be disposed on the lateral portion (e.g., the lateral portion 322 in FIGS. 3 and 4) of the display 320.

As an example, the antenna structure 1200 (e.g., the first antenna structure 740 in FIG. 7A) may include at least one parallel antenna 1210 (e.g., the parallel antenna 830 in FIG. 8A).

As an example, the antenna structure 1200 (e.g., the first antenna structure 740 in FIG. 7A) may be divided into display inner areas 1201, 1202, and 1203 and an FPCB area 1204 (e.g., a transmission area). The inner areas of the display may include a display area (A) 1201, an antenna area (B) 1202, and a feed area (C) 1203. The feed area (C) 1203 may partially overlap the FPCB area (D) 1204.

As an example, at least one parallel antenna 1210 may be disposed on the lateral portion 322 of the display 320 to form the antenna structure 1200. The parallel antenna 1210 included in the antenna structure 1200 may be formed to be adjacent to the extension line 512 from the front surface of the display panel 510 so as to secure a large area. For example, an upper end of the parallel antenna 1210 may be formed to substantially coincide with the extension line 512 from the front surface of the display panel 510. As another example, the distance between the upper end of the parallel antenna 1210 and the division line of the lateral portion 322 and the front surface of the display 320 may vary within a range of about ±λ/10. For example, the upper end of the parallel antenna 1210 may be located higher than the division line of the lateral portion 322 and the front surface of the display 320 by about λ/10 in the +Y axis direction. As another example, the upper end of the parallel antenna 1210 may be positioned lower in the −Y axis direction by about λ/10 than the division line of the lateral portion 322 and the front surface of the display 320. An upper end of the parallel antenna 1210 may include, for example, a portion adjacent to the division line of the lateral portion 322 and the front surface of the display 320.

As an example, the parallel antenna 1210 may have a structure in which the width increases toward the upper end thereof (e.g., the +Y axis direction). The parallel antenna 1210 may be directly connected to a positive (+) signal terminal of a feed line such as a CPW or microstrip line. At least a portion of the radiator structure of the parallel antenna 1210 may be located between the grounds 1230.

As an example, a first length (L1) of the portion where the width of the radiator structure of the parallel antenna 1210 is widened may be an odd multiple of about λ/4 (about λ/4 or about 3λ/4). A second length (L2) between the ground and the portion where the width of the radiator structure of the parallel antenna 1210 starts to widen may be smaller than the first length (L1).

As an example, a first width (W1) of the widest portion of the radiator structure of the parallel antenna 1210 and a second width (W2) of the narrowest portion of the radiator structure may have a ratio of 2 to 10:1 (e.g., W1=2*(W2) ~10*(W2)). For example, the radiator of the parallel antenna 1210 may be formed in the shape of a funnel having width increasing toward the front surface of the display 320. For example, the second width (W2) of the parallel antenna 1210 may be substantially equal to the width of a feed line such as a CPW or a microstrip line.

As an example, at least a portion of the radiator structure of the parallel antenna 1210 may be located between the grounds 1230, and an electric field may be formed between the parallel antenna 1210 and the grounds 1230 so that radio waves may be radiated through the end 1214 and 1216 of the parallel antenna 1210. Accordingly, the radiation direction of the parallel antenna 1210 may be formed in the vertical direction of the display 320, and the electric field direction may be the vertical direction of the parallel antenna 1210. The parallel antenna 1210 may radiate a signal having vertical polarization characteristics.

As shown in FIG. 13, in order to prevent or reduce the degradation of the image quality of the display 320 by the parallel antenna 1210, the parallel antenna 1210 may be formed of a mesh pattern 1312 using a conductive mesh line (e.g., the conductive mesh line 546 in FIG. 5C). For example, in order to prevent or reduce a Moiré phenomenon caused by the mesh pattern 1312 of the parallel antenna 1210, the mesh pattern 1312 may be formed in a rhombus shape. As another example, the mesh pattern 1312 may be formed in a long shape in a current direction of the parallel antenna 1210 in consideration of radiation efficiency of the parallel antenna 1210. As an example, the mesh pattern 1312 may be formed in a long shape in the first direction (e.g., a direction in which the front surface of the electronic device 101 faces, a direction in which the front surface of the display 320 faces, or the Y axis direction). The mesh pattern 1312 is not limited thereto, and the mesh patterns of not only the parallel antenna 1210, but also the dipole antenna **900*a* in FIG. 9, the monopole antenna 1110 in FIG. 11, and/or the tapered slot antenna 1410 in FIG. 14A may also be formed in a long shape in the first direction (e.g., the direction in which the front surface of the electronic device 101 faces, the direction in which the front surface of the display 320** faces, or the Y axis direction).

Figure 14A:
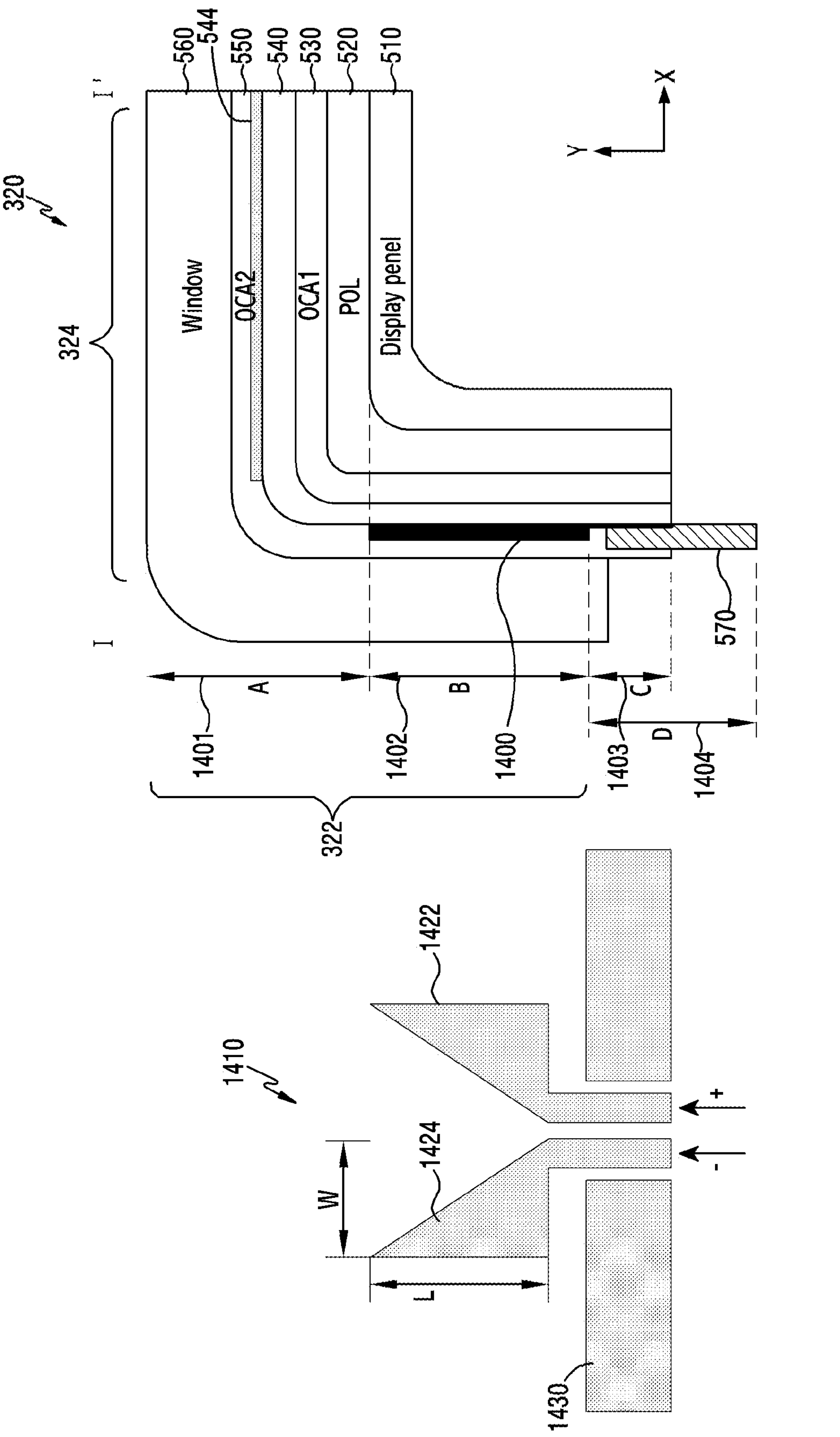
FIG. 14A is a diagram illustrating a tapered slot antenna disposed on a lateral portion of an electronic device according to various embodiments.

FIG. 14A is a diagram illustrating an example tapered slot antenna 1410 disposed on the lateral portion 322 of the electronic device 101 according to various embodiments.

Referring to FIGS. 3, 8A, and 14A, the display 320 may include a first area (e.g., the front surface 324), a second area (A) 1401, a third area (B) 1402, and a fourth area (D) 1404. The first area may correspond to the front surface 324 of the display 320. The second area (A) 1401 and the third area (B) 1402 may correspond to the lateral portion 322 of the display 320. The fourth area (D) 1404 may include a feed area (C) 1403. The second area (A) 1401, the third area (B) 1402, and the fourth area (D) 1404 may be disposed on the side surface of the display 320. An FPCB 570 as a transmission area may be disposed in the fourth area 1404 (D). The first area (e.g., the front surface 324), the second area (A) 1401, and the third area (B) 1402 may display a screen (e.g., a display area), and the fourth area (D) 1404 may not display a screen (e.g., a non-display area).

An antenna structure 1400 may be disposed on the dielectric layer 540 of the display 320. The antenna structure 1400 may be disposed on a lateral portion (e.g., the lateral portion 322 in FIGS. 3 and 4) of the display 320.

As an example, the antenna structure 1400 (e.g., the first antenna structure 740 in FIG. 7A) may include at least one tapered slot antenna 1410 (e.g., the fourth antenna 840 in FIG. 8A, a tapered slot antenna). The tapered slot antenna 1410 may be formed of a mesh pattern using a conductive mesh line (e.g., the conductive mesh line 546 in FIG. 5C).

As an embodiment, the antenna structure 1400 (e.g., the first antenna structure 740 in FIG. 7A) may be divided into display inner areas 1401, 1402, and 1403 and an FPCB area 1404 (e.g., a transmission region). The inner area of the display may include a display area (A) 1401, an antenna area (B) 1402, and a feed area (C) 1403. The feed area (C) 1403 may partially overlap with FPCB area (D) 1404.

As an example, a plurality of tapered slot antennas 1410 may be disposed on the lateral portion of the display 320 and included in the antenna structure 1400. The tapered slot antenna 1410 included in the antenna structure 1400 may be formed to be adjacent to the division line 512 of the front surface and the lateral portion 322 of the display 320. For example, the tapered slot antenna 1410 may be formed to coincide with the division line 512 of the lateral portion 322 and the front surface of the display 320. As another example, the distance between the upper end of the tapered slot antenna 1410 and the division line 512 on the front surface and the lateral portion 322 of the display 320 may vary within ±λ/10. For example, the upper end of the tapered slot antenna 1410 may be positioned higher than the division line 512 on the front surface and the lateral portion 322 of the display 320 by about λ/10. As another example, the upper end of the tapered slot antenna 1410 may be positioned lower than the division line 512 of the front surface and the lateral portion 322 of the display 320 by about λ/10. The upper end of the tapered slot antenna 1410 may include, for example, a portion adjacent to the division line 512 of the lateral portion 322 and the front surface of the display 320.

As an example, the radiator structure 1420 of the tapered slot antenna 1410 may include a first radiator 1422 and a second radiator 1424. The first radiator 1422 and the second radiator 1424 of the tapered slot antenna 1410 may have a shape in which the width becomes narrower at a portion adjacent to the ground toward the front surface of the display 320, and the first radiator 1422 and the second radiator 1424 may be arranged to be symmetrical with each other. The first radiator 1422 and the second radiator 1424 may be formed in substantially symmetrical shapes, for example.

As an example, the length (L1) of the tapered slot antenna 1410 may be longer than about λ/2 (e.g., L1>λ/2). For example, the lengths (L1) of the first radiator 1422 and the second radiator 1424 may be longer than about λ/2 (e.g., L1>λ/2). As another example, the width (W1) of the radiator structure 1420 may range from a minimum of about λ/8 to a maximum of about 2λ (e.g., λ/8 to 2λ). In the tapered slot antenna 1410, the ratio of the first width (W) of the widest portion of the radiator structure and the second width of the narrowest portion of the radiator structure may be 2 to 10:1 (e.g., W1=2*(W2)~10*(W2)).

As an example, the first radiator 1422 of the tapered slot antenna 1410 may be electrically connected to the positive terminal (+) of the antenna power supply through the first connection line 1423. The second radiator 1424 of the tapered slot antenna 1410 may be electrically connected to the negative terminal (−) of the antenna power supply through the second connection line 1425. As another example, the second radiator 1424 may be electrically connected to the positive terminal (+) of the antenna power supply, and the first radiator 1422 may be electrically connected to the negative terminal (−) of the antenna power supply. At least a portion of the first connection line 1423 and the second connection line 1425 may be positioned between the grounds 1430. Without being limited thereto, the first radiator 1422 and the second radiator 1424 of the tapered slot antenna 1410 may be connected to a feed line such as a CPW or a microstrip line.

An electric field may be formed between the first radiator 1422 and the second radiator 1424 of the tapered slot antenna 1410, and radio waves may be radiated from the edge of the upper end of the radiator structure 1420. Therefore, the radiation pattern of the tapered slot antenna 1410 may be formed toward the front surface 324 of the display 320 (e.g., toward the surface on which a screen is displayed), and the electric field direction may correspond to the horizontal direction of the tapered slot antenna 1410. The tapered slot antenna 1410 may radiate a signal having horizontal polarization characteristics.

Figure 14B:
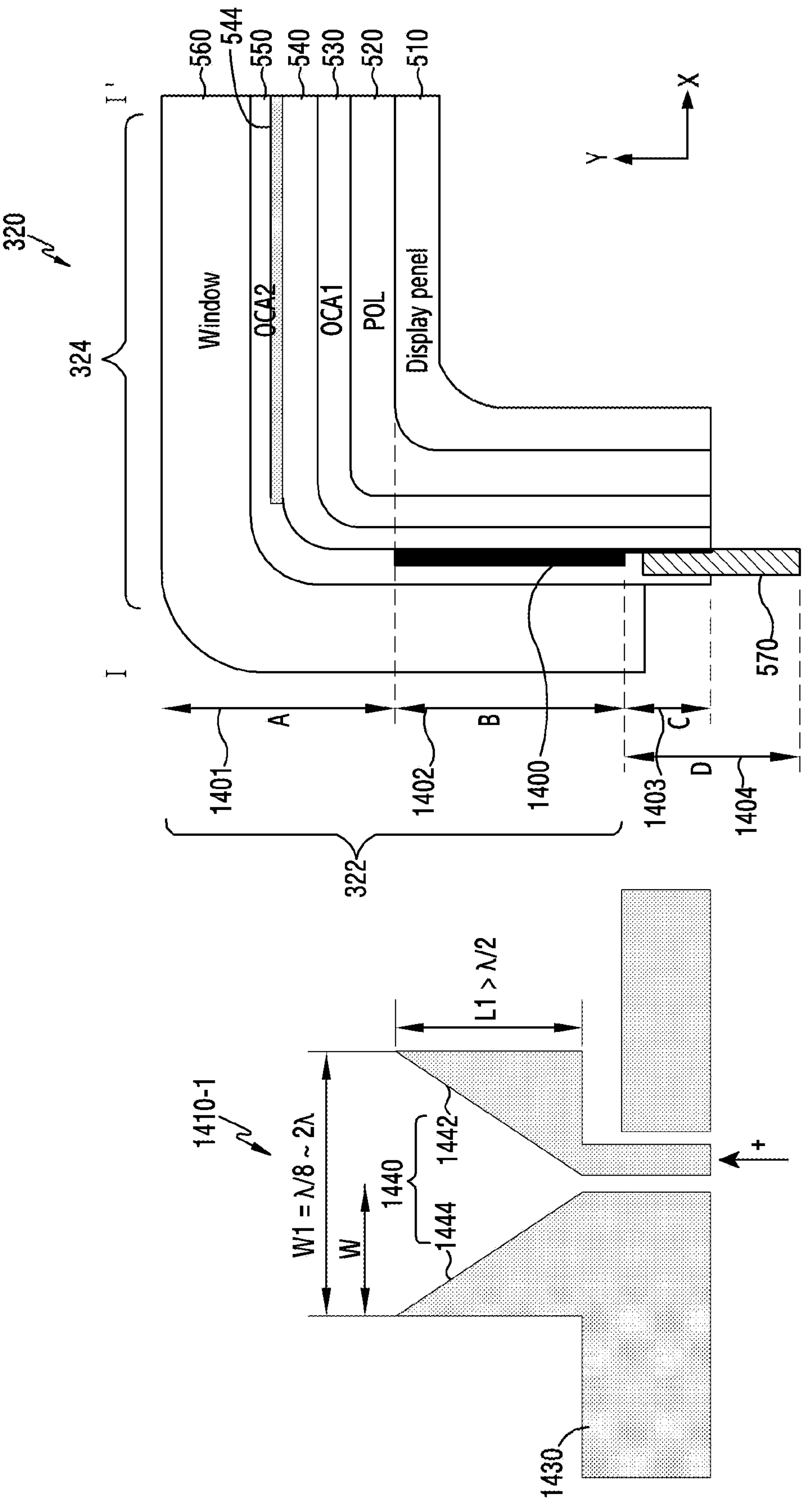
FIG. 14B is a diagram illustrating an example of a tapered slot antenna according to various embodiments.

FIG. 14B is a diagram illustrating an example of a tapered slot antenna 1410-1 according to various embodiments.

Referring to FIG. 14B, a radiator structure 1440 of the tapered slot antenna 1410-1 may include a first radiator 1442 and a second radiator 1444. The first radiator 1442 and the second radiator 1444 of the tapered slot antenna 1410-1 may have a shape in which the width becomes narrower at a portion adjacent to the ground toward the front surface 324 of the display 320. The first radiator 1442 and the second radiator 1444 may be arranged symmetrically with each other.

As an example, the first radiator 1442 of the tapered slot antenna 1410-1 may be electrically connected to the positive terminal (+) of the antenna power supply through the first connection line 1443. The second radiator 1444 of the tapered slot antenna 1410-1 may be directly connected to the ground 1430. At least a portion of the first connection line 1443 may be positioned between the grounds 1430. For example, the first radiator 1442 of the tapered slot antenna 1410-1 may be connected to a feed line such as a CPW or a microstrip line.

An electric field may be formed between the first radiator 1442 and the second radiator 1444 of the tapered slot antenna 1410-1, and radio waves may be radiated from the edge of the upper end of the radiator structure 1440. Therefore, the radiation pattern of the tapered slot antenna 1410-1 may be formed toward the front surface 324 of the display 320 (e.g., toward the surface on which a screen is displayed), and the direction of the electric field may correspond to the horizontal direction the tapered slot antenna 1410-1. The tapered slot antenna 1410-1 may radiate a signal having horizontal polarization characteristics.

Figure 15A:
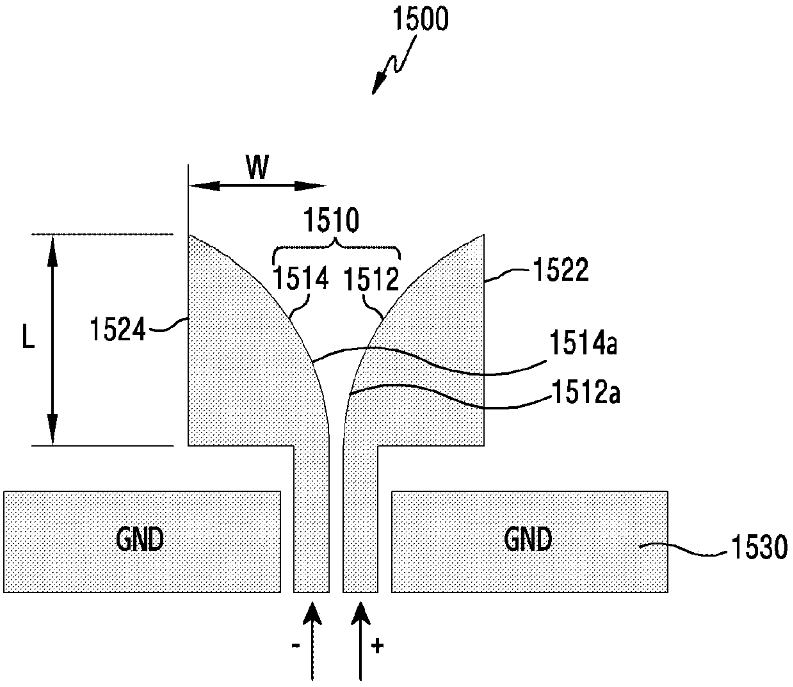
FIG. 15A is a diagram illustrating an example of a tapered slot antenna according to various embodiments.

FIG. 15A is a diagram illustrating an example of a tapered slot antenna 1500 according to various embodiments.

Referring to FIG. 15A, a radiator structure 1510 of a tapered slot antenna 1500 may include a first radiator 1512 and a second radiator 1514. The first radiator 1512 and the second radiator 1514 may have a shape in which the width becomes narrower at a portion adjacent to the ground toward the front surface of the display 320. The first radiator 1512 and the second radiator 1514 may be arranged symmetrically with each other. The inner side surface 1512*a* (e.g., the surface adjacent to the second radiator 1514) of the first radiator 1512 may be formed to have a curvature, and the outer side surface 1522 of the first radiator 1512 may be formed substantially perpendicular to the length (L) direction of the first radiator 1512. The inner side surface 1514*a* (e.g., the surface adjacent to the first radiator 1512) of the second radiator 1514 may be formed to have a curvature, and the outer side surface 1524 of the second radiator 1514 may be formed substantially perpendicular to the length (L) direction of the second radiator 1514. As an example, the lengths (L1) of the first radiator 1512 and the second radiator 1514 may be longer than about λ/2 (e.g., L>λ/2).

As an example, the first radiator 1512 of the tapered slot antenna 1500 may be electrically connected to the positive terminal (+) of the antenna power supply through the first connection line 1513. The second radiator 1514 of the tapered slot antenna 1500 may be electrically connected to the negative terminal (−) of the antenna power supply or the ground terminal through the second connection line 1515. At least a portion of the first connection line 1513 and the second connection line 1515 may be positioned between the grounds 1530. For example, the first radiator 1512 and the second radiator 1514 of the tapered slot antenna 1500 may be connected to a feed line such as a CPW or a microstrip line.

Figure 15B:
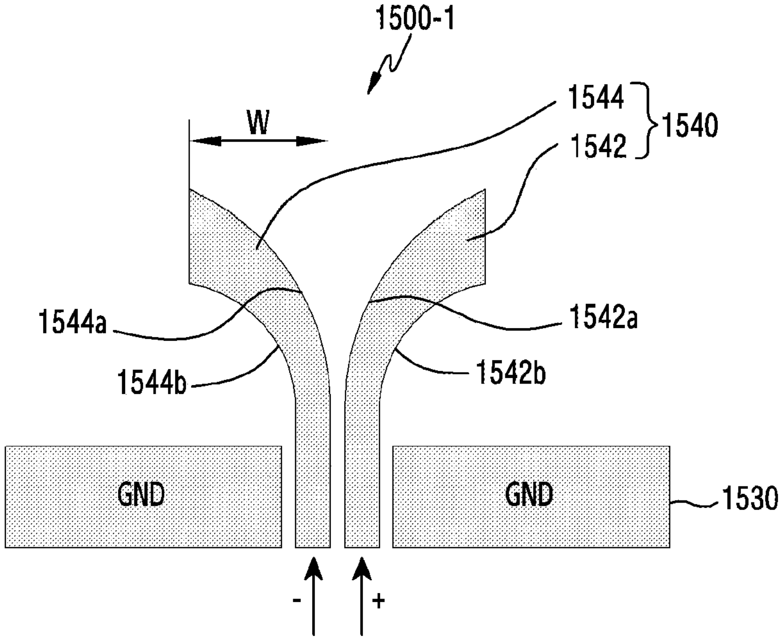
FIG. 15B is a diagram illustrating an example of a tapered slot antenna according to various embodiments.

FIG. 15B is a diagram illustrating an example of a tapered slot antenna 1500-1 according to various embodiments.

Referring to FIG. 15B, a radiator structure 1540 of the tapered slot antenna 1500-1 may include a first radiator 1542 and a second radiator 1544. In the first radiator 1542 and the second radiator 1544, the width of a portion adjacent to the ground and the width of a portion adjacent to the front surface of the display 320 may be different from each other, and the first radiator 1542 and the second radiator 1544 may be arranged symmetrically with each other. As an example, the first radiator 1542 and the second radiator 1544 may widen at a portion adjacent to the ground toward the front surface of the display 320 and then narrow again. The inner side surface 1542*a* (e.g., the surface adjacent to the second radiator 1544) of the first radiator 1542 may have a curvature. The outer side surface 1542*b* of the first radiator 1542 may have a curvature. The inner side surface 1544*a* (e.g., the surface adjacent to the first radiator 1542) of the second radiator 1544 may have a curvature. The outer side surface 1544*b* of the second radiator 1544 may have a curvature. In an example, the curvatures of the inner side surface 1542*a* and the outer side surface 1542*b* of the first radiator 1542 may be the same or different. As another example, the curvatures of the inner side surface 1544*a* and the outer side surface 1544*b* of the second radiator 1544 may be the same or different.

As an example, the first radiator 1542 of the tapered slot antenna 1500-1 may be electrically connected to the positive terminal (+) of the antenna power supply through the first connection line 1543. The second radiator 1544 of the tapered slot antenna 1500-1 may be electrically connected to the negative terminal (−) of the antenna power supply or the ground through the second connection line 1545. As another example, the first radiator 1542 may be electrically connected to the negative terminal (−) of the antenna power supply or the ground, and the second radiator 1544 may be electrically connected to the positive terminal (+) of the antenna power supply. At least a portion of the first connection line 1543 and the second connection line 1545 may be positioned between the grounds 1530. For example, the first radiator 1542 and/or the second radiator 1544 of the tapered slot antenna 1500-1 may be connected to a feed line such as a CPW or a microstrip line.

Figure 16A:
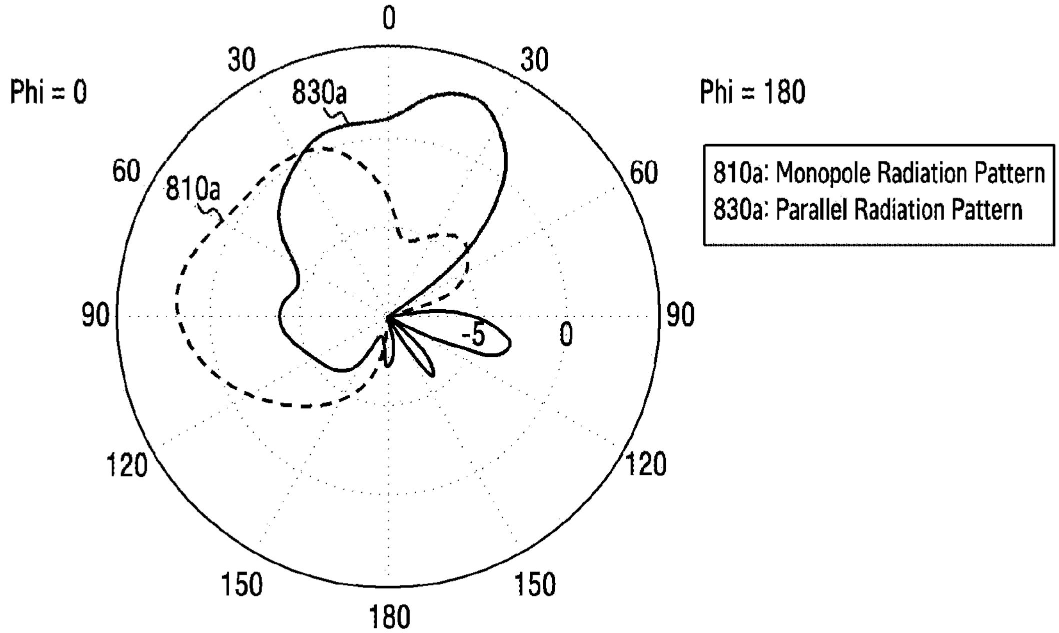
FIGS. 16A and 16B are graphs illustrating radiation patterns of vertical and horizontal polarizations of a monopole antenna and a parallel antenna according to various embodiments.
Figure 16B:
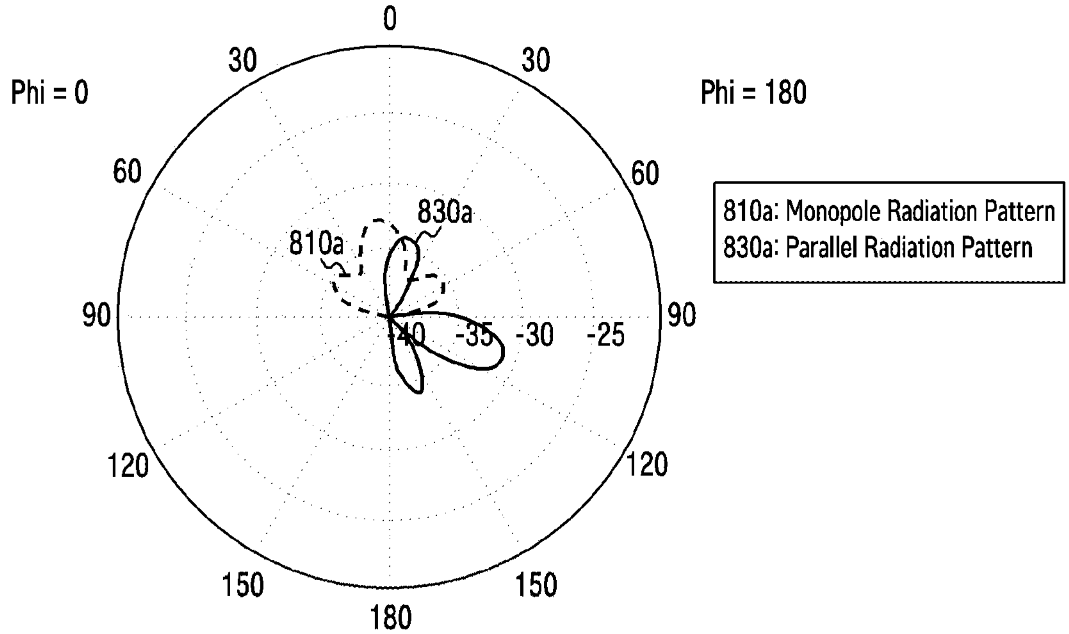

FIGS. 16A and 16B are graphs illustrating radiation patterns of vertical and horizontal polarizations of a monopole antenna and a parallel antenna according to various embodiments.

Referring to FIGS. 3, 8A, 11, 12, 16A and 16B, the monopole antenna (e.g., the first antenna 810 (monopole antenna) in FIG. 8A) and the parallel antenna (e.g., the third antenna 830 (parallel antenna) in FIG. 8A) may operate as an antenna because the separation distance of the display panel 510 is secured due to the thickness of the dielectric layer of the polarization layer 520 and the OCAs 530 and 550 shown in FIG. 5A.

The monopole antenna (e.g., the first antenna 810) may have an electric field (E-field) generated in the same direction as the length direction (e.g., the Y axis direction) of the monopole and may exhibit vertical polarization characteristics. The first antenna 810 (e.g., the monopole antenna) may be disposed on the lateral portion 322 of the display 320 to radiate millimeter wave signals toward the side surface of the electronic device 101. For example, at least a portion of the lateral portion 322 of the display 320 may be disposed to be bent in the −Y axis direction.

As noted from the radiation pattern of the first antenna 810 (e.g., the monopole antenna), the coverage of the vertically polarized radiation pattern 810*a* of the first antenna 810 (e.g., the monopole antenna) may be formed wider than the coverage of the horizontally polarized radiation pattern 810*b* of the first antenna 810 (e.g., the monopole antenna).

The third antenna 830 (e.g., the parallel antenna) may have an electric filed (E-field) formed between the radiator structure and the ground (e.g., the display panel 510) and may exhibit vertical polarization characteristics. For example, the third antenna 830 (e.g., the parallel antenna) may be disposed on the lateral portion 322 of the display 320 to radiate millimeter wave signals toward the front surface of the electronic device 101. When the inactive area of the display panel 510 is used as the ground surface of the third antenna 830 (e.g., the parallel antenna), a feed line or line for supplying power may be disposed in the inactive area.

As noted from the radiation pattern of the third antenna 830 (e.g., the parallel antenna), the coverage of the vertically polarized radiation pattern 830*a* of the third antenna 830 (e.g., the parallel antenna) may be formed wider than the coverage of the horizontally polarized radiation pattern 830*b* of the third antenna 830 (e.g., the parallel antenna).

Figure 17A:
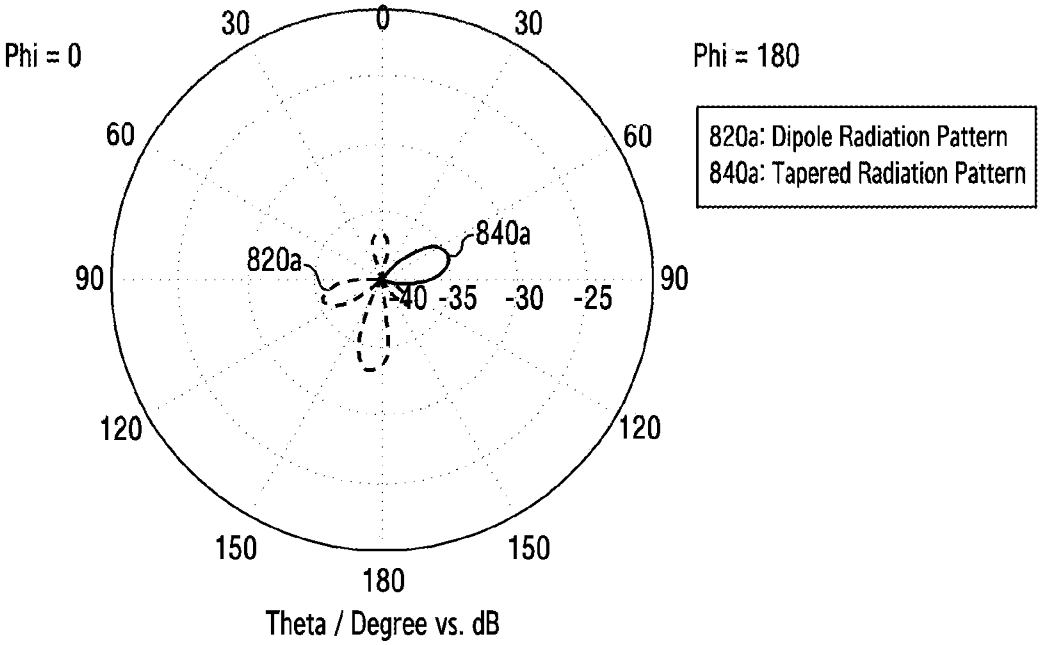
FIGS. 17A and 17B are graphs illustrating radiation patterns of vertical and horizontal polarizations of a dipole antenna and a tapered slot antenna according to various embodiments.
Figure 17B:
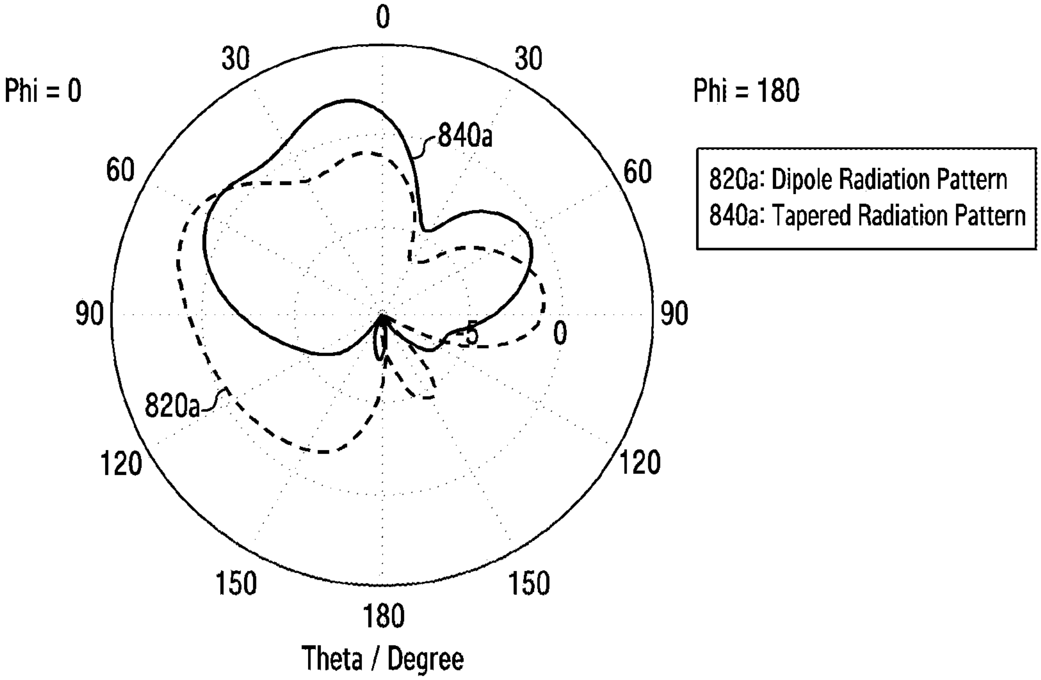

FIGS. 17A and 17B are graphs illustrating radiation patterns of vertical and horizontal polarizations of a dipole antenna and a tapered slot antenna according to various embodiments.

Referring to FIGS. 3, 8A, 9, 14A, 17A and 17B, the second antenna 820 (e.g., the dipole antenna) may have an electric field (E-field) generated in the same vertical direction as the longitudinal direction (e.g., the Y axis direction) of the dipole and may exhibit horizontal polarization characteristics. The second antenna 820 (e.g., the dipole antenna) may be disposed on the lateral portion 322 of the display 320 to radiate millimeter wave signals toward the side surface of the electronic device 101. For example, at least a portion of the lateral portion 322 of the display 320 may be disposed to be bent in the −Y axis direction.

The fourth antenna 840 (e.g., the tapered slot antenna) may have an electric field (E-field) generated between the tapered slots at the upper end of the radiator structure (e.g., the radiator structure 1420 in FIG. 14A) and may exhibit the horizontal polarization characteristics. The fourth antenna 840 (e.g., the tapered slot antenna) may be disposed on the lateral portion 322 of the display 320 to radiate millimeter wave signals toward the front surface of the electronic device 101.

The second antenna 820 (e.g., the dipole antenna) and the fourth antenna 840 (e.g., the tapered slot antenna) may have end-fire radiation characteristics and be disposed on the lateral portion 322 of the display 320 to radiate millimeter wave signals toward the front surface of the electronic device 101. As an example, in addition to the second antenna 820 (e.g., the dipole antenna) and the fourth antenna 840 (e.g., the tapered slot antenna), other antennas exhibiting end-fire radiation characteristics may be applied to the antenna.

As noted from the radiation pattern of the second antenna 820 (e.g., the dipole antenna), the coverage of the horizontally polarized radiation pattern 820*b* of the second antenna 820 (e.g., the dipole antenna) may be formed wider than the coverage of the vertically polarized radiation pattern 820*a* of the second antenna 820 (e.g., the dipole antenna).

As another example, as noted from the radiation pattern of the fourth antenna 840 (e.g., the tapered slot antenna), the coverage of the horizontally polarized radiation pattern 840*b* of the fourth antenna 840 (e.g., the tapered slot antenna) may be formed wider than the coverage of the vertically polarized radiation pattern 840*a* of the fourth antenna 840 (e.g., the tapered slot antenna).

As shown in FIGS. 16 and 17, the first antenna 810 (e.g., the monopole antenna) and the third antenna 830 (e.g., the parallel antenna) may have excellent vertical polarization characteristics. The second antenna 820 (e.g., the dipole antenna) and the fourth antenna 840 (e.g., the tapered slot antenna) may have excellent horizontal polarization characteristics.

An electronic device (the electronic device 101 in FIGS. 3 and 4) according to various embodiments may include an antenna structure including various types of antennas having vertical and horizontal dual polarization characteristics and disposed on the lateral portion 322 of the display 320 and may radiate millimeter wave signals in the front, rear, and lateral directions of the electronic device 101 or 700. An electronic device (electronic device 101 in FIG. 3) according to various embodiments may include an antenna structure having vertical and horizontal dual polarization characteristics and disposed on the lateral portion 322 of the display 320, so that a wide range of antenna coverage may be secured with respect to the four surfaces of the electronic device 101.

An electronic device according to various example embodiments of the disclosure may include: a display, an antenna module including at least one antenna, a conductive connection member comprising a conductive material, and at least one antenna structure. The display may be arranged in an inner space of a housing to be visible from the outside and may include a curved lateral portion. The antenna module may be disposed in the inner space of the housing. The conductive connection member may be electrically connected to the antenna module. The at least one antenna structure may be disposed on the lateral portion of the display. The conductive connection members may electrically connect the antenna structure to the antenna module. The antenna structure may include at least one first-type antenna (e.g., a lateral radiating antenna) and at least one second-type antenna (e.g., a front radiating antenna) configured to radiate radio waves in different directions.

In the electronic device according to various example embodiments of the disclosure, the first-type antenna (e.g., a lateral radiating antenna) may include a plurality of first antennas and a plurality of second antennas configured to radiate radio waves in a lateral direction of the electronic device.

In the electronic device according to various example embodiments of the disclosure, the plurality of first antennas may include an antenna having vertical polarization characteristics.

In the electronic device according to various example embodiments of the disclosure, the antenna having vertical polarization characteristics may include a monopole antenna (e.g., the first antenna 810).

In the electronic device according to various example embodiments of the disclosure, an inactive area of a panel of the display may be grounded, and the monopole antenna (e.g., the first antenna 810) may be connected to the ground.

In the electronic device according to various example embodiments of the disclosure, the plurality of second antennas may include an antenna having horizontal polarization characteristics.

In the electronic device according to various example embodiments of the disclosure, the antennas having horizontal polarization characteristics may include a dipole antenna (e.g., the second antenna 820).

In the electronic device according to various example embodiments of the disclosure, the antenna having vertical polarization characteristics and the antenna having horizontal polarization characteristics may be alternately arranged.

In the electronic device according to various example embodiments of the disclosure, the second-type antenna (e.g., a front radiating antenna) may include a plurality of third and fourth antennas configured to radiate radio waves in a front direction of the electronic device.

In the electronic device according to various example embodiments of the disclosure, the plurality of third antennas may include an antenna having vertical polarization characteristics.

In the electronic device according to various example embodiments of the disclosure, the antenna having vertical polarization characteristics may include a parallel antenna (e.g., the third antenna 830).

In the electronic device according to various example embodiments of the disclosure, the plurality of fourth antennas may include an antenna having horizontal polarization characteristics.

In the electronic device according to various example embodiments of the disclosure, the antenna having horizontal polarization characteristics may include a tapered slot antenna (e.g., the fourth antenna 840).

In the electronic device according to various example embodiments of the disclosure, the antenna having vertical polarization characteristics and the antenna having horizontal polarization characteristics may be alternately arranged.

In the electronic device according to various example embodiments of the disclosure, the antenna module may include a plurality of antenna patterns configured to radiate radio waves in a rear direction of the electronic device.

The display of the electronic device according to various example embodiments of the disclosure may include a polarization layer disposed on a panel of the display, a first adhesive disposed on the polarization layer, a conductive layer disposed on the first adhesive, a second adhesive disposed on the antenna layer, and a window disposed on the second adhesive. The antenna may be formed on the conductive layer.

The conductive layer of the electronic device according to various example embodiments of the disclosure may include a dielectric and a conductive mesh line formed on the dielectric. The antenna may be formed of the conductive mesh line.

An electronic device according to various example embodiments of the disclosure may include: a display, a rear cover, an antenna module including at least one antenna, a plurality of flexible printed circuit boards (FPCBs), and a first antenna and a second antenna. The display may be disposed in an inner space of a housing to be visible from the outside and may include a curved lateral portion. The rear cover may be disposed under the display. The antenna module may be disposed in the inner space of the housing. The plurality of FPCBs may be electrically connected to the antenna module. The first antenna may be disposed on one lateral portion of the display. The second antenna may be disposed on the other lateral portion of the display. A first FPCB among the plurality of FPCBs may electrically connect the first antenna to the antenna module. A second FPCB among the plurality of FPCBs may electrically connect the second antenna to the antenna module. The first antenna and the second antenna may include a first-type antenna (e.g., a lateral radiating antenna) and a second-type antenna (e.g., a front radiating antenna) configured to radiate radio waves in different directions.

The electronic device according to various example embodiments of the disclosure may further include a third antenna disposed on one lateral portion of the rear cover and a third conductive connection member comprising a conductive material configured to electrically connect the third antenna to the antenna module.

The third antenna may include a first-type antenna (e.g., a lateral radiating antenna) and a second-type antenna (e.g., a front radiating antenna) configured to radiate radio waves in different directions.

The first antenna of the electronic device according to various example embodiments of the disclosure may be disposed on one lateral portion of the display and one lateral portion of the rear cover.

The electronic device according to various embodiments disclosed herein may be one of various types of electronic devices. The electronic devices may include, for example, a portable communication device (e.g., a smart phone), a computer device, a portable multimedia device, a portable medical device, a camera, a wearable device, a home appliance, or the like. The electronic device according to embodiments of the disclosure is not limited to those described above.

It should be appreciated that various embodiments of the disclosure and the terms used therein are not intended to limit the technological features set forth herein to particular embodiments and include various changes, equivalents, or alternatives for a corresponding embodiment. With regard to the description of the drawings, similar reference numerals may be used to designate similar or relevant elements. A singular form of a noun corresponding to an item may include one or more of the items, unless the relevant context clearly indicates otherwise. As used herein, each of such phrases as "A or B," "at least one of A and B," "at least one of A or B," "A, B, or C," "at least one of A, B, and C," and "at least one of A, B, or C" may include all possible combinations of the items enumerated together in a corresponding one of the phrases. As used herein, such terms as "a first", "a second", "the first", and "the second" may be used to simply distinguish a corresponding element from another, and does not limit the elements in other aspect (e.g., importance or order). It is to be understood that if an element (e.g., a first element) is referred to, with or without the term "operatively" or "communicatively", as "coupled with/to" or "connected with/to" another element (e.g., a second element), the element may be coupled/connected with/to the other element directly (e.g., wiredly), wirelessly, or via a third element.

As used herein, the term "module" may include a unit implemented in hardware, software, or firmware, or any combination thereof, and may be interchangeably used with other terms, for example, "logic," "logic block," "component," or "circuit". The "module" may be a minimum unit of a single integrated component adapted to perform one or more functions, or a part thereof. For example, according to an embodiment, the "module" may be implemented in the form of an application-specific integrated circuit (ASIC).

According to various embodiments, each element (e.g., a module or a program) of the above-described elements may include a single entity or multiple entities. According to various embodiments, one or more of the above-described elements may be omitted, or one or more other elements may be added. Alternatively or additionally, a plurality of elements (e.g., modules or programs) may be integrated into a single element. In such a case, according to various embodiments, the integrated element may still perform one or more functions of each of the plurality of elements in the same or similar manner as they are performed by a corresponding one of the plurality of elements before the integration. According to various embodiments, operations performed by the module, the program, or another element may be carried out sequentially, in parallel, repeatedly, or heuristically, or one or more of the operations may be executed in a different order or omitted, or one or more other operations may be added.

While the disclosure has been illustrated and described with reference to various example embodiments, it will be understood that the various example embodiments are intended to be illustrative, not limiting. It will be further understood by those skilled in the art that various changes in form and detail may be made without departing from the true spirit and full scope of the disclosure, including the appended claims and their equivalents. It will also be understood that any of the embodiment(s) described herein may be used in conjunction with any other embodiment(s) described herein.

What is claimed is:

1. An electronic device comprising:

a display comprising a curved lateral portion;

an antenna module receiving a RF signal;

at least one antenna structure at least partially disposed on the curved lateral portion of the display;

a conductive connection member comprising a conductive material configured to electrically connect the at least one antenna structure to the antenna module, and the at least one antenna structure comprises at least one first-type antenna and at least one second-type antenna configured to radiate radio waves in different directions, wherein the first-type antenna comprises a plurality of first antennas and a plurality of second antennas configured to radiate radio waves in a lateral direction of the electronic device, wherein the second-type antenna comprises a plurality of third and fourth antennas configured to radiate radio waves in a front direction of the electronic device, and wherein the plurality of first antennas comprise an antenna having vertical polarization characteristics, the plurality of second antennas comprise an antenna having horizontal polarization characteristics, the plurality of third antennas comprise an antenna having vertical polarization characteristics, and the plurality of fourth antennas comprise an antenna having horizontal polarization characteristics.

2. The electronic device of claim 1, wherein the plurality of first antennas having the vertical polarization characteristics and the plurality of third antennas having the vertical polarization characteristics include a monopole antenna.

3. The electronic device of claim 2, wherein an inactive area of a display panel included in the display is grounded, and the monopole antenna is connected to the grounded inactive area.

4. The electronic device of claim 1, wherein the antennas having horizontal polarization characteristics include a dipole antenna.

5. The electronic device of claim 1, wherein the antennas of the first plurality of antennas having the vertical polarization characteristics and the antennas of the second plurality of antennas having the horizontal polarization characteristics are alternately arranged.

6. The electronic device of claim 1, wherein at least one antenna of (1) the antennas having the vertical polarization characteristics of the plurality of first antennas and (2) the antennas having the vertical polarization characteristics of the plurality of third antennas includes a parallel antenna.

7. The electronic device of claim 1, wherein at least one of (1) the antennas having the horizontal polarization characteristics of the plurality of second antennas and (2) the antennas having the horizontal polarization characteristics of the plurality of fourth antennas includes a tapered slot antenna.

8. The electronic device of claim 1, wherein the antennas of the plurality of third antennas having the vertical polarization characteristics and the plurality of fourth antennas having the horizontal polarization characteristics are alternately arranged.

9. The electronic device of claim 1, wherein the at least one antenna structure comprises a plurality of antenna patterns configured to radiate radio waves in the rear direction of the electronic device.

10. The electronic device of claim 3, wherein the display comprises:

a polarization layer disposed on the display panel;

a first adhesive disposed on the polarization layer;

a conductive layer disposed on the first adhesive;

a second adhesive disposed on the conductive layer; and a window disposed on the second adhesive, and wherein the at least one antenna structure is formed on the conductive layer.

11. The electronic device of claim 10, wherein the conductive layer comprises:

a dielectric; and a conductive mesh line formed on the dielectric, and wherein the at least one antenna structure is comprised of the conductive mesh line.

* * * * *